United States Patent
Wang et al.

(10) Patent No.: US 11,352,485 B2
(45) Date of Patent: *Jun. 7, 2022

(54) POLYETHYLENE COMPOSITION AND FILM HAVING OUTSTANDING PROPERTIES

(71) Applicant: NOVA Chemicals (International) S.A., Fribourg (CH)

(72) Inventors: XiaoChuan Wang, Calgary (CA); Peter Zoricak, Calgary (CA); Brian Molloy, Airdrie (CA); Qinyan Wang, Calgary (CA); Lawrence VanAsseldonk, Sarnia (CA); Norman Aubee, Okotoks (CA)

(73) Assignee: NOVA CHEMICALS (INTERNATIONAL) S.A., Fribourg (CH)

( * ) Notice: Subject to any disclaimer, the term of this patent is extended or adjusted under 35 U.S.C. 154(b) by 99 days.

This patent is subject to a terminal disclaimer.

(21) Appl. No.: 16/507,477

(22) Filed: Jul. 10, 2019

(65) Prior Publication Data

US 2020/0017666 A1    Jan. 16, 2020

(30) Foreign Application Priority Data

Jul. 11, 2018 (CA) .................... CA 3011031

(51) Int. Cl.
C08L 23/06 (2006.01)
C08L 23/08 (2006.01)

(52) U.S. Cl.
CPC ............... *C08L 23/06* (2013.01); *C08L 23/08* (2013.01); *C08L 2203/16* (2013.01); *C08L 2205/025* (2013.01); *C08L 2205/03* (2013.01)

(58) Field of Classification Search
CPC .............. C08F 2500/08; C08F 2500/09; C08F 2500/10; C08F 2500/05
See application file for complete search history.

(56) References Cited

U.S. PATENT DOCUMENTS

| | | |
|---|---|---|
| 5,376,439 A | 12/1994 | Hodgson et al. |
| 6,114,486 A | 9/2000 | Rowland et al. |
| 8,022,143 B2 | 9/2011 | Wang |
| 9,963,529 B1 | 5/2018 | Kazemi et al. |
| 2003/0213938 A1* | 11/2003 | Farley ............... C08L 23/0815 252/500 |
| 2008/0038533 A1 | 2/2008 | Best et al. |
| 2009/0297810 A1 | 12/2009 | Fiscus et al. |
| 2011/0040041 A1 | 2/2011 | Kolb et al. |
| 2016/0108221 A1 | 4/2016 | Sibtain et al. |
| 2018/0305531 A1 | 10/2018 | Zhang et al. |
| 2020/0165366 A1 | 5/2020 | Li et al. |
| 2021/0079138 A1 | 3/2021 | Wang et al. |

FOREIGN PATENT DOCUMENTS

| | | |
|---|---|---|
| WO | WO-94/26816 A1 | 11/1994 |
| WO | WO-98/20062 A1 | 5/1998 |
| WO | WO-03/074594 A1 | 9/2003 |
| WO | WO-2008/077530 A2 | 7/2008 |
| WO | WO-2014/099307 A1 | 6/2014 |

(Continued)

OTHER PUBLICATIONS

ASTM D5748-905 (Reapproved 2012)—Standard Test Method for Protrusion Puncture Resistance of Stretch Wrap Film; Copyright ASTM International—Current edition approved Apr. 1, 2012. Published May 2012. Originally approved in 1995. Last previous edition approved in 2007 as D5748-95 (2007). pp. 1-4.

ASTM D3124-98 (Reapproved 2011)—Standard Test Method for Vinylidene Unsaturation in Polyethylene by Infrared Spectrophotometry; Copyright ASTM International—Current edition approved Feb. 1, 2011. Published Mar. 2011. Originally approved in 1972. Last previous edition approved in 2003 as D3124-98 (2003). pp. 1-4.

ASTM D6474-99 (Reapproved 2006); Standard Test Method for Determining Molecular Weight Distribution and Molecular WEight Averages of Polyolefins by High Temperature Gel Permeation Chromatography; Copyright ASTM International—Current edition approved Mar. 15, 2006. Published Apr. 2006. Originally approved in 1999. Last previous edition approved in 1999 as D6474-99. pp. 1-6.

(Continued)

*Primary Examiner* — Jeffrey C Mullis
(74) *Attorney, Agent, or Firm* — Thomas J. Styslinger

(57) ABSTRACT

A polyethylene composition comprises a first polyethylene which is an ethylene copolymer having a weight average molecular weight of from 70,000 to 250,000 and a molecular weight distribution $M_w/M_n$ of <2.3, a second polyethylene which is an ethylene copolymer or homopolymer having a weight average molecular weight of from 50,000 to 200,000 and a molecular weight distribution $M_w/M_n$ of <2.3, and a third polyethylene which is an ethylene copolymer or homopolymer having a weight average molecular weight of from 70,000 to 200,000 and a molecular weight distribution $M_w/M_n$ of <2.3, where the first polyethylene has more short chain branching than the second polyethylene or the third polyethylene. The polyethylene composition has a composition distribution breadth index, $CDBI_{50}$ obtained from a crystallization elution fractionation (CEF) analysis of <45 weight %. A film made from the polyethylene composition may have a machine direction 1% secant modulus of ≥200 MPa (at a film thickness of about 1 mil), a seal initiation temperature (SIT) of ≤85° C. (at a film thickness of about 2 mil), an area of hot tack window (AHTW) of ≥220 Newtons·C° (at a film thickness of about 2 mil), an oxygen transmission rate (OTR) of ≥600 cm³ per 100 inch² per day (at a film thickness of about 1 mil), a dart impact strength of ≥400 g/mil, and a machine direction (MD) tear strength of ≥400 g/mil.

48 Claims, 8 Drawing Sheets

(56) References Cited

FOREIGN PATENT DOCUMENTS

| WO | WO-2017/106120 A2 | 6/2017 |
|---|---|---|
| WO | WO-2019/126845 A1 | 7/2019 |
| WO | WO-2019/132694 A1 | 7/2019 |
| WO | WO-2019/133394 A1 | 7/2019 |

OTHER PUBLICATIONS

ASTM D6645-01 (Reapproved 2010)—Standard Test Method for Methyl (Comonomer) Content in Polyethylene by Infrared Spectrophotometry—Copyright ASTM International—Current edition approved Jan. 1, 2010. Published Jan. 2010. Originally approved in 2001. Last previous edition approved in 2001 as D6645-01. pp. 1-4.

ASTM D1709-09—Standard Test Methods for Impact Resistance of Plastic Film by the Free-Falling Dart Method—Copyright ASTM International—Current edition approved May 1, 2009. Published Jun. 2009. Originally approved in 1959. Last previous edition approved in 2008 as D1709-08. pp. 1-9.

ASTM D1922-09—Standard Test Method for Propagation Tear Resistance of Plastic Film and Thin Sheeting by Pendulum Method—Copyright ASTM International—Current edition approved May 1, 2009. Published Jun. 2009. Originally approved in 1961. Last previous edition approved in 2008 as D1922-08. pp. 1-7.

ASTM D2582-09—Standard Test Method for Puncture-Propagation Tear Resistance of Plastic Film and Thin Sheeting—Copyright ASTM International—Current edition approved May 1, 2009. Published Jun. 2009. Originally approved in 1967. Last previous edition approved in 2008 as D2582-08. pp. 1-5.

ASTM D882-12—Standard Test Method for Tensile Properties of thin Plastic Sheeting—Copyright ASTM International—Current edition approved Aug. 1, 2012. Published Sep. 2012. Originally approved in 1946. Last previous edition approved in 2010 as D882-10. pp. 1-11.

ASTM D792-13—Standard Test Methods for Density and Specific Gravity (RElative Density) of Plastics by Displacement—Copyright ASTM International—Current edition approved Nov. 1, 2013. Published Nov. 2013. Originally approved in 1944. Last previous edition approved in 2008 as D792-08. pp. 1-6.

ASTM D1003-13—Standard Test Method for Haze and Luminous Transmittance of Transparent Plastics—Copyright ASTM International—Current edition approved Nov. 15, 2013. Published Nov. 2013. Originally approved in 1949. Last previous edition approved in 2011 as D1003-11. pp. 1-7.

ASTM D1238-13—Standard Test Method for Melt Flow Rates of Thermoplastics by Extrusion Plastometer—Copyribht ASTM International—Current edition approved Aug. 1, 2013. Published Aug. 2013. Originally approved in 1965. Last previous edition approved in 2010 as D1238-10. 1-16.

ASTM D2457-13—Standard Test Method for Specular Gloss of Plastic Films and Solid Plastics—Copyright ASTM International—Current edition approved Apr. 1, 2013. Published Apr. 2013. Originally approved in 1965. Last previous edition approved in 2008 as D2457-08. pp. 1-6.

Graessley, William W.; Effect of Long Branches on the Flow Properties of Polymers; Accounts of of Chemical Research: Flow Properties of Polymers; 1977, vol. 10, pp. 332-339.

Yau, Wallace W. and Hill, Donald R.; International Journal of Polymer Analysis and Characterization: Application of Triple-Detector Size Exclusion Chromatography (On-Line Differential Refractometer, Viscometer and Light Scattering Detectors) for the Characterization of Brominated Polystyrene; Int. J. Polymer Analysis and Characterization, 1996, vol. 2, pp. 151-171.

Wild, L.; Ryle, T.R.; Knobelock, D.C. and Peat, I.R.; Determination of Branching Distributions in Polyethylene and Ethylene Copolymers; Journal of Polymer Science: Polymer Physics Edition (1982), vol. 20, pp. 441-455.

Randall, James C.; A Review of High Resolution Liquid 13Carbon Nuclear Magnetic Resonance Characterizations of Ethylene-Based Polymers; Journal of Macromolecular Science, Part C, (1989), pp. 201-317.

International Search Report and Written Opinion on PCT Appl. Ser. No. PCT/IB2019/055771 dated Mar. 2, 2020 (31 pages).

\* cited by examiner

POLYETHYLENE COMPOSITION AND FILM HAVING OUTSTANDING PROPERTIES

FIELD OF THE INVENTION

The present disclosure provides polyethylene compositions which when blown into film have good stiffness, good permeability, good dart and tear properties and remarkable sealability. The polyethylene compositions comprise three different polyethylene components each of which are made with a single site polymerization catalyst.

BACKGROUND OF THE INVENTION

Multicomponent polyethylene compositions are well known in the art. One method to access multicomponent polyethylene compositions is to use two or more distinct polymerization catalysts in one or more polymerization reactors. For example, the use of single site and Ziegler-Natta type polymerization catalysts in at least two distinct solution polymerization reactors is known. Such reactors may be configured in series or in parallel.

Solution polymerization processes are generally carried out at temperatures above the melting point of the ethylene homopolymer or copolymer product being made. In a typical solution polymerization process, catalyst components, solvent, monomers and hydrogen are fed under pressure to one or more reactors.

For solution phase ethylene polymerization, or ethylene copolymerization, reactor temperatures can range from about 80° C. to about 300° C. while pressures generally range from about 3MPag to about 45MPag. The ethylene homopolymer or copolymer produced remains dissolved in the solvent under reactor conditions. The residence time of the solvent in the reactor is relatively short, for example, from about 1 second to about 20 minutes. The solution process can be operated under a wide range of process conditions that allow the production of a wide variety of ethylene polymers. Post reactor, the polymerization reaction is quenched to prevent further polymerization, by adding a catalyst deactivator, and optionally passivated, by adding an acid scavenger. Once deactivated (and optionally passivated), the polymer solution is passed to a polymer recovery operation (a devolatilization system) where the ethylene homopolymer or copolymer is separated from process solvent, unreacted residual ethylene and unreacted optional α-olefin(s).

Regardless of the manner of production, there remains a need to improve the performance of multicomponent polyethylene compositions in film applications.

SUMMARY OF THE INVENTION

The present disclosure provides polyethylene compositions which when made into film have a good balance of stiffness, dart impact strength, tear strength, permeability and sealing properties.

An embodiment of the disclosure is a polyethylene composition comprising: from 15 to 80 wt % of a first polyethylene which is an ethylene copolymer, the first polyethylene having a weight average molecular weight $M_w$ of from 70,000 to 250,000, a molecular weight distribution $M_w/M_n$ of <2.3 and from 5 to 100 short chain branches per thousand carbon atoms;

from 5 to 50 wt % of a second polyethylene which is an ethylene copolymer or an ethylene homopolymer, the second polyethylene having a weight average molecular weight, $M_w$ of from 50,000 to 200,000, a molecular weight distribution $M_w/M_n$ of <2.3 and from 0 to 15 short chain branches per thousand carbon atoms; and from 5 to 50 wt % of a third polyethylene which is an ethylene copolymer or an ethylene homopolymer, the third polyethylene having a weight average molecular weight, $M_w$ of from 70,000 to 200,000, a molecular weight distribution $M_w/M_n$ of <2.3 and from 0 to 20 short chain branches per thousand carbon atoms; wherein the number of short chain branches per thousand carbon atoms in the first polyethylene ($SCB_{PE-1}$) is greater than the number of short chain branches per thousand carbon atoms in the second polyethylene ($SCB_{PE-2}$) and the third polyethylene ($SCB_{PE-3}$); and the polyethylene composition has a density of ≤0.939 g/cm³, a melt index $I_2$ of from 0.1 to 10 g/10 min, and a composition distribution breadth index $CDBI_{50}$ obtained from a crystallization elution fractionation (CEF) analysis of <45 weight %.

An embodiment of the disclosure is a film layer having a thickness of from 0.5 to 10 mil, comprising a polyethylene composition comprising:

from 15 to 80 wt % of a first polyethylene which is an ethylene copolymer, the first polyethylene having a weight average molecular weight $M_w$ of from 70,000 to 250,000, a molecular weight distribution $M_w/M_n$ of <2.3 and from 5 to 100 short chain branches per thousand carbon atoms;

from 5 to 50 wt % of a second polyethylene which is an ethylene copolymer or an ethylene homopolymer, the second polyethylene having a weight average molecular weight, $M_w$ of from 50,000 to 200,000, a molecular weight distribution $M_w/M_n$ of <2.3 and from 0 to 15 short chain branches per thousand carbon atoms; and from 5 to 50 wt % of a third polyethylene which is an ethylene copolymer or an ethylene homopolymer, the third polyethylene having a weight average molecular weight, $M_w$ of from 70,000 to 200,000, a molecular weight distribution $M_w/M_n$ of <2.3 and from 0 to 20 short chain branches per thousand carbon atoms; wherein the number of short chain branches per thousand carbon atoms in the first polyethylene ($SCB_{PE-1}$) is greater than the number of short chain branches per thousand carbon atoms in the second polyethylene ($SCB_{PE-2}$) and the third polyethylene ($SCB_{PE-3}$); and the polyethylene composition has a density of ≤0.939 g/cm³, a melt index $I_2$ of from 0.1 to 10 g/10 min, and a composition distribution breadth index $CDBI_{50}$ obtained from a crystallization elution fractionation (CEF) analysis of <45 weight %.

In an embodiment, a film layer has a dart impact strength of ≥400 g/mil.

In an embodiment, a film layer has a machine direction (MD) tear strength of ≥400 g/mil.

In an embodiment, a film layer has a machine direction (MD) 1% secant modulus of ≥200 MPa when measured at a film thickness of about 1 mil.

In an embodiment, a film layer has a seal initiation temperature (SIT) of ≤85° C. when measured at a film thickness of about 2 mil.

In an embodiment, the film layer has an area of hot tack window (AHTW) of ≥220 Newtons·° C. when measured at a film thickness of about 2 mil.

In an embodiment, the film layer has an oxygen transmission rate (OTR) of ≥600 cm³ per 100 inch² per day when measured at a film thickness of about 1 mil.

In an embodiment, the film layer has an oxygen transmission rate (OTR) of ≥600 cm³ per 100 inch² per day when measured at a film thickness of about 1 mil.

An embodiment of the disclosure is a film layer having a thickness of from 0.5 to 10 mil, wherein the film layer has a has a machine direction (MD) 1% secant modulus of ≥200 MPa when measured at a film thickness of about 1 mil, an oxygen transmission rate (OTR) of ≥600 cm³ per 100 inch² per day when measured at a film thickness of about 1 mil, a seal initiation temperature (SIT) of ≤85° C. when measured at a film thickness of about 2 mil, an area of hot tack window (AHTW) of ≥220 Newtons·° C. when measured at a film thickness of about 2 mil, a dart impact strength of ≥400 g/mil and a machine direction (MD) tear strength of ≥400 g/mil.

An embodiment of the disclosure is a film layer having a thickness of from 0.5 to 10 mil, wherein the film layer satisfies at least one of the following relationships:

area of hot tack window (AHTW)>−2.0981 (machine direction (MD) 1% secant modulus)+ 564.28;    i)

wherein the AHTW is measured at a film thickness of about 2 mil, and the machine direction (MD) 1% secant modulus is measured at a film thickness of about 1 mil;

oxygen transmission rate (OTR)>−5.4297 (machine direction (MD) 1% secant modulus)+1767.8;    ii)

wherein the OTR is measured at a film thickness of about 1 mil, and the machine direction (MD) 1% secant modulus is measured at a film thickness of about 1 mil; and seal initiation temperature (SIT)<0.366 (machine direction (MD) 1% secant modulus)+22.509.    iii)

wherein the SIT is measured at a film thickness of about 2 mil, and the machine direction (MD) 1% secant modulus is measured at a film thickness of about 1 mil.

An embodiment of the disclosure is a film layer having a thickness of from 0.5 to 10 mil, wherein the film layer satisfies each of the following relationships:

area of hot tack window (AHTW)>−2.0981 (machine direction (MD) 1% secant modulus)+ 564.28;    i)

wherein the AHTW is measured at a film thickness of about 2 mil, and the machine direction (MD) 1% secant modulus is measured at a film thickness of about 1 mil;

oxygen transmission rate (OTR)−5.4297 (machine direction (MD) 1% secant modulus)+1767.8;    ii)

wherein the OTR is measured at a film thickness of about 1 mil, and the machine direction (MD) 1% secant modulus is measured at a film thickness of about 1 mil; and seal initiation temperature (SIT)<0.366 (machine direction (MD) 1% secant modulus)+22.509;    iii)

wherein the SIT is measured at a film thickness of about 2 mil, and the machine direction (MD) 1% secant modulus is measured at a film thickness of about 1 mil.

DEFINITION OF TERMS

Figure 1:
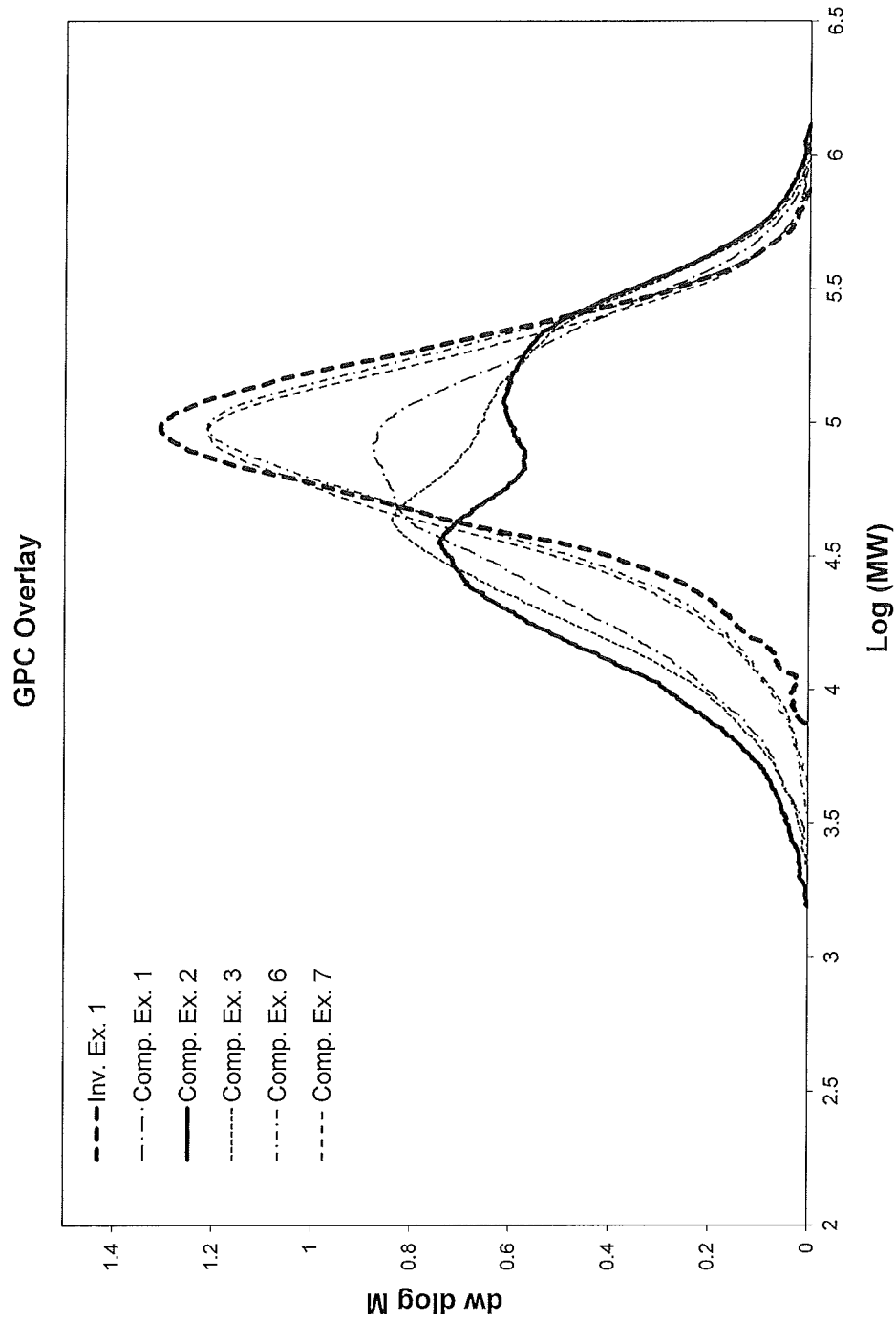
FIG. 1 shows the gel permeation chromatographs (GPC) with refractive index detection of a polyethylene composition made according to the present disclosure as well as for some comparative polyethylenes.

Other than in the examples or where otherwise indicated, all numbers or expressions referring to quantities of ingredients, extrusion conditions, etc., used in the specification and claims are to be understood as modified in all instances by the term "about." Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

As used herein, the term "monomer" refers to a small molecule that may chemically react and become chemically bonded with itself or other monomers to form a polymer.

As used herein, the term "α-olefin" or "alpha-olefin" is used to describe a monomer having a linear hydrocarbon chain containing from 3 to 20 carbon atoms having a double bond at one end of the chain; an equivalent term is "linear α-olefin".

As used herein, the term "polyethylene" or "ethylene polymer", refers to macromolecules produced from ethylene monomers and optionally one or more additional monomers; regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. An "ethylene homopolymer" is made using only ethylene as a polymerizable monomer. The term "copolymer" refers to a polymer that contains two or more types of monomer. An "ethylene copolymer" is made using ethylene and one or more other types of polymerizable monomer. Common polyethylenes include high density polyethylene (HDPE), medium density polyethylene (MDPE), linear low density polyethylene (LLDPE), very low density polyethylene (VLDPE), ultralow density polyethylene (ULDPE), plastomer and elastomers. The term polyethylene also includes polyethylene terpolymers which may include two or more comonomers in addition to ethylene. The term polyethylene also includes combinations of, or blends of, the polyethylenes described above.

The term "heterogeneously branched polyethylene" refers to a subset of polymers in the ethylene polymer group that are produced using a heterogeneous catalyst system; non-limiting examples of which include Ziegler-Natta or chromium catalysts, both of which are well known in the art.

The term "homogeneously branched polyethylene" refers to a subset of polymers in the ethylene polymer group that are produced using single-site catalysts; non-limiting examples of which include metallocene catalysts, phosphinimine catalysts, and constrained geometry catalysts all of which are well known in the art.

Typically, homogeneously branched polyethylenes have narrow molecular weight distributions, for example gel permeation chromatography (GPC) $M_w/M_n$ values of less than 2.8, especially less than about 2.3, although exceptions may arise; $M_w$ and $M_n$ refer to weight and number average molecular weights, respectively. In contrast, the $M_w/M_n$ of heterogeneously branched ethylene polymers are typically greater than the $M_w/M_n$ of homogeneous polyethylene. In general, homogeneously branched ethylene polymers also have a narrow comonomer distribution, i.e. each macromolecule within the molecular weight distribution has a similar comonomer content. Frequently, the composition distribution breadth index "CDBI" is used to quantify how the comonomer is distributed within an ethylene polymer, as well as to differentiate ethylene polymers produced with different catalysts or processes. The "$CDBI_{50}$" is defined as the percent of ethylene polymer whose composition is within 50 weight percent (wt %) of the median comonomer composition; this definition is consistent with that described in WO 93/03093 assigned to Exxon Chemical Patents Inc. The $CDBI_{50}$ of an ethylene interpolymer can be calculated from TREF curves (Temperature Rising Elution Fractionation); the TREF method is described in Wild, et al., J. Polym. Sci., Part B, Polym. Phys., Vol. (3), pages 441-455. Typically the $CDBI_{50}$ of homogeneously branched ethylene polymers are greater than about 70% or greater than about 75%. In contrast, the $CDBI_{50}$ of α-olefin containing heterogeneously branched ethylene polymers are generally lower than the $CDBI_{50}$ of homogeneous ethylene polymers. For example, the $CDBI_{50}$ of a heterogeneously branched ethylene polymer may be less than about 75%, or less than about 70%.

It is well known to those skilled in the art, that homogeneously branched ethylene polymers are frequently further subdivided into "linear homogeneous ethylene polymers" and "substantially linear homogeneous ethylene polymers". These two subgroups differ in the amount of long chain branching: more specifically, linear homogeneous ethylene polymers have less than about 0.01 long chain branches per 1000 carbon atoms; while substantially linear ethylene polymers have greater than about 0.01 to about 3.0 long chain branches per 1000 carbon atoms. A long chain branch is macromolecular in nature, i.e. similar in length to the macromolecule that the long chain branch is attached to. Hereafter, in this disclosure, the term "homogeneously branched polyethylene" or "homogeneously branched ethylene polymer" refers to both linear homogeneous ethylene polymers and substantially linear homogeneous ethylene polymers.

The term "thermoplastic" refers to a polymer that becomes liquid when heated, will flow under pressure and solidify when cooled. Thermoplastic polymers include ethylene polymers as well as other polymers used in the plastic industry; non-limiting examples of other polymers commonly used in film applications include barrier resins (EVOH), tie resins, polyethylene terephthalate (PET), polyamides and the like.

As used herein the term "monolayer film" refers to a film containing a single layer of one or more thermoplastics.

As used herein, the terms "hydrocarbyl", "hydrocarbyl radical" or "hydrocarbyl group" refers to linear or cyclic, aliphatic, olefinic, acetylenic and aryl (aromatic) radicals comprising hydrogen and carbon that are deficient by one hydrogen.

As used herein, an "alkyl radical" includes linear, branched and cyclic paraffin radicals that are deficient by one hydrogen radical; non-limiting examples include methyl (—CH$_3$) and ethyl (—CH$_2$CH$_3$) radicals. The term "alkenyl radical" refers to linear, branched and cyclic hydrocarbons containing at least one carbon-carbon double bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "arylalkyl" group is an alkyl group having an aryl group pendant there from; non-limiting examples include benzyl, phenethyl and tolylmethyl; an "alkylaryl" is an aryl group having one or more alkyl groups pendant there from; non-limiting examples include tolyl, xylyl, mesityl and cumyl.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like. The term "heterocyclic" refers to ring systems having a carbon backbone that comprise from 1 to 3 atoms selected from the group consisting of boron, aluminum, silicon, germanium, nitrogen, phosphorous, oxygen and sulfur.

As used herein the term "unsubstituted" means that hydrogen radicals are bounded to the molecular group that follows the term unsubstituted. The term "substituted" means that the group following this term possesses one or more moieties that have replaced one or more hydrogen radicals in any position within the group; non-limiting examples of moieties include halogen radicals (F, Cl, Br), hydroxyl groups, carbonyl groups, carboxyl groups, amine groups, phosphine groups, alkoxy groups, phenyl groups, naphthyl groups, C$_1$ to C$_{30}$ alkyl groups, C$_2$ to C$_{30}$ alkenyl groups, and combinations thereof. Non-limiting examples of substituted alkyls and aryls include: acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals and combinations thereof.

DETAILED DESCRIPTION OF THE PREFERRED EMBODIMENTS

In the present disclosure, a polyethylene composition will comprise at least the following types of polymers: a first polyethylene which is an ethylene copolymer and which has a Mw/Mn of less than about 2.3; a second polyethylene which is an ethylene copolymer or an ethylene homopolymer which is different from the first polyethylene and which has a Mw/Mn of less than about 2.3; and a third polyethylene which is different from the first polyethylene and the second polyethylene and which is an ethylene copolymer or an ethylene homopolymer which has a Mw/Mn of less than about 2.3. Each of these polyethylene components, and the polyethylene composition of which they are each a part are further described below.

The First Polyethylene

In an embodiment of the disclosure, the first polyethylene is made with a single site catalyst, non-limiting examples of which include phosphinimine catalysts, metallocene catalysts, and constrained geometry catalysts, all of which are well known in the art.

In an embodiment of the disclosure, the first polyethylene is an ethylene copolymer. Suitable alpha-olefins which may be copolymerized with ethylene to make an ethylene copolymer include 1-propene, 1-butene, 1-pentene, 1-hexene and 1-octene.

In an embodiment of the disclosure, the first polyethylene is a homogeneously branched ethylene copolymer.

In an embodiment of the disclosure, the first polyethylene is an ethylene/1-octene copolymer.

In an embodiment of the disclosure, the first polyethylene is made with a phosphinimine catalyst.

In an embodiment of the disclosure, a phosphinimine catalyst is represented by formula:

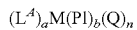

wherein (L$^A$) represents is cyclopentadienyl-type ligand; M represents a metal atom selected from the group consisting of Ti, Zr, and Hf; Pl represents a phosphinimine ligand; Q represents an activatable ligand; a is 0 or 1; b is 1 or 2; (a+b)=2; n is 1 or 2, and; the sum of (a+b+n) equals the valance of the metal M.

As used herein, the term "cyclopentadienyl-type" ligand is meant to include ligands which contain at least one five-carbon ring which is bonded to the metal via eta-5 (or in some cases eta-3) bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions of indenyl and fluorenyl ligands are also contemplated for use in the current disclosure, so long as the five-carbon ring which bonds to the metal via eta-5 (or in some cases eta-3) bonding remains intact. Substituents for a cyclopentadienyl ligand, an indenyl ligand (or hydrogenated version thereof) and a fluorenyl ligand (or hydrogenated version thereof) may be selected from the group consisting of a C$_{1-30}$ hydrocarbyl radical (which hydrocarbyl radical may be unsubstituted or further substituted by for example a halide and/or a hydrocarbyl group; for example a suitable substituted C$_{1-30}$ hydrocarbyl radical is a pentafluorobenzyl group such as —CH$_2$C$_6$F$_5$); a halogen atom; a C$_{1-8}$ alkoxy radical; a C$_{6-10}$ aryl or aryloxy radical (each of which may be further substituted by for example a halide and/or a hydrocarbyl group); an amido radical which is unsubstituted or substituted by up to two C$_{1-8}$ alkyl radicals; a phosphido radical which is unsubstituted or substituted by up to two C$_{1-8}$ alkyl radicals; a silyl radical of the formula —Si(R')$_3$ wherein each R' is independently selected from the group consisting of hydrogen, a C$_{1-8}$ alkyl or alkoxy radical, C$_{6-10}$ aryl or aryloxy radicals; and a germanyl radical of the formula —Ge(R')$_3$ wherein R' is as defined directly above.

The phosphinimine ligand, Pl, is defined by formula:

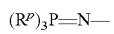

wherein the R$^p$ groups are independently selected from: a hydrogen atom; a halogen atom; C$_{1-20}$ hydrocarbyl radicals which are unsubstituted or substituted with one or more halogen atom(s); a C$_{1-8}$ alkoxy radical; a C$_{6-10}$ aryl radical; a C$_{6-10}$ aryloxy radical; an amido radical; a silyl radical of formula —Si(R$^s$)$_3$, wherein the R$^s$ groups are independently selected from, a hydrogen atom, a C$_{1-8}$ alkyl or alkoxy radical, a C$_{6-10}$ aryl radical, a C$_{6-10}$ aryloxy radical, or a germanyl radical of formula —Ge(R$^G$)$_3$, wherein the R$^G$ groups are defined as R$^s$ is defined in this paragraph.

In an embodiment of the disclosure, the metal, M in the phosphinimine catalyst is titanium, Ti.

In an embodiment of the disclosure, the single site catalyst used to make the first polyethylene is cyclopentadienyl tri(tertiarybutyl)phosphinimine titanium dichloride, Cp((t-Bu)$_3$PN)TiCl$_2$.

In an embodiment of the disclosure, the first polyethylene is made with a metallocene catalyst.

In an embodiment of the disclosure, the first polyethylene is made with a bridged metallocene catalyst.

In an embodiment of the disclosure, the first polyethylene is made with a bridged metallocene catalyst having the formula I:

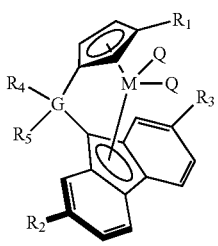

(I)

In Formula (I): M is a group 4 metal selected from titanium, zirconium or hafnium; G is a group 14 element selected from carbon, silicon, germanium, tin or lead; R$_1$ is a hydrogen atom, a C$_{1-20}$ hydrocarbyl radical, a C$_{1-20}$ alkoxy radical or a C$_{6-10}$ aryl oxide radical; R$_2$ and R$_3$ are independently selected from a hydrogen atom, a C$_{1-20}$ hydrocarbyl radical, a C$_{1-20}$ alkoxy radical or a C$_{6-10}$ aryl oxide radical; R$_4$ and R$_5$ are independently selected from a hydrogen atom, a C$_{1-20}$ hydrocarbyl radical, a C$_{1-20}$ alkoxy radical or a C$_{6-10}$ aryl oxide radical; and Q is independently an activatable leaving group ligand.

In the current disclosure, the term "activatable", means that the ligand Q may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand Q may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins.

In embodiments of the present disclosure, the activatable ligand, Q is independently selected from the group consisting of a hydrogen atom; a halogen atom; a C$_{1-20}$ hydrocarbyl radical, a C$_{1-20}$ alkoxy radical, and a C$_{6-10}$ aryl or aryloxy radical, where each of the hydrocarbyl, alkoxy, aryl, or aryl oxide radicals may be unsubstituted or further substituted by one or more halogen or other group; a C$_{1-8}$ alkyl; a C$_{1-8}$ alkoxy; a C$_{6-10}$ aryl or aryloxy; an amido or a phosphido radical, but where Q is not a cyclopentadienyl. Two Q ligands may also be joined to one another and form for example, a substituted or unsubstituted diene ligand (e.g. 1,3-butadiene); or a delocalized heteroatom containing group such as an acetate or acetamidinate group. In a convenient embodiment of the disclosure, each Q is independently selected from the group consisting of a halide atom, a C$_{1-4}$ alkyl radical and a benzyl radical. Particularly suitable activatable ligands Q are monoanionic such as a halide (e.g. chloride) or a hydrocarbyl (e.g. methyl, benzyl).

In an embodiment of the disclosure, the single site catalyst used to make the first polyethylene is diphenylmethylene (cyclopentadienyl)(2,7-di-t-butylfuorenyl)hafnium dichloride having the molecular formula: [(2,7-tBu$_2$Flu)Ph$_2$C(Cp)HfCl$_2$].

In an embodiment of the disclosure the single site catalyst used to make the first polyethylene has is diphenylmethylene (cyclopentadienyl)(2,7-di-t-butylfuorenyl)hafnium dimethyl having the molecular formula [(2,7-tBu$_2$Flu)Ph$_2$C(Cp)HfMe$_2$].

In addition to the single site catalyst molecule per se, an active single site catalyst system may further comprise one or more of the following: an alkylaluminoxane co-catalyst and an ionic activator. The single site catalyst system may also optionally comprise a hindered phenol.

Although the exact structure of alkylaluminoxane is uncertain, subject matter experts generally agree that it is an oligomeric species that contain repeating units of the general formula:

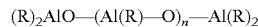

(R)$_2$AlO—(Al(R)—O)$_n$—Al(R)$_2$ where the R groups may be the same or different linear, branched or cyclic hydrocarbyl radicals containing 1 to 20 carbon atoms and n is from 0 to about 50. A non-limiting example of an alkylaluminoxane is methylaluminoxane (or MAO) wherein each R group is a methyl radical.

In an embodiment of the disclosure, R of the alkylaluminoxane, is a methyl radical and m is from 10 to 40.

In an embodiment of the disclosure, the co-catalyst is modified methylaluminoxane (MMAO).

It is well known in the art, that the alkylaluminoxane can serve dual roles as both an alkylator and an activator. Hence, an alkylaluminoxane co-catalyst is often used in combination with activatable ligands such as halogens.

In general, ionic activators are comprised of a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas shown below;

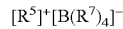

[R$^5$]$^+$[B(R$^7$)$_4$]$^-$ where B represents a boron atom, R$^5$ is an aromatic hydrocarbyl (e.g. triphenyl methyl cation) and each R$^7$ is independently selected from phenyl radicals which are unsubstituted or substituted with from 3 to 5 substituents selected from fluorine atoms, C$_{1-4}$ alkyl or alkoxy radicals which are unsubstituted or substituted by fluorine atoms; and a silyl radical of formula —Si(R$^9$)$_3$, where each R$^9$ is independently selected from hydrogen atoms and C$_{1-4}$ alkyl radicals, and

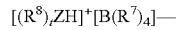

[(R$^8$)$_t$ZH]$^+$[B(R$^7$)$_4$]— where B is a boron atom, H is a hydrogen atom, Z is a nitrogen or phosphorus atom, t is 2 or 3 and R$^8$ is selected from C$_{1-8}$ alkyl radicals, phenyl radicals which are unsubstituted or substituted by up to three C$_{1-4}$ alkyl radicals, or one R$^8$ taken together with the nitrogen atom may form an anilinium radical and R$^7$ is as defined above.

In both formula a non-limiting example of R$^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl)boron, tripropylammonium tetra(phenyl)boron, tri(n-butyl)ammonium tetra (phenyl)boron, trimethylammonium tetra(p-tolyl)boron, trimethylammonium tetra(o-tolyl)boron, tributylammonium tetra(pentafluorophenyl)boron, tripropylammonium tetra(o, p-dimethylphenyl)boron, tributylammonium tetra(m,m-dimethylphenyl)boron, tributylammonium tetra(p-trifluoromethylphenyl)boron, tributylammonium tetra (pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)$_n$-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4, 5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

Non-limiting example of hindered phenols include butylated phenolic antioxidants, butylated hydroxytoluene, 2,6-di-tertiarybutyl-4-ethyl phenol, 4,4'-methylenebis (2,6-di-tertiary-butylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

To produce an active single site catalyst system the quantity and mole ratios of the three or four components: the single site catalyst, the alkylaluminoxane, the ionic activator, and the optional hindered phenol are optimized.

In an embodiment of the disclosure, the single site catalyst used to make the first polyethylene produces no long chain branches, and the first polyethylene will contain no measurable amounts of long chain branches.

In an embodiment of the disclosure, the single site catalyst used to make the first polyethylene produces long chain branches, and the first polyethylene will contain long chain branches, hereinafter 'LCB'. LCB is a well-known structural phenomenon in polyethylenes and well known to those of ordinary skill in the art. Traditionally, there are three methods for LCB analysis, namely, nuclear magnetic resonance spectroscopy (NMR), for example see J. C. Randall, J Macromol. Sci., Rev. Macromol. Chem. Phys. 1989, 29, 201; triple detection SEC equipped with a DRI, a viscometer and a low-angle laser light scattering detector, for example see W. W. Yau and D. R. Hill, Int. J. Polym. Anal. Charact. 1996; 2:151; and rheology, for example see W. W. Graessley, Acc. Chem. Res. 1977, 10, 332-339. In this disclosure, a long chain branch is macromolecular in nature, i.e. long enough to be seen in an NMR spectra, triple detector SEC experiments or rheological experiments.

In embodiments of the disclosure, the upper limit on the molecular weight distribution, $M_w/M_n$ of the first polyethylene may be about 2.8, or about 2.5, or about 2.4, or about 2.3, or about 2.2. In embodiments of the disclosure, the lower limit on the molecular weight distribution, $M_w/M_n$ of the first polyethylene may be about 1.4, or about 1.6, or about 1.7, or about 1.8, or about 1.9.

In embodiments of the disclosure, the first polyethylene has a molecular weight distribution, $M_w/M_n$ of <2.3, or <2.1, or <2.0 or about 2.0. In embodiments of the disclosure, the first polyethylene has a molecular weight distribution, $M_w/M_n$ of from about 1.7 to about 2.2.

In an embodiment of the disclosure, the first polyethylene has from 1 to 200 short chain branches per thousand carbon atoms ($SCB_{PE-1}$). In further embodiments, the first polyethylene has from 3 to 150 short chain branches per thousand carbon atoms ($SCB_{PE-1}$), or from 5 to 100 short chain branches per thousand carbon atoms ($SCB_{PE-1}$), or from 10 to 100 short chain branches per thousand carbon atoms ($SCB_{PE-1}$), or from 5 to 75 short chain branches per thousand carbon atoms ($SCB_{PE-1}$), or from 10 to 75 short chain branches per thousand carbon atoms ($SCB_{PE-1}$), or from 15 to 75 short chain branches per thousand carbon atoms ($SCB_{PE-1}$), or from 20 to 75 short chain branches per thousand carbon atoms ($SCB_{PE-1}$). In still further embodiments, the first polyethylene has from 15 to 60 short chain branches per thousand carbon atoms ($SCB_{PE-1}$), or from 15 to 60 short chain branches per thousand carbon atoms ($SCB_{PE-1}$), or from 20 to 50 short chain branches per thousand carbon atoms ($SCB_{PE-1}$), or from 25 to 60 short chain branches per thousand carbon atoms ($SCB_{PE-1}$), or from 15 to 50 short chain branches per thousand carbon atoms ($SCB_{PE-1}$), or from 20 to 50 short chain branches per thousand carbon atoms ($SCB_{PE-1}$).

The short chain branching (i.e. the short chain branching per thousand carbons, $SCB_{PE-1}$) is the branching due to the presence of an alpha-olefin comonomer in the polyethylene and will for example have two carbon atoms for a 1-butene comonomer, or four carbon atoms for a 1-hexene comonomer, or six carbon atoms for a 1-octene comonomer, etc.

In an embodiment of the disclosure, the number of short chain branches per thousand carbon atoms in the first polyethylene ($SCB_{PE-1}$), is greater than the number of short chain branches per thousand carbon atoms in the second polyethylene ($SCB_{PE-2}$).

In an embodiment of the disclosure, the number of short chain branches per thousand carbon atoms in the first polyethylene ($SCB_{PE-1}$), is greater than the number of short chain branches per thousand carbon atoms in the third polyethylene ($SCB_{PE-3}$).

In an embodiment of the disclosure, the number of short chain branches per thousand carbon atoms in the first polyethylene ($SCB_{PE-1}$), is greater than the number of short chain branches per thousand carbon atoms in each of the second polyethylene ($SCB_{PE-2}$) and the third polyethylene ($SCB_{PE-3}$).

In embodiments of the disclosure, the upper limit on the density, d1 of the first polyethylene may be about 0.975 g/cm$^3$; in some cases about 0.965 g/cm$^3$ and; in other cases about 0.955 g/cm$^3$. In embodiments of the disclosure, the lower limit on the density, d1 of the first polyethylene may be about 0.855 g/cm$^3$, in some cases about 0.865 g/cm$^3$, and; in other cases about 0.875 g/cm$^3$.

In embodiments of the disclosure the density, d1 of the first polyethylene may be from about 0.855 to about 0.965 g/cm$^3$, or from 0.865 g/cm$^3$ to about 0.965 g/cm$^3$, or from about 0.870 g/cm$^3$ to about 0.960 g/cm$^3$, or from about 0.865 g/cm³ to 0.950 g/cm³, or from about 0.865 g/cm³ to about 0.940 g/cm³, or from about 0.865 g/cm³ to about 0.936 g/cm³, or from about 0.860 g/cm³ to about 0.932 g/cm³, or from about 0.865 g/cm³ to about 0.926 g/cm³, or from about 0.865 g/cm³ to about 0.921 g/cm³, or from about 0.865 g/cm³ to about 0.918 g/cm³, or from about 0.860 g/cm³ to about 0.916 g/cm³, or from about 0.865 g/cm³ to about 0.916 g/cm³, or from about 0.870 g/cm³ to about 0.916 g/cm³, or from about 0.865 g/cm³ to about 0.912 g/cm³, or from about 0.865 g/cm³ to about 0.910 g/cm³, or from about 0.865 g/cm³ to about 0.905 g/cm³, or from about 0.865 g/cm³ to about 0.900 g/cm³, or from about 0.855 g/cm³ to about 0.900 g/cm³, or from about 0.855 g/cm³ to about 0.905 g/cm³, or from about 0.855 g/cm³ to about 0.910 g/cm³.

In embodiments of the disclosure, the upper limit on the $CDBI_{50}$ of the first polyethylene may be about 98 weight %, in other cases about 95 wt % and in still other cases about 90 wt %. In embodiments of the disclosure, the lower limit on the $CDBI_{50}$ of the first polyethylene may be about 70 weight %, in other cases about 75 wt % and in still other cases about 80 wt %.

In embodiments of the disclosure the melt index of the first polyethylene $I_2^1$ may be from about 0.01 dg/min to about 1000 dg/min, or from about 0.01 dg/min to about 500 dg/min, or from about 0.01 dg/min to about 100 dg/min, or from about 0.01 dg/min to about 50 dg/min, or from about 0.01 dg/min to about 25 dg/min, or from about 0.01 dg/min to about 10 dg/min, or from about 0.01 dg/min to about 5 dg/min, or from about 0.01 dg/min to about 3 dg/min, or from about 0.01 dg/min to about 1 dg/min, or less than about 5 dg/min, or less than about 3 dg/min, or less than about 1.0 dg/min, or less than about 0.75 dg/min.

In an embodiment of the disclosure, the first polyethylene has a weight average molecular weight, $M_w$ of from about 50,000 to about 300,000, or from about 50,000 to about 250,000, or from about 60,000 to about 250,000, or from about 70,000 to about 250,000 or from about 60,000 to about 220,000, or from about 70,000 to about 200,000, or from about 75,000 to about 200,000, or from about 75,000 to about 175,000; or from about 70,000 to about 175,000, or from about 70,000 to about 150,000.

In an embodiment of the disclosure, the first polyethylene has a weight average molecular weight, $M_w$ which is greater than the weight average molecular weight, $M_w$ of the second polyethylene.

In an embodiment of the disclosure, the first polyethylene has a weight average molecular weight, $M_w$ which is greater than the weight average molecular weight, $M_w$ of the third polyethylene.

In an embodiment of the disclosure, the first polyethylene has a weight average molecular weight, $M_w$ which is greater than the weight average molecular weight, $M_w$ of both the second polyethylene and the third polyethylene.

In an embodiment of the disclosure, the first polyethylene has a weight average molecular weight, $M_w$ which is within 30 percent of the weight average molecular weight, $M_w$ of the second polyethylene. For clarity, this means that: the absolute difference between the weight average molecular weight, $M_w$ of the first polyethylene and the weight average molecular weight, $M_w$ of the second polyethylene divided by the weight average molecular weight, $M_w$ of the second polyethylene and converted to a percentage (i.e. [|Mw1−Mw2|/Mw2]×100%) is within 30 percent.

In an embodiment of the disclosure, the first polyethylene has a weight average molecular weight, $M_w$ which is within 25 percent of the weight average molecular weight, $M_w$ of the second polyethylene. In an embodiment of the disclosure, the first polyethylene has a weight average molecular weight, $M_w$ which is within 20 percent of the weight average molecular weight, $M_w$ of the second polyethylene. In an embodiment of the disclosure, the first polyethylene has a weight average molecular weight, $M_w$ which is within 15 percent of the weight average molecular weight, $M_w$ of the second polyethylene. In an embodiment of the disclosure, the first polyethylene has a weight average molecular weight, $M_w$ which is within 10 percent of the weight average molecular weight, $M_w$ of the second polyethylene.

In an embodiment of the disclosure, the first polyethylene has a weight average molecular weight, $M_w$ which is within 25 percent of the weight average molecular weight, $M_w$ of the third polyethylene. For clarity, this means that: the absolute difference between the weight average molecular weight, $M_w$ of the first polyethylene and the weight average molecular weight, $M_w$ of the third polyethylene divided by the weight average molecular weight, $M_w$ of the third polyethylene and converted to a percentage (i.e. [|Mw1−Mw3|/Mw3]×100%) is within 25 percent.

In an embodiment of the disclosure, the first polyethylene has a weight average molecular weight, $M_w$ which is within 20 percent of the weight average molecular weight, $M_w$ of the third polyethylene. In an embodiment of the disclosure, the first polyethylene has a weight average molecular weight, $M_w$ which is within 15 percent of the weight average molecular weight, $M_w$ of the third polyethylene. In an embodiment of the disclosure, the first polyethylene has a weight average molecular weight, $M_w$ which is within 10 percent of the weight average molecular weight, $M_w$ of the third polyethylene. In an embodiment of the disclosure, the first polyethylene has a weight average molecular weight, $M_w$ which is within 5 percent of the weight average molecular weight, $M_w$ of the third polyethylene.

In embodiments of the disclosure, the upper limit on the weight percent (wt %) of the first polyethylene in the polyethylene composition (i.e. the weight percent of the first polyethylene based on the total weight of the first, the second and the third polyethylene) may be about 85 wt %, or about 80 wt %, or about 75 wt %, or about 70 wt %, or about 65 wt %, or about 60 wt %, or about 55 wt %. In embodiments of the disclosure, the lower limit on the wt % of the first polyethylene in the polyethylene composition may be about 10 wt %, or about 15 wt %, or about 20 wt %, or about 25 wt %, or about 30 wt %, or about 35 wt % or in other cases about 40 wt %.

The Second Polyethylene

In an embodiment of the disclosure, the second polyethylene is made with a single site catalyst, non-limiting examples of which include phosphinimine catalysts, metallocene catalysts, and constrained geometry catalysts, all of which are well known in the art.

In an embodiment of the disclosure, the second polyethylene is an ethylene homopolymer.

In an embodiment of the disclosure, the second polyethylene is an ethylene copolymer. Suitable alpha-olefins which may be copolymerized with ethylene to make an ethylene copolymer include 1-propene, 1-butene, 1-pentene, 1-hexene and 1-octene.

In an embodiment of the disclosure, the second polyethylene is a homogeneously branched ethylene copolymer.

In an embodiment of the disclosure, the second polyethylene is an ethylene/1-octene copolymer.

In an embodiment of the disclosure, the second polyethylene is made with a phosphinimine catalyst.

In an embodiment of the disclosure, a phosphinimine catalyst is represented by formula:

$(L^A)_aM(Pl)_b(Q)_n$ wherein ($L^A$) represents is cyclopentadienyl-type ligand; M represents a metal atom selected from the group consisting of Ti, Zr, and Hf; Pl represents a phosphinimine ligand; Q represents an activatable ligand; a is 0 or 1; b is 1 or 2; (a+b)=2; n is 1 or 2, and; the sum of (a+b+n) equals the valance of the metal M.

As used herein, the term "cyclopentadienyl-type" ligand is meant to include ligands which contain at least one five-carbon ring which is bonded to the metal via eta-5 (or in some cases eta-3) bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions of indenyl and fluorenyl ligands are also contemplated for use in the current disclosure, so long as the five-carbon ring which bonds to the metal via eta-5 (or in some cases eta-3) bonding remains intact. Substituents for a cyclopentadienyl ligand, an indenyl ligand (or hydrogenated version thereof) and a fluorenyl ligand (or hydrogenated version thereof) may be selected from the group consisting of a $C_{1-30}$ hydrocarbyl radical (which hydrocarbyl radical may be unsubstituted or further substituted by for example a halide and/or a hydrocarbyl group; for example a suitable substituted $C_{1-30}$ hydrocarbyl radical is a pentafluorobenzyl group such as —$CH_2C_6F_5$); a halogen atom; a $C_{1-8}$ alkoxy radical; a $C_{6-10}$ aryl or aryloxy radical (each of which may be further substituted by for example a halide and/or a hydrocarbyl group); an amido radical which is unsubstituted or substituted by up to two $C_{1-8}$ alkyl radicals; a phosphido radical which is unsubstituted or substituted by up to two $C_{1-8}$ alkyl radicals; a silyl radical of the formula —$Si(R')_3$ wherein each R' is independently selected from the group consisting of hydrogen, a $C_{1-8}$ alkyl or alkoxy radical, $C_{6-10}$ aryl or aryloxy radicals; and a germanyl radical of the formula —$Ge(R')_3$ wherein R' is as defined directly above.

The phosphinimine ligand, Pl, is defined by formula:

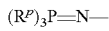

$(R^P)_3P=N—$ wherein the $R^P$ groups are independently selected from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula —$Si(R^s)_3$, wherein the $R^s$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula —$Ge(R^G)_3$, wherein the $R^G$ groups are defined as $R^s$ is defined in this paragraph.

In an embodiment of the disclosure, the metal, M in the phosphinimine catalyst is titanium, Ti.

In an embodiment of the disclosure, the single site catalyst used to make the second polyethylene is cyclopentadienyl tri(tertiarybutyl)phosphinimine titanium dichloride, Cp((t-Bu)$_3$PN)TiCl$_2$.

In an embodiment of the disclosure, the second polyethylene is made with a metallocene catalyst.

In an embodiment of the disclosure, the second polyethylene is made with a bridged metallocene catalyst.

In an embodiment of the disclosure, the second polyethylene is made with a bridged metallocene catalyst having the formula I:

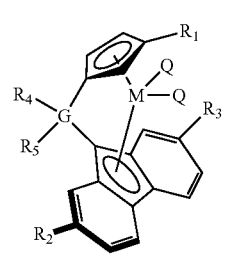

(I)

In Formula (I): M is a group 4 metal selected from titanium, zirconium or hafnium; G is a group 14 element selected from carbon, silicon, germanium, tin or lead; $R_1$ is a hydrogen atom, a $C_{1-20}$ hydrocarbyl radical, a $C_{1-20}$ alkoxy radical or a $C_{6-10}$ aryl oxide radical; $R_2$ and $R_3$ are independently selected from a hydrogen atom, a $C_{1-20}$ hydrocarbyl radical, a $C_{1-20}$ alkoxy radical or a $C_{6-10}$ aryl oxide radical; $R_4$ and $R_5$ are independently selected from a hydrogen atom, a $C_{1-20}$ hydrocarbyl radical, a $C_{1-20}$ alkoxy radical or a $C_{6-10}$ aryl oxide radical; and Q is independently an activatable leaving group ligand.

In the current disclosure, the term "activatable", means that the ligand Q may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand Q may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins.

In embodiments of the present disclosure, the activatable ligand, Q is independently selected from the group consisting of a hydrogen atom; a halogen atom; a $C_{1-20}$ hydrocarbyl radical, a $C_{1-20}$ alkoxy radical, and a $C_{6-10}$ aryl or aryloxy radical, where each of the hydrocarbyl, alkoxy, aryl, or aryl oxide radicals may be unsubstituted or further substituted by one or more halogen or other group; a $C_{1-8}$ alkyl; a $C_{1-8}$ alkoxy; a $C_{6-10}$ aryl or aryloxy; an amido or a phosphido radical, but where Q is not a cyclopentadienyl. Two Q ligands may also be joined to one another and form for example, a substituted or unsubstituted diene ligand (e.g. 1,3-butadiene); or a delocalized heteroatom containing group such as an acetate or acetamidinate group. In a convenient embodiment of the disclosure, each Q is independently selected from the group consisting of a halide atom, a $C_{1-4}$ alkyl radical and a benzyl radical. Particularly suitable activatable ligands Q are monoanionic such as a halide (e.g. chloride) or a hydrocarbyl (e.g. methyl, benzyl).

In an embodiment of the disclosure, the single site catalyst used to make the second polyethylene is diphenylmethylene (cyclopentadienyl)(2,7-di-t-butylfuorenyl)hafnium dichloride having the molecular formula: [(2,7-tBu$_2$Flu)Ph$_2$C(Cp)HfCl$_2$].

In an embodiment of the disclosure the single site catalyst used to make the second polyethylene has is diphenylmethylene(cyclopentadienyl)(2,7-di-t-butylfuorenyl)hafnium dimethyl having the molecular formula [(2,7-tBu$_2$Flu)Ph$_2$C(Cp)HfMe$_2$].

In addition to the single site catalyst molecule per se, an active single site catalyst system may further comprise one or more of the following: an alkylaluminoxane co-catalyst and an ionic activator. The single site catalyst system may also optionally comprise a hindered phenol.

Although the exact structure of alkylaluminoxane is uncertain, subject matter experts generally agree that it is an oligomeric species that contain repeating units of the general formula:

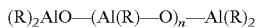

(R)$_2$AlO—(Al(R)—O)$_n$—Al(R)$_2$ where the R groups may be the same or different linear, branched or cyclic hydrocarbyl radicals containing 1 to 20 carbon atoms and n is from 0 to about 50. A non-limiting example of an alkylaluminoxane is methylaluminoxane (or MAO) wherein each R group is a methyl radical.

In an embodiment of the disclosure, R of the alkylaluminoxane, is a methyl radical and m is from 10 to 40.

In an embodiment of the disclosure, the co-catalyst is modified methylaluminoxane (MMAO).

It is well known in the art, that the alkylaluminoxane can serve dual roles as both an alkylator and an activator. Hence, an alkylaluminoxane co-catalyst is often used in combination with activatable ligands such as halogens.

In general, ionic activators are comprised of a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas shown below;

[R$^5$]$^+$[B(R$^7$)$_4$]$^-$ where B represents a boron atom, R$^5$ is an aromatic hydrocarbyl (e.g. triphenyl methyl cation) and each R$^7$ is independently selected from phenyl radicals which are unsubstituted or substituted with from 3 to 5 substituents selected from fluorine atoms, C$_{1-4}$ alkyl or alkoxy radicals which are unsubstituted or substituted by fluorine atoms; and a silyl radical of formula —Si(R$^9$)$_3$, where each R$^9$ is independently selected from hydrogen atoms and C$_{1-4}$ alkyl radicals, and

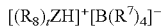

[(R$_8$)$_t$ZH]$^+$[B(R$^7$)$_4$]$^-$ where B is a boron atom, H is a hydrogen atom, Z is a nitrogen or phosphorus atom, t is 2 or 3 and R$^8$ is selected from C$_{1-8}$ alkyl radicals, phenyl radicals which are unsubstituted or substituted by up to three C$_{1-4}$ alkyl radicals, or one R$^8$ taken together with the nitrogen atom may form an anilinium radical and R$^7$ is as defined above.

In both formula a non-limiting example of R$^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl),$_n$-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium) tetrakis(2,3,4,5 tetrafluorophenyl)borate. Readily available commercial ionic activators include N,N-dimethylanilinium tetrakispentafluorophenyl borate, and triphenylmethylium tetrakispentafluorophenyl borate.

Non-limiting example of hindered phenols include butylated phenolic antioxidants, butylated hydroxytoluene, 2,6-di-tertiarybutyl-4-ethyl phenol, 4,4'-methylenebis (2,6-di-tertiary-butylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

To produce an active single site catalyst system the quantity and mole ratios of the three or four components: the single site catalyst, the alkylaluminoxane, the ionic activator, and the optional hindered phenol are optimized.

In an embodiment of the disclosure, the single site catalyst used to make the second polyethylene produces no long chain branches, and the second polyethylene will contain no measurable amounts of long chain branches.

In an embodiment of the disclosure, the single site catalyst used to make the second polyethylene produces long chain branches, and the second polyethylene will contain long chain branches, hereinafter 'LCB'. LCB is a well-known structural phenomenon in polyethylenes and well known to those of ordinary skill in the art. Traditionally, there are three methods for LCB analysis, namely, nuclear magnetic resonance spectroscopy (NMR), for example see J. C. Randall, J Macromol. Sci., Rev. Macromol. Chem. Phys. 1989, 29, 201; triple detection SEC equipped with a DRI, a viscometer and a low-angle laser light scattering detector, for example see W. W. Yau and D. R. Hill, Int. J. Polym. Anal. Charact. 1996; 2:151; and rheology, for example see W. W. Graessley, Acc. Chem. Res. 1977, 10, 332-339. In this disclosure, a long chain branch is macromolecular in nature, i.e. long enough to be seen in an NMR spectra, triple detector SEC experiments or rheological experiments.

In embodiments of the disclosure, the upper limit on the molecular weight distribution, $M_w/M_n$ of the second polyethylene may be about 2.8, or about 2.5, or about 2.4, or about 2.3, or about 2.2. In embodiments of the disclosure, the lower limit on the molecular weight distribution, $M_w/M_n$ of the second polyethylene may be about 1.4, or about 1.6, or about 1.7, or about 1.8, or about 1.9.

In embodiments of the disclosure, the second polyethylene has a molecular weight distribution, $M_w/M_n$ of <2.3, or <2.1, or <2.0 or about 2.0. In embodiments of the disclosure, the second polyethylene has a molecular weight distribution, $M_w/M_n$ of from about 1.7 to about 2.2.

In an embodiment of the disclosure, the second polyethylene has from 0 to 100 short chain branches per thousand carbon atoms ($SCB_{PE-2}$). In further embodiments, the second polyethylene has from 0 to 30 short chain branches per thousand carbon atoms ($SCB_{PE-2}$), or from 0 to 20 short chain branches per thousand carbon atoms ($SCB_{PE-2}$), or from 0 to 15 short chain branches per thousand carbon atoms ($SCB_{PE-2}$), or from 0 to 10 short chain branches per thousand carbon atoms ($SCB_{PE-2}$), or from 0 to 5 short chain branches per thousand carbon atoms ($SCB_{PE-2}$), or fewer than 5 short chain branches per thousand carbon atoms ($SCB_{PE-2}$), or fewer than 3 short chain branches per thousand carbon atoms ($SCB_{PE-2}$), or fewer than 1 short chain branches per thousand carbon atoms ($SCB_{PE2}$), or about zero short chain branches per thousand carbon atoms ($SCB_{PE-2}$).

The short chain branching (i.e. the short chain branching per thousand carbons, $SCB_{PE-2}$) is the branching due to the presence of an alpha-olefin comonomer in the polyethylene and will for example have two carbon atoms for a 1-butene comonomer, or four carbon atoms for a 1-hexene comonomer, or six carbon atoms for a 1-octene comonomer, etc.

In embodiments of the disclosure, the upper limit on the density, d2 of the second polyethylene may be about 0.985 g/cm$^3$; in some cases about 0.975 g/cm$^3$ and; in other cases about 0.965 g/cm$^3$. In embodiments of the disclosure, the lower limit on the density, d2 of the second polyethylene may be about 0.916 g/cm$^3$, or about 0.921 g/cm$^3$, in some cases about 0.930 g/cm$^3$, and; in other cases about 0.940 g/cm$^3$.

In embodiments of the disclosure the density, d2 of the second polyethylene may be from about 0.916 g/cm$^3$ to about 0.980 g/cm$^3$, or from about 0.921 g/cm$^3$ to about 0.980 g/cm$^3$, or from about 0.921 g/cm$^3$ to about 0.975 g/cm$^3$, or from about 0.926 g/cm$^3$ to about 0.975 g/cm$^3$, or from about 0.930 g/cm$^3$ to about 0.980 g/cm$^3$, or from about 0.930 g/cm$^3$ to about 0.975 g/cm$^3$, or from about 0.936 g/cm$^3$ to about 0.975 g/cm$^3$, or from about 0.940 g/cm$^3$ to about 0.975 g/cm$^3$, or from about 0.940 g/cm$^3$ to about 0.980 g/cm$^3$, or from about 0.943 g/cm$^3$ to about 0.975 g/cm$^3$.

In embodiments of the disclosure the melt index of the second polyethylene $I_2^2$ may be from about 0.01 dg/min to about 1000 dg/min, or from about 0.01 dg/min to about 500 dg/min, or from about 0.01 dg/min to about 100 dg/min, or from about 0.01 dg/min to about 50 dg/min, or from about 0.01 dg/min to about 25 dg/min, or from about 0.01 dg/min to about 10 dg/min, or from about 0.01 dg/min to about 5 dg/min, or from about 0.01 dg/min to about 3 dg/min, or from about 0.01 dg/min to about 1 dg/min, or less than about 5 dg/min, or less than about 3 dg/min, or less than about 1.0 dg/min.

In an embodiment of the disclosure, the second polyethylene has a weight average molecular weight, $M_w$ of from about 50,000 to about 275,000, or from about 50,000 to about 250,000, or from about 50,000 to about 200,000, or from about 60,000 to about 250,000, or from about 70,000 to about 250,000 or from about 60,000 to about 220,000, or from about 70,000 to about 200,000, or from about 75,000 to about 200,000, or from about 75,000 to about 175,000; or from about 70,000 to about 175,000, or from about 70,000 to about 150,000, or from about 60,000 to about 140,000, or from about 50,000 to about 150,000, or from about 60,000 to about 150,000.

In an embodiment of the disclosure, the weight average molecular weight of the second polyethylene is less than the weight average molecular weight of the first polyethylene.

In an embodiment of the disclosure, the weight average molecular weight of the second polyethylene is less than the weight average molecular weight of the third polyethylene.

In an embodiment of the disclosure, the weight average molecular weight of the second polyethylene is less than the weight average molecular weight of the first polyethylene and the third polyethylene.

In an embodiment of the disclosure, the second polyethylene has a weight average molecular weight, $M_w$ which is within 30 percent of the weight average molecular weight, $M_w$ of the first polyethylene. For clarity, this means that: the absolute difference between the weight average molecular weight, $M_w$ of the second polyethylene and the weight average molecular weight, $M_w$ of the first polyethylene divided by the weight average molecular weight, $M_w$ of the first polyethylene and converted to a percentage (i.e. [|Mw2−Mw1|/Mw1]×100%) is within 30 percent.

In an embodiment of the disclosure, the second polyethylene has a weight average molecular weight, $M_w$ which is within 25 percent of the weight average molecular weight, $M_w$ of the first polyethylene. In an embodiment of the disclosure, the second polyethylene has a weight average molecular weight, $M_w$ which is within 20 percent of the weight average molecular weight, $M_w$ of the first polyethylene. In an embodiment of the disclosure, the second polyethylene has a weight average molecular weight, $M_w$ which is within 15 percent of the weight average molecular weight, $M_w$ of the first polyethylene. In an embodiment of the disclosure, the second polyethylene has a weight average molecular weight, $M_w$ which is within 10 percent of the weight average molecular weight, $M_w$ of the first polyethylene.

In an embodiment of the disclosure, the second polyethylene has a weight average molecular weight, $M_w$ which is within 25 percent of the weight average molecular weight, $M_w$ of the third polyethylene. For clarity, this means that: the absolute difference between the weight average molecular weight, $M_w$ of the second polyethylene and the weight average molecular weight, $M_w$ of the third polyethylene divided by the weight average molecular weight, $M_w$ of the third polyethylene and converted to a percentage (i.e. [|Mw2−Mw3|/Mw3]×100%) is within 25 percent.

In an embodiment of the disclosure, the second polyethylene has a weight average molecular weight, $M_w$ which is within 20 percent of the weight average molecular weight, $M_w$ of the third polyethylene. In an embodiment of the disclosure, the second polyethylene has a weight average molecular weight, $M_w$ which is within 15 percent of the weight average molecular weight, $M_w$ of the third polyethylene. In an embodiment of the disclosure, the second polyethylene has a weight average molecular weight, $M_w$ which is within 10 percent of the weight average molecular weight, $M_w$ of the third polyethylene.

In embodiments of the disclosure, the upper limit on the weight percent (wt %) of the second polyethylene in the polyethylene composition (i.e. the weight percent of the second polyethylene based on the total weight of the first, the second and the third polyethylene) may be about 75 wt %, or about 70 wt %, or about 65 wt %, or about 60 wt %, or about 55 wt %, or about 50 wt %, or about 45 wt %, or about 40 wt %.

In embodiments of the disclosure, the lower limit on the wt % of the second polyethylene in the polyethylene composition may be about 5 wt %, or about 10 wt %, or about 15 wt %, or about 20 wt %.

The Third Polyethylene

In an embodiment of the disclosure, the third polyethylene is made with a single site catalyst, non-limiting examples of which include phosphinimine catalysts, metallocene catalysts, and constrained geometry catalysts, all of which are well known in the art.

In an embodiment of the disclosure, the third polyethylene is an ethylene copolymer. Suitable alpha-olefins which may be copolymerized with ethylene to make an ethylene copolymer include 1-propene, 1-butene, 1-pentene, 1-hexene and 1-octene.

In an embodiment of the disclosure, the third polyethylene is a homogeneously branched ethylene copolymer.

In an embodiment of the disclosure, the third polyethylene is an ethylene/1-octene copolymer.

In an embodiment of the disclosure, the third polyethylene is an ethylene homopolymer.

In an embodiment of the disclosure, the third polyethylene is made with a phosphinimine catalyst.

In an embodiment of the disclosure, a phosphinimine catalyst is represented by formula:

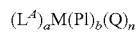

wherein ($L^A$) represents is cyclopentadienyl-type ligand; M represents a metal atom selected from the group consisting of Ti, Zr, and Hf; Pl represents a phosphinimine ligand; Q represents an activatable ligand; a is 0 or 1; b is 1 or 2; (a+b)=2; n is 1 or 2, and; the sum of (a+b+n) equals the valance of the metal M.

As used herein, the term "cyclopentadienyl-type" ligand is meant to include ligands which contain at least one five-carbon ring which is bonded to the metal via eta-5 (or in some cases eta-3) bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions of indenyl and fluorenyl ligands are also contemplated for use in the current disclosure, so long as the five-carbon ring which bonds to the metal via eta-5 (or in some cases eta-3) bonding remains intact. Substituents for a cyclopentadienyl ligand, an indenyl ligand (or hydrogenated version thereof) and a fluorenyl ligand (or hydrogenated version thereof) may be selected from the group consisting of a $C_{1-30}$ hydrocarbyl radical (which hydrocarbyl radical may be unsubstituted or further substituted by for example a halide and/or a hydrocarbyl group; for example a suitable substituted $C_{1-30}$ hydrocarbyl radical is a pentafluorobenzyl group such as —$CH_2C_6F_5$); a halogen atom; a $C_{1-8}$ alkoxy radical; a $C_{6-10}$ aryl or aryloxy radical (each of which may be further substituted by for example a halide and/or a hydrocarbyl group); an amido radical which is unsubstituted or substituted by up to two $C_{1-8}$ alkyl radicals; a phosphido radical which is unsubstituted or substituted by up to two $C_{1-8}$ alkyl radicals; a silyl radical of the formula —Si(R')$_3$ wherein each R' is independently selected from the group consisting of hydrogen, a $C_{1-8}$ alkyl or alkoxy radical, $C_{6-10}$ aryl or aryloxy radicals; and a germanyl radical of the formula —Ge(R')$_3$ wherein R' is as defined directly above.

The phosphinimine ligand, Pl, is defined by formula:

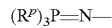

wherein the $R^P$ groups are independently selected from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula —Si($R^s$)$_3$, wherein the $R^s$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula —Ge($R^G$)$_3$, wherein the $R^G$ groups are defined as $R^s$ is defined in this paragraph.

In an embodiment of the disclosure, the metal, M in the phosphinimine catalyst is titanium, Ti.

In an embodiment of the disclosure, the single site catalyst used to make the third polyethylene is cyclopentadienyl tri(tertiarybutyl)phosphinimine titanium dichloride, Cp((t-Bu)$_3$PN)TiCl$_2$.

In an embodiment of the disclosure, the third polyethylene is made with a metallocene catalyst.

In an embodiment of the disclosure, the third polyethylene is made with a bridged metallocene catalyst.

In an embodiment of the disclosure, the third polyethylene is made with a bridged metallocene catalyst having the formula I:

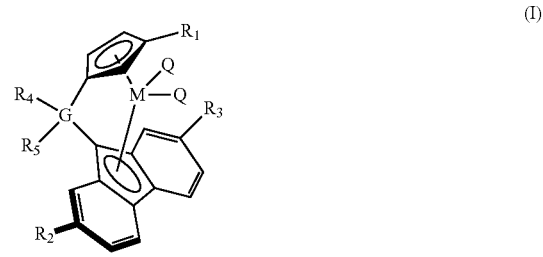

In Formula (I): M is a group 4 metal selected from titanium, zirconium or hafnium; G is a group 14 element selected from carbon, silicon, germanium, tin or lead; $R_1$ is a hydrogen atom, a $C_{1-20}$ hydrocarbyl radical, a $C_{1-20}$ alkoxy radical or a $C_{6-10}$ aryl oxide radical; $R_2$ and $R_3$ are independently selected from a hydrogen atom, a $C_{1-20}$ hydrocarbyl radical, a $C_{1-20}$ alkoxy radical or a $C_{6-10}$ aryl oxide radical; $R_4$ and $R_5$ are independently selected from a hydrogen atom, a $C_{1-20}$ hydrocarbyl radical, a $C_{1-20}$ alkoxy radical or a $C_{6-10}$ aryl oxide radical; and Q is independently an activatable leaving group ligand.

In the current disclosure, the term "activatable", means that the ligand Q may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand Q may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins.

In embodiments of the present disclosure, the activatable ligand, Q is independently selected from the group consisting of a hydrogen atom; a halogen atom; a $C_{1-20}$ hydrocarbyl radical, a $C_{1-20}$ alkoxy radical, and a $C_{6-10}$ aryl or aryloxy radical, where each of the hydrocarbyl, alkoxy, aryl, or aryl oxide radicals may be unsubstituted or further substituted by one or more halogen or other group; a $C_{1-8}$ alkyl; a $C_{1-8}$ alkoxy; a $C_{6-10}$ aryl or aryloxy; an amido or a phosphido radical, but where Q is not a cyclopentadienyl. Two Q ligands may also be joined to one another and form for example, a substituted or unsubstituted diene ligand (e.g. 1,3-butadiene); or a delocalized heteroatom containing group such as an acetate or acetamidinate group. In a convenient embodiment of the disclosure, each Q is independently selected from the group consisting of a halide atom, a $C_{1-4}$ alkyl radical and a benzyl radical. Particularly suitable activatable ligands Q are monoanionic such as a halide (e.g. chloride) or a hydrocarbyl (e.g. methyl, benzyl).

In an embodiment of the disclosure, the single site catalyst used to make the third polyethylene is diphenylmethylene (cyclopentadienyl)(2,7-di-t-butylfuorenyl)hafnium dichloride having the molecular formula: [(2,7-tBu$_2$Flu)Ph$_2$C(Cp)HfCl$_2$].

In an embodiment of the disclosure the single site catalyst used to make the third polyethylene has is diphenylmethylene(cyclopentadienyl)(2,7-di-t-butylfuorenyl)hafnium dimethyl having the molecular formula [(2,7-tBu$_2$Flu)Ph$_2$C(Cp)HfMe$_2$].

In addition to the single site catalyst molecule per se, an active single site catalyst system may further comprise one or more of the following: an alkylaluminoxane co-catalyst and an ionic activator. The single site catalyst system may also optionally comprise a hindered phenol.

Although the exact structure of alkylaluminoxane is uncertain, subject matter experts generally agree that it is an oligomeric species that contain repeating units of the general formula:

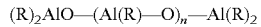

$$(R)_2AlO-(Al(R)-O)_n-Al(R)_2$$

where the R groups may be the same or different linear, branched or cyclic hydrocarbyl radicals containing 1 to 20 carbon atoms and n is from 0 to about 50. A non-limiting example of an alkylaluminoxane is methylaluminoxane (or MAO) wherein each R group is a methyl radical.

In an embodiment of the disclosure, R of the alkylaluminoxane, is a methyl radical and m is from 10 to 40.

In an embodiment of the disclosure, the co-catalyst is modified methylaluminoxane (MMAO).

It is well known in the art, that the alkylaluminoxane can serve dual roles as both an alkylator and an activator. Hence, an alkylaluminoxane co-catalyst is often used in combination with activatable ligands such as halogens.

In general, ionic activators are comprised of a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas shown below;

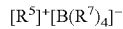

$$[R^5]^+[B(R^7)_4]^-$$

where B represents a boron atom, R$^5$ is an aromatic hydrocarbyl (e.g. triphenyl methyl cation) and each R$^7$ is independently selected from phenyl radicals which are unsubstituted or substituted with from 3 to 5 substituents selected from fluorine atoms, C$_{1-4}$ alkyl or alkoxy radicals which are unsubstituted or substituted by fluorine atoms; and a silyl radical of formula —Si(R$^9$)$_3$, where each R$^9$ is independently selected from hydrogen atoms and C$_{1-4}$ alkyl radicals, and

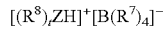

$$[(R^8)_tZH]^+[B(R^7)_4]^-$$

where B is a boron atom, H is a hydrogen atom, Z is a nitrogen or phosphorus atom, t is 2 or 3 and R$^8$ is selected from C$_{1-8}$ alkyl radicals, phenyl radicals which are unsubstituted or substituted by up to three C$_{1-4}$ alkyl radicals, or one R$^8$ taken together with the nitrogen atom may form an anilinium radical and R$^7$ is as defined above.

In both formula a non-limiting example of R$^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl)boron, tripropylammonium tetra(phenyl)boron, tri(n-butyl)ammonium tetra (phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra (pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)$_n$-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

Non-limiting example of hindered phenols include butylated phenolic antioxidants, butylated hydroxytoluene, 2,6-di-tertiarybutyl-4-ethyl phenol, 4,4'-methylenebis (2,6-di-tertiary-butylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

To produce an active single site catalyst system the quantity and mole ratios of the three or four components: the single site catalyst, the alkylaluminoxane, the ionic activator, and the optional hindered phenol are optimized.

In an embodiment of the disclosure, the single site catalyst used to make the third polyethylene produces no long chain branches, and the third polyethylene will contain no measurable amounts of long chain branches.

In an embodiment of the disclosure, the single site catalyst used to make the third polyethylene produces long chain branches, and the third polyethylene will contain long chain branches, hereinafter 'LCB'. LCB is a well-known structural phenomenon in polyethylenes and well known to those of ordinary skill in the art. Traditionally, there are three methods for LCB analysis, namely, nuclear magnetic resonance spectroscopy (NMR), for example see J. C. Randall, J Macromol. Sci., Rev. Macromol. Chem. Phys. 1989, 29, 201; triple detection SEC equipped with a DRI, a viscometer and a low-angle laser light scattering detector, for example see W. W. Yau and D. R. Hill, Int. J. Polym. Anal. Charact. 1996; 2:151; and rheology, for example see W. W. Graessley, Acc. Chem. Res. 1977, 10, 332-339. In this disclosure, a long chain branch is macromolecular in nature, i.e. long enough to be seen in an NMR spectra, triple detector SEC experiments or rheological experiments.

In embodiments of the disclosure, the upper limit on the molecular weight distribution, $M_w/M_n$ of the third polyethylene may be about 2.8, or about 2.5, or about 2.4, or about 2.3, or about 2.2. In embodiments of the disclosure, the lower limit on the molecular weight distribution, $M_w/M_n$ of the third polyethylene may be about 1.4, or about 1.6, or about 1.7, or about 1.8, or about 1.9.

In embodiments of the disclosure, the third polyethylene has a molecular weight distribution, $M_w/M_n$ of <2.3, or <2.1, or <2.0 or about 2.0. In embodiments of the disclosure, the third polyethylene has a molecular weight distribution, $M_w/M_n$ of from about 1.7 to about 2.2.

In an embodiment of the disclosure, the third polyethylene has from 0 to 100 short chain branches per thousand carbon atoms ($SCB_{PE-3}$). In further embodiments, the third polyethylene has from 0 to 30 short chain branches per thousand carbon atoms ($SCB_{PE-3}$), or from 0 to 20 short chain branches per thousand carbon atoms ($SCB_{PE-3}$), or from 0 to 15 short chain branches per thousand carbon atoms ($SCB_{PE-3}$), or from 0 to 10 short chain branches per thousand carbon atoms ($SCB_{PE-3}$), or from 0 to 5 short chain branches per thousand carbon atoms ($SCB_{PE-3}$), or fewer than 5 short chain branches per thousand carbon atoms ($SCB_{PE-3}$), or fewer than 3 short chain branches per thousand carbon atoms ($SCB_{PE-3}$), or fewer than 1 short chain branches per thousand carbon atoms ($SCB_{PE-3}$), or about 0.1 to about 1.0 short chain branches per thousand carbon atoms ($SCB_{PE-3}$), or about 0.1 to about 5 short chain branches per thousand carbon atoms ($SCB_{PE-3}$).

The short chain branching (i.e. the short chain branching per thousand carbons, $SCB_{PE-3}$) is the branching due to the presence of an alpha-olefin comonomer in the polyethylene and will for example have two carbon atoms for a 1-butene comonomer, or four carbon atoms for a 1-hexene comonomer, or six carbon atoms for a 1-octene comonomer, etc.

In an embodiment of the disclosure, the number of short chain branches per thousand carbon atoms in the third polyethylene ($SCB_{PE-3}$) is greater than the number of short chain branches per thousand carbon atoms in the second polyethylene ($SCB_{PE-2}$).

In embodiments of the disclosure, the upper limit on the density, d3 of the third polyethylene may be about 0.985 g/cm³; in some cases about 0.975 g/cm³ and; in other cases about 0.965 g/cm³. In embodiments of the disclosure, the lower limit on the density, d3 of the third polyethylene may be about 0.916 g/cm³, or about 0.921 g/cm³, in some cases about 0.930 g/cm³, and; in other cases about 0.940 g/cm³.

In embodiments of the disclosure the density, d3 of the third polyethylene may be from about 0.916 g/cm³ to about 0.980 g/cm³, or from about 0.921 g/cm³ to about 0.980 g/cm³, or from about 0.921 g/cm³ to about 0.975 g/cm³, or from about 0.926 g/cm³ to about 0.975 g/cm³, or from about 0.930 g/cm³ to about 0.980 g/cm³, or from about 0.930 g/cm³ to about 0.975 g/cm³, or from about 0.936 g/cm³ to about 0.975 g/cm³, or from about 0.940 g/cm³ to about 0.975 g/cm³, or from about 0.940 g/cm³ to about 0.980 g/cm³, or from about 0.943 g/cm³ to about 0.975 g/cm³.

In embodiments of the disclosure the melt index of the third polyethylene $I_2^3$ may be from about 0.01 dg/min to about 1000 dg/min, or from about 0.01 dg/min to about 500 dg/min, or from about 0.01 dg/min to about 100 dg/min, or from about 0.01 dg/min to about 50 dg/min, or from about 0.01 dg/min to about 25 dg/min, or from about 0.01 dg/min to about 10 dg/min, or from about 0.01 dg/min to about 5 dg/min, or from about 0.01 dg/min to about 3 dg/min, or from about 0.01 dg/min to about 1 dg/min, or less than about 5 dg/min, or less than about 3 dg/min, or less than about 1.0 dg/min.

In embodiments of the disclosure, the upper limit on the $CDBI_{50}$ of the third polyethylene may be about 98 weight %, in other cases about 95 wt % and in still other cases about 90 wt %. In embodiments of the disclosure, the lower limit on the $CDBI_{50}$ of the third polyethylene may be about 70 weight %, in other cases about 75 wt % and in still other cases about 80 wt %.

In an embodiment of the disclosure, the third polyethylene has a weight average molecular weight, $M_w$ of from about 50,000 to about 275,000, or from about 50,000 to about 250,000, or from about 60,000 to about 250,000, or from about 70,000 to about 250,000 or from about 60,000 to about 220,000, or from about 70,000 to about 200,000, or from about 75,000 to about 200,000, or from about 75,000 to about 175,000; or from about 70,000 to about 175,000, or from about 70,000 to about 150,000, or from about 60,000 to about 140,000.

In an embodiment of the disclosure, the weight average molecular weight of the third polyethylene is less than the weight average molecular weight of the first polyethylene.

In an embodiment of the disclosure, the weight average molecular weight of the third polyethylene is greater than the weight average molecular weight of the second polyethylene.

In an embodiment of the disclosure, the weight average molecular weight of the third polyethylene is less than the weight average molecular weight of the first polyethylene and greater than the weight average molecular weight of the second polyethylene.

In an embodiment of the disclosure, the third polyethylene has a weight average molecular weight, $M_w$ which is within 25 percent of the weight average molecular weight, $M_w$ of the first polyethylene. For clarity, this means that: the absolute difference between the weight average molecular weight, $M_w$ of the third polyethylene and the weight average molecular weight, $M_w$ of the first polyethylene divided by the weight average molecular weight, $M_w$ of the first polyethylene and converted to a percentage (i.e. [|Mw3−Mw1|/Mw1]×100%) is within 25 percent.

In an embodiment of the disclosure, the third polyethylene has a weight average molecular weight, $M_w$ which is within 20 percent of the weight average molecular weight, $M_w$ of the first polyethylene. In an embodiment of the disclosure, the third polyethylene has a weight average molecular weight, $M_w$ which is within 15 percent of the weight average molecular weight, $M_w$ of the first polyethylene. In an embodiment of the disclosure, the third polyethylene has a weight average molecular weight, $M_w$ which is within 10 percent of the weight average molecular weight, $M_w$ of the first polyethylene. In an embodiment of the disclosure, the third polyethylene has a weight average molecular weight, $M_w$ which is within 5 percent of the weight average molecular weight, $M_w$ of the first polyethylene.

In an embodiment of the disclosure, the third polyethylene has a weight average molecular weight, $M_w$ which is within 25 percent of the weight average molecular weight, $M_w$ of the second polyethylene. For clarity, this means that: the absolute difference between the weight average molecular weight, $M_w$ of the third polyethylene and the weight average molecular weight, $M_w$ of the second polyethylene divided by the weight average molecular weight, $M_w$ of the second polyethylene and converted to a percentage (i.e. [|Mw3−Mw2|/Mw2]×100%) is within 30 percent.

In an embodiment of the disclosure, the third polyethylene has a weight average molecular weight, $M_w$ which is within 20 percent of the weight average molecular weight, $M_w$ of the second polyethylene. In an embodiment of the disclosure, the third polyethylene has a weight average molecular weight, $M_w$ which is within 15 percent of the weight average molecular weight, $M_w$ of the second polyethylene. In an embodiment of the disclosure, the third polyethylene has a weight average molecular weight, $M_w$ which is within 10 percent of the weight average molecular weight, $M_w$ of the second polyethylene.

In embodiments of the disclosure, the upper limit on the weight percent (wt %) of the third polyethylene in the polyethylene composition (i.e. the weight percent of the third polyethylene based on the total weight of the first, the second and the third polyethylene) may be about 75 wt %, or about 70 wt %, or about 65 wt %, or about 60 wt %, or about 55 wt %, or about 50 wt %, or about 45 wt %, or about 40 wt %, or about 35 wt %, or about 30 wt %. In embodiments of the disclosure, the lower limit on the 15 wt % of the third polyethylene in the polyethylene composition may be about 5 wt %, or about 10 wt %, or about 15 wt %.

The Polyethylene Composition

The polyethylene compositions disclosed herein can be made using any well-known techniques in the art, including but not limited to melt blending, solution blending, or in-reactor blending to bring together a first polyethylene, a second polyethylene and a third polyethylene.

In an embodiment, the polyethylene composition of the present disclosure is made by melt blending or solution blending three different polyethylene components: i) a first polyethylene, ii) a second polyethylene, and iii) a third polyethylene.

In an embodiment, the polyethylene composition of the present disclosure is made by melt blending or solution blending two different polyethylene components: i) a first polyethylene component comprising a first polyethylene and a second polyethylene, and ii) second polyethylene component comprising a third polyethylene.

In an embodiment, the polyethylene composition of the present disclosure is made by melt blending or solution blending two different polyethylene components: i) a first polyethylene component comprising a first polyethylene and ii) a second polyethylene component comprising a second polyethylene and a third polyethylene.

In an embodiment, the polyethylene composition of the present disclosure is made by melt blending or solution blending two different polyethylene components: i) a first polyethylene component comprising a first polyethylene and a third polyethylene, and ii) a second polyethylene component comprising a second polyethylene.

In an embodiment, the polyethylene composition of the present disclosure is made using the same single site catalyst in three different reactors, where each reactor is operated under different polymerization conditions to give a first polyethylene, a second polyethylene and a third polyethylene.

In an embodiment, the polyethylene composition of the present disclosure is made using the same or different single site catalysts in three different reactors, where each reactor is operated under different polymerization conditions to give a first polyethylene, a second polyethylene and a third polyethylene.

In an embodiment, the polyethylene composition of the present disclosure is made using a different single site catalyst in each of three different reactors, where each reactor is operated under similar or different polymerization conditions to give a first polyethylene, a second polyethylene and a third polyethylene.

It is also contemplated by the present disclosure, that the polymer compositions comprising a first, second and third polyethylene could be made in a single polymerization reactor, using three different single site polymerization catalysts, where each catalyst has a different response to one or more of hydrogen concentration, ethylene concentration, comonomer concentration, and temperature under a given set of polymerization conditions, so that the first polyethylene is produced by the first single site catalyst, the second polyethylene is produced by the second single site catalyst, and the third polyethylene is produced by the third single site catalyst.

It is also contemplated by the present disclosure, that the polymer compositions comprising a first, second and third polyethylene could be made in one or more polymerization reactors, using one or more single site polymerization catalysts, where each catalyst has a similar or different response to one or more of hydrogen concentration, ethylene concentration, comonomer concentration, and temperature under a given set of polymerization conditions, and where one or more of hydrogen concentration, ethylene concentration, comonomer concentration, and temperature are cycled through a range so that a first, second and a third polyethylene is produced by the one or more single site catalysts present in the one or more polymerization reactors.

In an embodiment, the polyethylene composition of the present disclosure is made by forming a first polyethylene in a first reactor by polymerizing ethylene and an alpha olefin with a single site catalyst; forming a second polyethylene in a second reactor by polymerizing ethylene and optionally an alpha olefin with a single site catalyst, and forming a third polyethylene in a third reactor by polymerizing ethylene and optionally an alpha olefin with a single site catalyst.

In an embodiment, the polyethylene composition of the present disclosure is made by forming a first polyethylene in a first reactor by polymerizing ethylene and an alpha olefin with a single site catalyst; forming a second polyethylene in a second reactor by polymerizing ethylene and optionally an alpha olefin with a single site catalyst, and forming a third polyethylene in a third reactor by polymerizing ethylene and optionally an alpha olefin with a single site catalyst, where at least two of the first, second and third reactors are configured in series with one another.

In an embodiment, the polyethylene composition of the present disclosure is made by forming a first polyethylene in a first solution phase polymerization reactor by polymerizing ethylene and an alpha olefin with a single site catalyst; forming a second polyethylene in a second solution phase polymerization reactor by polymerizing ethylene and optionally an alpha olefin with a single site catalyst, and forming a third polyethylene in a third solution phase polymerization reactor by polymerizing ethylene and optionally an alpha olefin with a single site catalyst.

In an embodiment, the polyethylene composition of the present disclosure is made by forming a first polyethylene in a first solution phase polymerization reactor by polymerizing ethylene and an alpha olefin with a single site catalyst; forming a second polyethylene in a second solution phase polymerization reactor by polymerizing ethylene and optionally an alpha olefin with a single site catalyst, and forming a third polyethylene in a third solution phase polymerization reactor by polymerizing ethylene and optionally an alpha olefin with a single site catalyst, where at least two of the first, second and third solution phase polymerization reactors are configured in series with one another.

In an embodiment, the polyethylene composition of the present disclosure is made by forming a first polyethylene in a first solution phase polymerization reactor by polymerizing ethylene and an alpha olefin with a single site catalyst; forming a second polyethylene in a second solution phase polymerization reactor by polymerizing ethylene and optionally an alpha olefin with a single site catalyst, and forming a third polyethylene in a third solution phase polymerization reactor by polymerizing ethylene and optionally an alpha olefin with a single site catalyst, where the first and second solution phase polymerization reactors are configured in series with one another.

In an embodiment, the polyethylene composition of the present disclosure is made by forming a first polyethylene in a first reactor by polymerizing ethylene and an alpha olefin with a single site catalyst; forming a second polyethylene in a second reactor by polymerizing ethylene and optionally an alpha olefin with a single site catalyst, and forming a third polyethylene in a third reactor by polymerizing ethylene and optionally an alpha olefin with a single site catalyst, where each of the first, second and third reactors are configured in parallel to one another.

In an embodiment, the polyethylene composition of the present disclosure is made by forming a first polyethylene in a first solution phase polymerization reactor by polymerizing ethylene and an alpha olefin with a single site catalyst; forming a second polyethylene in a second solution phase polymerization reactor by polymerizing ethylene and optionally an alpha olefin with a single site catalyst, and forming a third polyethylene in a third solution phase polymerization reactor by polymerizing ethylene and optionally an alpha olefin with a single site catalyst, where each of the first, second and third solution phase polymerization reactors are configured in parallel to one another.

In an embodiment, the polyethylene composition of the present disclosure is made by forming a first polyethylene in a first reactor by polymerizing ethylene and an alpha olefin with a single site catalyst; forming a second polyethylene in a second reactor by polymerizing ethylene and optionally an alpha olefin with a single site catalyst, and forming a third polyethylene in a third reactor by polymerizing ethylene and optionally an alpha olefin with a single site catalyst, where the first and second reactors are configured in series to one another, and the third reactor is configured in parallel to the first and second reactors.

In an embodiment, the polyethylene composition of the present disclosure is made by forming a first polyethylene in a first solution phase reactor by polymerizing ethylene and an alpha olefin with a single site catalyst; forming a second polyethylene in a second solution phase reactor by polymerizing ethylene and optionally an alpha olefin with a single site catalyst, and forming a third polyethylene in a third solution phase reactor by polymerizing ethylene and optionally an alpha olefin with a single site catalyst, where the first and second solution phase reactors are configured in series to one another, and the third solution phase reactor is configured in parallel to the first and second reactors.

In an embodiment, the solution phase polymerization reactor used as a first solution phase reactor, a second solution phase reactor, or a third solution phase reactor is a continuously stirred tank reactor.

In an embodiment, the solution phase polymerization reactor used as a first solution phase reactor, a second solution phase reactor, or a third solution phase reactor is a tubular reactor.

In a solution phase polymerization reactor, a variety of solvents may be used as the process solvent; non-limiting examples include linear, branched or cyclic $C_5$ to $C_{12}$ alkanes. Non-limiting examples of α-olefins include 1-propene, 1-butene, 1-pentene, 1-hexene and 1-octene. Suitable catalyst component solvents include aliphatic and aromatic hydrocarbons. Non-limiting examples of aliphatic catalyst component solvents include linear, branched or cyclic $C_{5-12}$ aliphatic hydrocarbons, e.g. pentane, methyl pentane, hexane, heptane, octane, cyclohexane, cyclopentane, methylcyclohexane, hydrogenated naphtha or combinations thereof. Non-limiting examples of aromatic catalyst component solvents include benzene, toluene (methylbenzene), ethylbenzene, o-xylene (1,2-dimethylbenzene), m-xylene (1,3-dimethylbenzene), p-xylene (1,4-dimethylbenzene), mixtures of xylene isomers, hemellitene (1,2,3-trimethylbenzene), pseudocumene (1,2,4-trimethylbenzene), mesitylene (1,3,5-trimethylbenzene), mixtures of trimethylbenzene isomers, prehenitene (1,2,3,4-tetramethylbenzene), durene (1,2,3,5-tetramethylbenzene), mixtures of tetramethylbenzene isomers, pentamethylbenzene, hexamethylbenzene and combinations thereof.

In embodiments of the disclosure, the polyethylene composition has a density which may be from about 0.880 g/cm³ to about 0.965 g/cm³, or from about 0.885 g/cm³ to about 0.960 g/cm³, or from about 0.890 g/cm³ to 0.950 g/cm³, or from about 0.895 g/cm³ to about 0.940 g/cm³, or from about 0.900 g/cm³ to about 0.936 g/cm³, or from about 0.905 g/cm³ to about 0.934 g/cm³, or from about 0.910 g/cm³ to about 0.932 g/cm³, or from about 0.910 g/cm³ to about 0.930 g/cm³, or from about 0.910 g/cm³ to about 0.926 g/cm³, or from about 0.890 g/cm³ to about 0.924 g/cm³, or from about 0.890 g/cm³ to about 0.922 g/cm³, or from about 0.890 g/cm³ to about 0.920 g/cm³, or from about 0.890 g/cm³ to about 0.918 g/cm³, or from about 0.880 g/cm³ to about 0.922 g/cm³, or from about 0.880 g/cm³ to about 0.926 g/cm³, or from about 0.880 g/cm³ to about 0.932 g/cm³, or ≤0.948 g/cm³, or <0.948 g/cm³, or ≤0.945 g/cm³, or <0.945 g/cm³, or ≤0.940 g/cm³, or <0.940 g/cm³, or ≤0.939 g/cm³, or <0.939 g/cm³, or ≤0.935 g/cm³, or <0.935 g/cm³, or ≤0.932 g/cm³, or <0.932 g/cm³.

In embodiments of the disclosure the melt index $I_2$ of the polyethylene composition may be from about 0.01 dg/min to about 1000 dg/min, or from about 0.01 dg/min to about 500 dg/min, or from about 0.01 dg/min to about 100 dg/min, or from about 0.01 dg/min to about 50 dg/min, or from about 0.01 dg/min to about 25 dg/min, or from about 0.01 dg/min to about 10 dg/min, or from about 0.01 dg/min to about 5 dg/min, or from about 0.01 dg/min to about 3 dg/min, or from about 0.01 dg/min to about 1 dg/min, or from about 0.1 dg/min to about 10 dg/min, or from about 0.1 dg/min to about 5 dg/min, or from about 0.1 dg/min to about 3 dg/min, or from about 0.1 dg/min to about 2 dg/min, or from about 0.1 dg/min to about 1.5 dg/min, or from about 0.1 dg/min to about 1 dg/min, or less than about 5 dg/min, or less than about 3 dg/min, or less than about 1.0 dg/min.

In embodiments of the disclosure the high load melt index $I_{21}$ of the polyethylene composition may be from about 1 dg/min to about 10,000 dg/min, or from about 3 dg/min to about 1000 dg/min, or from about 5 dg/min to about 100 dg/min, or from about 5 dg/min to about 75 dg/min, or from about 5 dg/min to about 50 dg/min, or from about 3 dg/min to about 100 dg/min, or from about 3 dg/min to about 75 dg/min, or from about 3 dg/min to about 50 dg/min, or from about 3 dg/min to about 45 dg/min, or from about 5 dg/min to about 40 dg/min, or from about 5 dg/min to about 30 dg/min, or from about 5 dg/min to about 25 dg/min, or from about 3 dg/min to about 20 dg/min.

In embodiments of the disclosure the melt flow ratio I21/I2 of the polyethylene composition may be from about 15 to about 1000, or from about 15 to about 100, or from about 15 to about 75, or from about 15 to about 50, or from 15 to about 40, or from about 17 to about 40, or from about 17 to about 30, or from about 17 to about 28, or from about 17 to about 25, or from about 18 to about 22.

In an embodiments of the disclosure, the polyethylene composition has a weight average molecular weight, $M_w$ of from about 50,000 to about 300,000, or from about 50,000 to about 250,000, or from about 60,000 to about 250,000, or from about 70,000 to about 225,000, or from about 70,000 to about 200,000, or from about 75,000 to about 175,000, or from about 75,000 to about 150,000, or from about 75,000 to about 125,000.

In embodiments of the disclosure, the polyethylene composition has a molecular weight distribution, $M_w/M_n$ of ≤3.5, or <3.5, or ≤3.0, or <3.0, or ≤2.5, or <2.5, or ≤2.3, or ≤2.1, or ≤2.0. In embodiments of the disclosure, the polyethylene composition has a molecular weight distribution, $M_w/M_n$ of from 1.5 to 3.5, or from 1.5 to 3.0, or from 1.5 to 2.5, or from 1.5 to 2.3, or from 1.5 to 2.1, or from 1.6 to 2.5, or from 1.6 to 2.3, or from 1.6 to 2.1.

In embodiments of the disclosure, the polyethylene composition has a Z-average molecular weight distribution, $M_z/M_w$ of ≤3.0, or <3.0, or ≤2.5, or <2.5, or ≤2.3, or <2.3, or ≤2.0, or <2.0, or ≤1.75, or <1.75, or ≤1.60, or <1.60. In embodiments of the disclosure, the polyethylene composition has a Z-average molecular weight distribution, $M_z/M_w$ of from 1.3 to 3.0, or from 1.3 to 2.5, or from 1.3 to 2.25, or from 1.5 to 2.25, or from 1.5 to 2.0.

In an embodiment of the disclosure, the polyethylene composition has a unimodal profile in a gel permeation chromatograph generated according to the method of ASTM D6474-99. The term "unimodal" is herein defined to mean there will be only one significant peak or maximum evident in the GPC-curve. A unimodal profile includes a broad unimodal profile. In contrast, the use of the term "bimodal" is meant to convey that in addition to a first peak, there will be a secondary peak or shoulder which represents a higher or lower molecular weight component (i.e. the molecular weight distribution, can be said to have two maxima in a molecular weight distribution curve). Alternatively, the term "bimodal" connotes the presence of two maxima in a molecular weight distribution curve generated according to the method of ASTM D6474-99. The term "multi-modal" denotes the presence of two or more, typically more than two, maxima in a molecular weight distribution curve generated according to the method of ASTM D6474-99.

In an embodiment of the disclosure the polyethylene composition may have a multimodal profile in a differential scanning calorimetry (DSC) graph. In the context of DSC analysis, the term "multimodal" connotes a DSC profile in which two or more distinct melting peaks are observable.

In an embodiment of the disclosure the polyethylene composition may have a trimodal profile in a differential scanning calorimetry (DSC) graph. In the context of DSC analysis, the term "trimodal" connotes a DSC profile in which three distinct melting peaks are observable.

In an embodiment of the disclosure, the polyethylene composition has a melting peak temperature in a differential scanning calorimetry (DSC) analysis at above 120° C. For clarity sake, by the phrase "has a melting peak temperature in an DSC analysis" it is meant that in a DSC analysis, although there may be one or more melting peaks evident, at least one such peak occurs at above the indicated temperature. In an embodiment of the disclosure, the polyethylene composition has a melting peak temperature in a differential scanning calorimetry (DSC) analysis at above 123° C. In an embodiment of the disclosure, the polyethylene composition has a melting peak temperature in a differential scanning calorimetry (DSC) analysis at above 125° C.

In an embodiment of the disclosure, the polyethylene composition has a melting peak temperature in a differential scanning calorimetry (DSC) analysis at below 100° C. For clarity sake, by the phrase "has a melting peak temperature in an DSC analysis" it is meant that in a DSC analysis, although there may be one or more melting peaks evident, at least one such peak occurs at below the indicated temperature. In an embodiment of the disclosure, the polyethylene composition has a melting peak temperature in a differential scanning calorimetry (DSC) analysis at below 95° C. In an embodiment of the disclosure, the polyethylene composition has a melting peak temperature in a differential scanning calorimetry (DSC) analysis at below 90° C. In an embodiment of the disclosure, the polyethylene composition has a melting peak temperature in a differential scanning calorimetry (DSC) analysis at below 85° C. In an embodiment of the disclosure, the polyethylene composition has a melting peak temperature in a differential scanning calorimetry (DSC) analysis at below 80° C.

In an embodiment of the disclosure, the polyethylene composition will have will have a reverse or partially reverse comonomer distribution profile as measured using GPC-FTIR. If the comonomer incorporation decreases with molecular weight, as measured using GPC-FTIR, the distribution is described as "normal". If the comonomer incorporation is approximately constant with molecular weight, as measured using GPC-FTIR, the comonomer distribution is described as "flat" or "uniform". The terms "reverse comonomer distribution" and "partially reverse comonomer distribution" mean that in the GPC-FTIR data obtained for a copolymer, there is one or more higher molecular weight components having a higher comonomer incorporation than in one or more lower molecular weight components. The term "reverse(d) comonomer distribution" is used herein to mean, that across the molecular weight range of an ethylene copolymer, comonomer contents for the various polymer fractions are not substantially uniform and the higher molecular weight fractions thereof have proportionally higher comonomer contents (i.e. if the comonomer incorporation rises with molecular weight, the distribution is described as "reverse" or "reversed"). Where the comonomer incorporation rises with increasing molecular weight and then declines, the comonomer distribution is still considered "reverse", but may also be described as "partially reverse". A partially reverse comonomer distribution will exhibit a peak or maximum.

In an embodiment of the disclosure the polyethylene composition has a reversed comonomer distribution profile as measured using GPC-FTIR.

In an embodiment of the disclosure the polyethylene composition has a partially reversed comonomer distribution profile as measured using GPC-FTIR.

In an embodiment of the disclosure, the polyethylene composition has a composition distribution breadth index, $CDBI_{50}$ obtained from a crystallization elution fractionation (CEF) analysis, of less than 50 weight percent (wt %). In an embodiment of the disclosure, the polyethylene composition has a composition distribution breadth index, $CDBI_{50}$ obtained from a crystallization elution fractionation (CEF) analysis, of less than 45 weight percent (wt %). In an embodiment of the disclosure, the polyethylene composition has a composition distribution breadth index, $CDBI_{50}$ obtained from a crystallization elution fractionation (CEF) analysis, of less than 40 weight percent (wt %). In an embodiment of the disclosure, the polyethylene composition has a composition distribution breadth index, $CDBI_{50}$ obtained from a crystallization elution fractionation (CEF) analysis, of less than 35 weight percent (wt %). In an embodiment of the disclosure, the polyethylene composition has a composition distribution breadth index, $CDBI_{50}$ obtained from a crystallization elution fractionation (CEF) analysis, of less than 30 weight percent (wt %). In an embodiment of the disclosure, the polyethylene composition has a composition distribution breadth index, $CDBI_{50}$ obtained from a crystallization elution fractionation (CEF) analysis, of less than 25 weight percent (wt %).

In an embodiment of the disclosure, the polyethylene composition has a composition distribution breadth index, $CDBI_{50}$ obtained from a crystallization elution fractionation (CEF) analysis, of from 15 to 30 weight percent (wt %).

In an embodiment of the disclosure, the polyethylene composition has a stress exponent, defined as $Log_{10}[I_6/I_2]/Log_{10}[6.48/2.16]$, which is ≤1.40. In further embodiments of the disclosure the polyethylene composition has a stress exponent, $Log_{10}[I_6/I_2]/Log_{10}[6.48/2.16]$ of less than 1.35, or less than 1.30, or less than 1.25.

In an embodiment of the disclosure, the polyethylene composition has a hexane extractable value of ≤5.0 weight percent, or less than 4.0 wt %, or less than 3.0 wt %, or less than 2.0 wt %, or less than 1.0 wt %.

The polyethylene composition disclosed herein may be converted into flexible manufactured articles such as monolayer or multilayer films. Such films are well known to those experienced in the art; non-limiting examples of processes to prepare such films include blown film and cast film processes.

In the blown film extrusion process an extruder heats, melts, mixes and conveys a thermoplastic, or a thermoplastic blend. Once molten, the thermoplastic is forced through an annular die to produce a thermoplastic tube. In the case of co-extrusion, multiple extruders are employed to produce a multilayer thermoplastic tube. The temperature of the extrusion process is primarily determined by the thermoplastic or thermoplastic blend being processed, for example the melting temperature or glass transition temperature of the thermoplastic and the desired viscosity of the melt. In the case of polyolefins, typical extrusion temperatures are from 330° F. to 550° F. (166° C. to 288° C.). Upon exit from the annular die, the thermoplastic tube is inflated with air, cooled, solidified and pulled through a pair of nip rollers. Due to air inflation, the tube increases in diameter forming a bubble of desired size. Due to the pulling action of the nip rollers the bubble is stretched in the machine direction. Thus, the bubble is stretched in two directions: the transverse direction (TD) where the inflating air increases the diameter of the bubble; and the machine direction (MD) where the nip rollers stretch the bubble. As a result, the physical properties of blown films are typically anisotropic, i.e. the physical properties differ in the MD and TD directions; for example, film tear strength and tensile properties typically differ in the MD and TD. In some prior art documents, the terms "cross direction" or "CD" is used; these terms are equivalent to the terms "transverse direction" or "TD" used in this disclosure.

In the blown film process, air is also blown on the external bubble circumference to cool the thermoplastic as it exits the annular die. The final width of the film is determined by controlling the inflating air or the internal bubble pressure; in other words, increasing or decreasing bubble diameter. Film thickness is controlled primarily by increasing or decreasing the speed of the nip rollers to control the draw-down rate. After exiting the nip rollers, the bubble or tube is collapsed and may be slit in the machine direction thus creating sheeting. Each sheet may be wound into a roll of film. Each roll may be further slit to create film of the desired width. Each roll of film is further processed into a variety of consumer products as described below.

The cast film process is similar in that a single or multiple extruder(s) may be used; however the various thermoplastic materials are metered into a flat die and extruded into a monolayer or multilayer sheet, rather than a tube. In the cast film process the extruded sheet is solidified on a chill roll.

Depending on the end-use application, the disclosed polyethylene composition may be converted into films that span a wide range of thicknesses. Non-limiting examples include, food packaging films where thicknesses may range from about 0.5 mil (13 µm) to about 4 mil (102 µm), and; in heavy duty sack applications film thickness may range from about 2 mil (51 µm) to about 10 mil (254 µm).

The polyethylene composition disclosed herein may be used in monolayer films; where the monolayer may contain more than one polyethylene composition and/or additional thermoplastics; non-limiting examples of thermoplastics include polyethylene polymers and propylene polymers. The lower limit on the weight percent of the polyethylene composition in a monolayer film may be about 3 wt %, in other cases about 10 wt % and in still other cases about 30 wt %. The upper limit on the weight percent of the polyethylene composition in the monolayer film may be 100 wt %, in other cases about 90 wt % and in still other cases about 70 wt %.

The polyethylene composition disclosed herein may also be used in one or more layers of a multilayer film; non-limiting examples of multilayer films include three, five, seven, nine, eleven or more layers. The thickness of a specific layer (containing the polyethylene composition) within a multilayer film may be about 5%, in other cases about 15% and in still other cases about 30% of the total multilayer film thickness. In other embodiments, the thickness of a specific layer (containing the polyethylene composition) within a multilayer film may be about 95%, in other cases about 80% and in still other cases about 65% of the total multilayer film thickness. Each individual layer of a multilayer film may contain more than one polyethylene composition and/or additional thermoplastics.

Additional embodiments include laminations and coatings, wherein mono or multilayer films containing the disclosed polyethylene composition are extrusion laminated or adhesively laminated or extrusion coated. In extrusion lamination or adhesive lamination, two or more substrates are bonded together with a thermoplastic or an adhesive, respectively. In extrusion coating, a thermoplastic is applied to the surface of a substrate. These processes are well known to those experienced in the art. Frequently, adhesive lamination or extrusion lamination are used to bond dissimilar materials, non-limiting examples include the bonding of a paper web to a thermoplastic web, or the bonding of an aluminum foil containing web to a thermoplastic web, or the bonding of two thermoplastic webs that are chemically incompatible, e.g. the bonding of a polyethylene composition containing web to a polyester or polyamide web. Prior to lamination, the web containing the disclosed polyethylene composition(s) may be monolayer or multilayer. Prior to lamination the individual webs may be surface treated to improve the bonding, a non-limiting example of a surface treatment is corona treating. A primary web or film may be laminated on its upper surface, its lower surface, or both its upper and lower surfaces with a secondary web. A secondary web and a tertiary web could be laminated to the primary web; wherein the secondary and tertiary webs differ in chemical composition. As non-limiting examples, secondary or tertiary webs may include; polyamide, polyester and polypropylene, or webs containing barrier resin layers such as EVOH. Such webs may also contain a vapor deposited barrier layer; for example a thin silicon oxide ($SiO_x$) or aluminum oxide ($AlO_x$) layer. Multilayer webs (or films) may contain three, five, seven, nine, eleven or more layers.

The polyethylene composition disclosed herein can be used in a wide range of manufactured articles comprising one or more films or film layers (monolayer or multilayer). Non-limiting examples of such manufactured articles include: food packaging films (fresh and frozen foods, liquids and granular foods), stand-up pouches, retortable packaging and bag-in-box packaging; barrier films (oxygen, moisture, aroma, oil, etc.) and modified atmosphere packaging; light and heavy duty shrink films and wraps, collation shrink film, pallet shrink film, shrink bags, shrink bundling and shrink shrouds; light and heavy duty stretch films, hand stretch wrap, machine stretch wrap and stretch hood films; high clarity films; heavy-duty sacks; household wrap, overwrap films and sandwich bags; industrial and institutional films, trash bags, can liners, magazine overwrap, newspaper bags, mail bags, sacks and envelopes, bubble wrap, carpet film, furniture bags, garment bags, coin bags, auto panel films; medical applications such as gowns, draping and surgical garb; construction films and sheeting, asphalt films, insulation bags, masking film, landscaping film and bags; geomembrane liners for municipal waste disposal and mining applications; batch inclusion bags; agricultural films, mulch film and green house films; in-store packaging, self-service bags, boutique bags, grocery bags, carry-out sacks and t-shirt bags; oriented films, machine direction and biaxially oriented films and functional film layers in oriented polypropylene (OPP) films, e.g. sealant and/or toughness layers. Additional manufactured articles comprising one or more films containing at least one polyethylene composition include laminates and/or multilayer films; sealants and tie layers in multilayer films and composites; laminations with paper; aluminum foil laminates or laminates containing vacuum deposited aluminum; polyamide laminates; polyester laminates; extrusion coated laminates, and; hot-melt adhesive formulations. The manufactured articles summarized in this paragraph contain at least one film (monolayer or multilayer) comprising at least one embodiment of the disclosed polyethylene composition.

Desired film physical properties (monolayer or multilayer) typically depend on the application of interest. Non-limiting examples of desirable film properties include: optical properties (gloss, haze and clarity), dart impact, Elmendorf tear, modulus (1% and 2% secant modulus), puncture-propagation tear resistance, tensile properties (yield strength, break strength, elongation at break, toughness, etc.) and heat sealing properties (heat seal initiation temperature and hot tack strength). Specific hot tack and heat sealing properties are desired in high speed vertical and horizontal form-fill-seal processes that load and seal a commercial product (liquid, solid, paste, part, etc.) inside a pouch-like package.

In addition to desired film physical properties, it is desired that the disclosed polyethylene composition is easy to process on film lines. Those skilled in the art frequently use the term "processability" to differentiate polymers with improved processability, relative to polymers with inferior processability. A commonly used measure to quantify processability is extrusion pressure; more specifically, a polymer with improved processability has a lower extrusion pressure (on a blown film or a cast film extrusion line) relative to a polymer with inferior processability.

In an embodiment of the disclosure, a film or film layer comprises the polyethylene composition described above.

In embodiments of the disclosure, a film or film layer comprises the polyethylene composition described above and has a thickness of from 0.5 to 10 mil.

In embodiments of the disclosure, a film or film layer has a thickness of from 0.5 to 10 mil.

In embodiments of the disclosure, a film will have a dart impact strength of ≥300 g/mil, or ≥350 g/mil, or ≥400 g/mil, or ≥450 g/mil. In another embodiment of the disclosure, a film will have a dart impact strength of from 300 g/mil to 650 g/mil. In a further embodiment of the disclosure, a film will have dart impact strength of from 350 g/mil to 650 g/mil. In a further embodiment of the disclosure, a film will have dart impact strength of from 400 g/mil to 600 g/mil. In yet another embodiment of the disclosure, a film will have dart impact strength of from 400 g/mil to 550 g/mil. In still yet another embodiment of the disclosure, a film will have dart impact strength of from 400 g/mil to 500 g/mil.

In embodiments of the disclosure, a 1 mil film will have a machine direction (MD) secant modulus at 1% strain of ≥170 MPa, or ≥180 MPa, or ≥190 MPa, or ≥200 MPa, or ≥210 MPa, or ≥220 MPa, or ≥230 MPa. In an embodiment of the disclosure, a 1 mil film will have a machine direction (MD) secant modulus at 1% strain of from 160 MPa to 280 MPa. In an embodiment of the disclosure, a 1 mil film will have a machine direction (MD) secant modulus at 1% strain of from 170 MPa to 280 MPa. In another embodiment of the disclosure, a 1 mil film will have a machine direction (MD) secant modulus at 1% strain of from 180 MPa to 280 MPa. In another embodiment of the disclosure, a 1 mil film will have a machine direction (MD) secant modulus at 1% strain of from 190 MPa to 280 MPa. In another embodiment of the disclosure, a 1 mil film will have a machine direction (MD) secant modulus at 1% strain of from 200 MPa to 270 MPa. In another embodiment of the disclosure, a 1 mil film will have a machine direction (MD) secant modulus at 1% strain of from 210 MPa to 270 MPa. In another embodiment of the disclosure, a 1 mil film will have a machine direction (MD) secant modulus at 1% strain of from 220 MPa to 270 MPa. In another embodiment of the disclosure, a 1 mil film will have a machine direction (MD) secant modulus at 1% strain of from 230 MPa to 270 MPa.

In an embodiment of the disclosure, a 1 mil film will have a transverse direction (TD) secant modulus at 1% strain of ≥200 MPa, or ≥210 MPa, or ≥220 MPa, or ≥230 MPa, or ≥240 MPa, or ≥250 MPa, or ≥260 MPa. In an embodiment of the disclosure, a 1 mil film will have a transverse direction (TD) secant modulus at 1% strain of from 200 MPa to 400 MPa. In another embodiment of the disclosure, a 1 mil film will have a transverse direction (TD) secant modulus at 1% strain of from 210 MPa to 400 MPa. In another embodiment of the disclosure, a 1 mil film will have a transverse direction (TD) secant modulus at 1% strain of from 220 MPa to 350 MPa. In another embodiment of the disclosure, a 1 mil film will have a transverse direction (TD) secant modulus at 1% strain of from 230 MPa to 350 MPa. In another embodiment of the disclosure, a 1 mil film will have a transverse direction (TD) secant modulus at 1% strain of from 240 MPa to 350 MPa. In another embodiment of the disclosure, a 1 mil film will have a transverse direction (TD) secant modulus at 1% strain of from 250 MPa to 350 MPa. In another embodiment of the disclosure, a 1 mil film will have a transverse direction (TD) secant modulus at 1% strain of from 250 MPa to 325 MPa.

In embodiments of the disclosure, a 1 mil film will have a machine direction (MD) tensile strength at break of ≥40 MPa, or ≥45 MPa, or ≥50 MPa, or ≥55 MPa. In an embodiment of the disclosure, a 1 mil film will have a machine direction tensile strength at break of from 30 MPa to 70 MPa. In an embodiment of the disclosure, a 1 mil film will have a machine direction (MD) tensile strength at break of from 35 MPa to 70 MPa. In another embodiment of the disclosure, a 1 mil film will have a machine direction (MD) tensile strength at break of from 40 MPa to 70 MPa. In another embodiment of the disclosure, a 1 mil film will have a machine direction (MD) tensile strength at break of from 50 MPa to 65 MPa.

In embodiments of the disclosure, a film will have a machine direction (MD) tear strength of ≥300 g/mil, or ≥325 g/mil, or ≥350 g/mil, or ≥375 g/mil, or ≥400 g/mil. In an embodiment of the disclosure, a film will have a machine direction (MD) tear strength of from 300 g/mil to 550 g/mil. In an embodiment of the disclosure, a film will have a machine direction (MD) tear strength of from 350 g/mil to 500 g/mil. In an embodiment of the disclosure, a film will have a machine direction (MD) tear strength of from 375 g/mil to 475 g/mil. In an embodiment of the disclosure, a film will have a machine direction (MD) tear strength of from 400 g/mil to 450 g/mil.

In embodiments of the disclosure, a 1 mil film will have an ASTM puncture resistance value of ≥70 J/mm, or ≥80 J/mm, or ≥85 J/mm, or ≥90 J/mm. In embodiments of the disclosure, a 1 mil film will have an ASTM puncture value of from 65 J/mm to 110 J/mm, or from 70 J/mm to 105 J/mm, or from 80 J/mm to 100 J/mm.

In embodiments of the disclosure, a 1 mil film will have a haze of ≤16%, or ≤15%, ≤14%, or ≤13%, or ≤12%, or ≤11%. In embodiments of the disclosure, a 1 mil film will have a haze of from 5% to 20%, of from 6% to 16%, or from 7% to 14%.

In embodiments of the disclosure, a 2 mil film will have a seal initiation temperature (SIT) of ≤100° C., or ≤95° C., or ≤90° C., or ≤85° C., or ≤80° C. In an embodiment of the disclosure, a 2 mil film will have a seal initiation temperature (SIT) of between 65° C. and 100° C. In an embodiment of the disclosure, a 2 mil film will have a seal initiation temperature (SIT) of between 65° C. and 95° C. In an embodiment of the disclosure, a 2 mil film will have a seal initiation temperature (SIT) of between 70° C. and 90° C. In an embodiment of the disclosure, a 2 mil film will have a seal initiation temperature (SIT) of between 70° C. and 85° C. In an embodiment of the disclosure, a 2 mil film will have a seal initiation temperature (SIT) of between 70° C. and 80° C.

In an embodiment of the disclosure, a 1 mil film will have an oxygen transmission rate (OTR) of ≥600 cm$^3$ per 100 inch$^2$ per day. In an embodiment of the disclosure, a 1 mil film will have an oxygen transmission rate (OTR) of ≥625 cm$^3$ per 100 inch$^2$ per day. In an embodiment of the disclosure, a 1 mil film will have an oxygen transmission rate (OTR) of ≥650 cm$^3$ per 100 inch$^2$ per dat. In an embodiment of the disclosure, a 1 mil film will have an oxygen transmission rate (OTR) of ≥675 cm$^3$ per 100 inch$^2$ per day. In an embodiment of the disclosure, a 1 mil film will have an oxygen transmission rate (OTR) of ≥700 cm$^3$ per 100 inch$^2$ per day. In an embodiment of the disclosure, a 1 mil film will have an oxygen transmission rate (OTR) of from 600 to 800 cm$^3$ per 100 inch$^2$ per day. In an embodiment of the disclosure, a 1 mil film will have an oxygen transmission rate (OTR) of from 650 to 800 cm$^3$ per 100 inch$^2$ per day. In an embodiment of the disclosure, a 1 mil film will have an oxygen transmission rate (OTR) of from 650 to 750 cm$^3$ per 100 inch$^2$ per day.

In an embodiment of the disclosure, a 2 mil film will have an area of hot tack window (AHTW) of ≥170 Newtons·° C. In an embodiment of the disclosure, a 2 mil film will have an area of hot tack window (AHTW) of ≥200 Newtons·° C. In an embodiment of the disclosure, a 2 mil film will have an area of hot tack window (AHTW) of ≥210 Newtons·° C. In an embodiment of the disclosure, a 2 mil film will have an area of hot tack window (AHTW) of ≥220 Newtons·° C. In an embodiment of the disclosure, a 2 mil film will have an area of hot tack window (AHTW) of ≥230 Newtons·° C. In an embodiment of the disclosure, a 2 mil film will have an area of hot tack window (AHTW) of ≥240 Newtons·° C. In an embodiment of the disclosure, a 2 mil film will have an area of hot tack window (AHTW) of from 200 to 320 Newtons·° C. In an embodiment of the disclosure, a 2 mil film will have an area of hot tack window (AHTW) of from 210 to 300 Newtons·° C. In an embodiment of the disclosure, a 2 mil film will have an area of hot tack window (AHTW) of from 220 to 290 Newtons·° C. In an embodiment of the disclosure, a 2 mil film will have an area of hot tack window (AHTW) of from 230 to 280 Newtons·° C. In an embodiment of the disclosure, a 2 mil film will have an area of hot tack window (AHTW) of from 240 to 280 Newtons·° C.

Some embodiments of the present disclosure provide films with improvements in machine direction (MD) modulus (1% and/or 2%) and seal initiation temperature relative to films formed from comparative polyethylene. Hence, in an embodiment of the disclosure, a film layer having a thickness of from 0.5 to 10 mil, has a machine direction (MD) 1% secant modulus of ≥200 MPa when measured at a film thickness of about 1 mil and a seal initiation temperature (SIT) of ≤95° C. when measured at a film thickness of about 2 mil. In another embodiment of the disclosure, a film layer having a thickness of from 0.5 to 10 mil, has a machine direction (MD) 1% secant modulus of ≥210 MPa when measured at a film thickness of about 1 mil and a seal initiation temperature (SIT) of ≤90° C. when measured at a film thickness of about 2 mil. In another embodiment of the disclosure, a film layer having a thickness of from 0.5 to 10 mil, has a machine direction (MD) 1% secant modulus of ≥220 MPa when measured at a film thickness of about 1 mil and a seal initiation temperature (SIT) of ≤85° C. when measured at a film thickness of about 2 mil. In another embodiment of the disclosure, a film layer having a thickness of from 0.5 to 10 mil, has a machine direction (MD) 1% secant modulus of ≥220 MPa when measured at a film thickness of about 1 mil and a seal initiation temperature (SIT) of ≤80° C. when measured at a film thickness of about 2 mil.

Some embodiments of the present disclosure provide films with improvements in machine direction (MD) modulus (1% and/or 2%) and oxygen transmission rates (OTRs) relative to films formed from comparative polyethylene. Hence, in an embodiment of the disclosure, a film layer having a thickness of from 0.5 to 10 mil, has a machine direction (MD) 1% secant modulus of ≥200 MPa when measured at a film thickness of about 1 mil and an oxygen transmission rate (OTR) of ≥600 cm³ per 100 inch² per day when measured at a film thickness of about 1 mil.

In an embodiment of the disclosure, the films manufactured using the polyethylene compositions will have good hot tack performance. Good hot tack performance is generally associated with good film performance in bag or pouch packaging lines, such as vertical-form-fill-seal (VFFS) applications lines. Without wishing to be bound by theory, in the hot tack profile (seal temperature vs. force), good hot tack performance is indicated by an early (or low) hot tack initiation temperature, then a relatively high force over a wide range of seal temperatures.

Some embodiments of the present disclosure provide films with improvements in machine direction (MD) modulus (1% and/or 2%) and area of hot tack window (AHTW) relative to films formed from comparative polyethylene.

Hence, in an embodiment of the disclosure, a film layer having a thickness of from 0.5 to 10 mil, has a machine direction (MD) 1% secant modulus of ≥200 MPa when measured at a film thickness of about 1 mil and an area of hot tack window (AHTW) of ≥220 Newtons·° C. when measured at a film thickness of about 2 mil.

Some embodiments of the present disclosure provide films with improvements in machine direction (MD) modulus (1% and/or 2%) and seal initiation temperature relative to films formed from comparative polyethylene. Hence, in an embodiment of the disclosure, a film layer having a thickness of from 0.5 to 10 mil, has a machine direction (MD) 1% secant modulus of ≥200 MPa when measured at a film thickness of about 1 mil and a seal initiation temperature (SIT) of ≤85° C. when measured at a film thickness of about 2 mil.

Some embodiments of the present disclosure provide films with improvements in machine direction (MD) modulus (1% and/or 2%), oxygen transmission rates, seal initiation temperature and area of hot tack window (AHTW) relative to films formed from comparative polyethylene. Hence, in an embodiment of the disclosure, a film layer having a thickness of from 0.5 to 10 mil, has a has a machine direction (MD) 1% secant modulus of ≥200 MPa when measured at a film thickness of about 1 mil, an oxygen transmission rate (OTR) of ≥600 cm³ per 100 inch² per day when measured at a film thickness of about 1 mil, a seal initiation temperature (SIT) of ≤85° C. when measured at a film thickness of about 2 mil, and an area of hot tack window (AHTW) of ≥220 Newtons·° C. when measured at a film thickness of about 2 mil.

In an embodiment of the disclosure, film satisfies the following relationship: area of hot tack window (AHTW)>−2.0981 (machine direction (MD) 1% secant modulus)+564.28; where the AHTW is measured at a film thickness of about 2 mil, and the machine direction (MD) 1% secant modulus is measured at a film thickness of about 1 mil.

In an embodiment of the disclosure, film satisfies the following relationship: oxygen transmission rate (OTR)>−5.4297 (machine direction (MD) 1% secant modulus)+1767.8; where the OTR is measured at a film thickness of about 1 mil, and the machine direction (MD) 1% secant modulus is measured at a film thickness of about 1 mil.

In an embodiment of the disclosure, film satisfies the following relationship: seal initiation temperature (SIT)<0.366 (machine direction (MD) 1% secant modulus)+22.509; where the SIT is measured at a film thickness of about 2 mil, and the machine direction (MD) 1% secant modulus is measured at a film thickness of about 1 mil.

In an embodiment of the disclosure, film satisfies the following relationships: area of hot tack window (AHTW)>−2.0981 (machine direction (MD) 1% secant modulus)+564.28; where the AHTW is measured at a film thickness of about 2 mil, and the machine direction (MD) 1% secant modulus is measured at a film thickness of about 1 mil.

In an embodiment of the disclosure, film satisfies the following relationship: oxygen transmission rate (OTR)>−5.4297 (machine direction (MD) 1% secant modulus)+1767.8; where the OTR is measured at a film thickness of about 1 mil, and the machine direction (MD) 1% secant modulus is measured at a film thickness of about 1 mil.

In an embodiment of the disclosure, film satisfies each of the following relationships: i) area of hot tack window (AHTW)>−2.0981 (machine direction (MD) 1% secant modulus)+564.28, where the AHTW is measured at a film thickness of about 2 mil, and the machine direction (MD) 1% secant modulus is measured at a film thickness of about 1 mil; ii) oxygen transmission rate (OTR)>−5.4297 (machine direction (MD) 1% secant modulus)+1767.8, where the OTR is measured at a film thickness of about 1 mil, and the machine direction (MD) 1% secant modulus is measured at a film thickness of about 1 mil; and iii) seal initiation temperature (SIT)<0.366 (machine direction (MD) 1% secant modulus)+22.509, where the SIT is measured at a film thickness of about 2 mil, and the machine direction (MD) 1% secant modulus is measured at a film thickness of about 1 mil.

In an embodiment of the disclosure, a film layer having a thickness of from 0.5 to 10 mil, satisfies at least one of the following relationships: i) area of hot tack window (AHTW)−2.0981 (machine direction (MD) 1% secant modulus)+564.28, where the AHTW is measured at a film thickness of about 2 mil, and the machine direction (MD) 1% secant modulus is measured at a film thickness of about 1 mil; ii) oxygen transmission rate (OTR)>−5.4297 (machine direction (MD) 1% secant modulus)+1767.8, where the OTR is measured at a film thickness of about 1 mil, and the machine direction (MD) 1% secant modulus is measured at a film thickness of about 1 mil; and iii) seal initiation temperature (SIT)<0.366 (machine direction (MD) 1% secant modulus)+22.509, where the SIT is measured at a film thickness of about 2 mil, and the machine direction (MD) 1% secant modulus is measured at a film thickness of about 1 mil.

In an embodiment of the disclosure, a film layer having a thickness of from 0.5 to 10 mil, satisfies each of the following relationships: i) area of hot tack window (AHTW)>−2.0981 (machine direction (MD) 1% secant modulus)+564.28, where the AHTW is measured at a film thickness of about 2 mil, and the machine direction (MD) 1% secant modulus is measured at a film thickness of about 1 mil; ii) oxygen transmission rate (OTR)>−5.4297 (machine direction (MD) 1% secant modulus)+1767.8, where the OTR is measured at a film thickness of about 1 mil, and the machine direction (MD) 1% secant modulus is measured at a film thickness of about 1 mil; and iii) seal initiation temperature (SIT)<0.366 (machine direction (MD) 1% secant modulus)+22.509, where the SIT is measured at a film thickness of about 2 mil, and the machine direction (MD) 1% secant modulus is measured at a film thickness of about 1 mil.

The films used in the manufactured articles described in this section may optionally include, depending on its intended use, additives and adjuvants. Non-limiting examples of additives and adjuvants include, anti-blocking agents, antioxidants, heat stabilizers, slip agents, processing aids, anti-static additives, colorants, dyes, filler materials, light stabilizers, light absorbers, lubricants, pigments, plasticizers, nucleating agents and combinations thereof.

The following examples are presented for the purpose of illustrating selected embodiments of this disclosure; it being understood, that the examples presented do not limit the claims presented.

EXAMPLES

Test Methods

Prior to testing, each specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Density was determined using ASTM D792-13 (Nov. 1, 2013).

Melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Herein, the term "stress exponent" or its acronym "S.Ex.", is defined by the following relationship: S.Ex.=log ($I_6/I_2$)/log(6480/2160); wherein $I_6$ and $I_2$ are the melt flow rates measured at 190° C. using 6.48 kg and 2.16 kg loads, respectively.

$M_n$, $M_w$, and $M_z$ (g/mol) were determined by high temperature Gel Permeation Chromatography (GPC) with differential refractive index (DRI) detection using universal calibration (e.g. ASTM-D6474-99). GPC data was obtained using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). The molecular weight distribution (MWD) is the weight average molecular weight divided by the number average molecular weight, $M_w/M_n$. The z-average molecular weight distribution is $M_z/M_n$. Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with Cirrus GPC software. The columns were calibrated with narrow distribution polystyrene standards. The polystyrene molecular weights were converted to polyethylene molecular weights using the Mark-Houwink equation, as described in the ASTM standard test method D6474.

The short chain branch frequency (e.g. the short chain branching per thousand backbone carbon atoms, or the SCB/1000C) of ethylene copolymer samples was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements. Unsaturations in the polyethylene composition were also determined by Fourier Transform Infrared Spectroscopy (FTIR) as per ASTM D3124-98.

High temperature GPC equipped with an online FTIR detector (GPC-FTIR) was used to measure the comonomer content as the function of molecular weight.

Crystallization Elution Fractionation (CEF): A polymer sample (20 to 25 mg) was weighed into the sample vial and loaded onto the auto-sampler of the Polymer CEF unit. The vail was filled with 6 to 7 ml 1,2,4-trichlorobenzene (TCB), heated to the desired dissolution temperature (e.g. 160° C.) with a shaking rate of level number 3 for 2 hours. The solution (0.5 ml) was then loaded into the CEF columns (two CEF columns purchased from Polymer Char and installed in series). After allowed to equilibrate at a given stabilization temperature (e.g. 115° C.) for 5 minutes, the polymer solution was allowed to crystallize with a temperature drop from the stabilization temperature to 30° C. After equilibrating at 30° C. for 10 minutes, the soluble fraction was eluted at 30° C. for 10 minutes, followed by the crystallized sample eluted with TCB with a temperature ramp from 30° C. to 110° C. The CEF columns were cleaned at the end of the run for 5 minutes at 150° C. The other CEF run conditions were as follows: cooling rate 0.5° C./minute, flow rate in crystallization 0.02 mL/minute, heating rate 1.0° C./minute and flow rate in elution 2.0 mL/minute. The data were processed using Excel spreadsheet. The "$CDBI_{50}$" is defined as the weight percent of ethylene polymer whose composition is within 50% of the median comonomer composition (50% on each side of the median comonomer composition). The "$CDBI_{50}$" may be calculated from the composition distribution curve, determined by the CEF procedure described above, and the normalized cumulative integral of the composition distribution curve, as illustrated in U.S. Pat. No. 5,376,439 or WO 93/03093.

The "Composition Distribution Branching Index" or "CDBI" may alternatively by determined using a crystal-TREF unit commercially available form Polymer ChAR (Valencia, Spain). The acronym "TREF" refers to Temperature Rising Elution Fractionation. A sample of the polyethylene composition (80 to 100 mg) was placed in the reactor of the Polymer ChAR crystal-TREF unit, the reactor was filled with 35 ml of 1,2,4-trichlorobenzene (TCB), heated to 150° C. and held at this temperature for 2 hours to dissolve the sample. An aliquot of the TCB solution (1.5 mL) was then loaded into the Polymer ChAR TREF column filled with stainless steel beads and the column was equilibrated for 45 minutes at 110° C. The polyethylene composition was then crystallized from the TCB solution, in the TREF column, by slowly cooling the column from 110° C. to 30° C. using a cooling rate of 0.09° C. per minute. The TREF column was then equilibrated at 30° C. for 30 minutes. The crystallized polyethylene composition was then eluted from the TREF column by passing pure TCB solvent through the column at a flow rate of 0.75 mL/minute as the temperature of the column was slowly increased from 30° C. to 120° C. using a heating rate of 0.25° C. per minute. Using Polymer ChAR software a TREF distribution curve was generated as the polyethylene composition was eluted from the TREF column, i.e. a TREF distribution curve is a plot of the quantity (or intensity) of polyethylene composition eluting from the column as a function of TREF elution temperature. A $CDBI_{50}$ may be calculated from the TREF distribution curve for each polyethylene composition analyzed. The "CDBI$_{50}$" is defined as the weight percent of ethylene polymer whose composition is within 50% of the median comonomer composition (50% on each side of the median comonomer composition); it is calculated from the TREF composition distribution curve and the normalized cumulative integral of the TREF composition distribution curve. Those skilled in the art will understand that a calibration curve is required to convert a TREF elution temperature to comonomer content, i.e. the amount of comonomer in the polyethylene composition fraction that elutes at a specific temperature. The generation of such calibration curves are described in the prior art, e.g. Wild, et al., J. Polym. Sci., Part B, Polym. Phys., Vol. 20 (3), pages 441-455: hereby fully incorporated by reference. Note: The "CDBI$_{25}$" is defined as the weight percent of polyethylene composition whose composition is within 25% of the median comonomer composition (25% on each side of the median comonomer composition).

Dynamic mechanical analyses were carried out with a rheometer, namely Rheometrics Dynamic Spectrometer (RDS-II) or Rheometrics SR5 or ATS Stresstech, on compression molded samples under nitrogen atmosphere at 190° C., using 25 mm diameter cone and plate geometry. The oscillatory shear experiments were done within the linear viscoelastic range of strain (10% strain) at frequencies from 0.05 to 100 rad/s. The values of storage modulus (G'), loss modulus (G"), complex modulus (G*) and complex viscosity ($\eta^*$) were obtained as a function of frequency. The same rheological data can also be obtained by using a 25 mm diameter parallel plate geometry at 190° C. under nitrogen atmosphere. The Zero shear viscosity is estimated using the Ellis model, i.e. $\eta(\omega)=\eta_0/(1+\tau/\tau_{1/2})^{\alpha-1}$, where $\eta_0$ is the zero shear viscosity. $\tau_{1/2}$ is the value of the shear stress at which $\eta=\eta_0/2$ and $\alpha$ is one of the adjustable parameters. The Cox-Merz rule is assumed to be applicable in the present disclosure.

The DRI, is the "dow rheology index", is defined by the equation: DRI=$[365000(\tau_0/\eta_0)-1]/10$; wherein $\tau_0$ is the characteristic relaxation time of the polyethylene and $\eta_0$ is the zero shear viscosity of the material. The DRI is calculated by least squares fit of the rheological curve (dynamic complex viscosity versus applied frequency eg. 0.01-100 rads/s) as described in U.S. Pat. No. 6,114,486 with the following generalized Cross equation, i.e. $\eta(\omega)=\eta_0/[1+(\omega\tau_0)^n]$; wherein n is the power law index of the material, $\eta(\omega)$ and $\omega$ are the measured complex viscosity and applied frequency data respectively. When determining the DRI, the zero shear viscosity, $\eta_0$ used was estimated with the Ellis model, rather than the Cross model.

The crossover frequency is the frequency at which storage modulus (G') and loss modulus (G") curves cross with each other, while G'@G"=500 Pa is the storage modulus at which the loss modulus (G") is at 500 Pa.

Primary melting peak (° C.), melting peak temperatures (° C.), heat of fusion (J/g) and crystallinity (%) was determined using differential scanning calorimetry (DSC) as follows: the instrument was first calibrated with indium; after the calibration, a polymer specimen is equilibrated at 0° C. and then the temperature was increased to 200° C. at a heating rate of 10° C./min; the melt was then kept isothermally at 200° C. for five minutes; the melt was then cooled to 0° C. at a cooling rate of 10° C./min and kept at 0° C. for five minutes; the specimen was then heated to 200° C. at a heating rate of 10° C./min. The DSC Tm, heat of fusion and crystallinity are reported from the 2$^{nd}$ heating cycle.

Film dart impact strength was determined using ASTM D1709-09 Method A (May 1, 2009). In this disclosure the dart impact test employed a 1.5 inch (38 mm) diameter hemispherical headed dart.

The film "ASTM puncture" is the energy (J/mm) required to break the film was determined using ASTM D5748-95 (originally adopted in 1995, reapproved in 2012). The puncture test is performed on a mechanical tester, in which the puncture probe is attached to the load cell which is mounted on a moving crosshead. The film is clamped into a clamping mechanism which has a 4 inch (102 mm) diameter opening. The clamping mechanism is attached to a fixed plate. The cross head speed is set at 10 in/min (255 mm/min). The maximum force and energy to puncture the film are recorded.

The "slow puncture" or "lubricated puncture" test was performed as follows: the energy (J/mm) to puncture a film sample was determined using a 0.75-inch (1.9-cm) diameter pear-shaped fluorocarbon coated probe travelling at 10-inch per minute (25.4-cm/minute). ASTM conditions were employed. Prior to testing the specimens, the probe head was manually lubricated with Muko Lubricating Jelly to reduce friction. Muko Lubricating Jelly is a water-soluble personal lubricant available from Cardinal Health Inc., 1000 Tesma Way, Vaughan, ON L4K 5R8 Canada. The probe was mounted in an Instron Model 5 SL Universal Testing Machine and a 1000-N load cell as used. Film samples (1.0 mil (25 μm) thick, 5.5 inch (14 cm) wide and 6 inch (15 cm) long) were mounted in the Instron and punctured. The following film tensile properties were determined using ASTM D882-12 (Aug. 1, 2012): tensile break strength (MPa), elongation at break (%), tensile yield strength (MPa), tensile elongation at yield (%) and film toughness or total energy to break (ft-lb/in$^3$). Tensile properties were measured in the both the machine direction (MD) and the transverse direction (TD) of the blown films.

The secant modulus is a measure of film stiffness. The secant modulus is the slope of a line drawn between two points on the stress-strain curve, i.e. the secant line. The first point on the stress-strain curve is the origin, i.e. the point that corresponds to the origin (the point of zero percent strain and zero stress), and; the second point on the stress-strain curve is the point that corresponds to a strain of 1%; given these two points the 1% secant modulus is calculated and is expressed in terms of force per unit area (MPa). The 2% secant modulus is calculated similarly. This method is used to calculated film modulus because the stress-strain relationship of polyethylene does not follow Hook's law; i.e. the stress-strain behavior of polyethylene is non-linear due to its viscoelastic nature. Secant moduli were measured using a conventional Instron tensile tester equipped with a 200 lbf load cell. Strips of monolayer film samples were cut for testing with following dimensions: 14 inch long, 1 inch wide and 1 mil thick; ensuring that there were no nicks or cuts on the edges of the samples. Film samples were cut in both the machine direction (MD) and the transverse direction (TD) and tested. ASTM conditions were used to condition the samples. The thickness of each film was accurately measured with a hand-held micrometer and entered along with the sample name into the Instron software. Samples were loaded in the Instron with a grip separation of 10 inch and pulled at a rate of 1 inch/min generating the strain-strain curve. The 1% and 2% secant modulus were calculated using the Instron software.

The oxygen transmission rate (OTR) of the blown film was tested using an Oxtran 2/20 instrument manufactured by MOCON Inc, Minneapolis, Minn., USA. The instrument has two test cells (A and B) and each film sample was analyzed in duplicate. The OTR result reported is the average of the results from these two test cells (A and B). The test is carried out at a temperature of 23° C. and at a relative humidity of 0%. The film sample area used for testing was 100 cm². The carrier gas used was 2% hydrogen gas in a balance of nitrogen gas and the test gas is ultra high purity oxygen. The blown films which were tested each had a film thickness of 1 mil.

Puncture-propagation tear resistance of blown film was determined using ASTM D2582-09 (May 1, 2009). This test measures the resistance of a blown film to snagging, or more precisely, to dynamic puncture and propagation of that puncture resulting in a tear. Puncture-propagation tear resistance was measured in the machine direction (MD) and the transverse direction (TD) of the blown films.

Film tear performance was determined by ASTM D1922-09 (May 1, 2009); an equivalent term for tear is "Elmendorf tear". Film tear was measured in both the machine direction (MD) and the transverse direction (TD) of the blown films.

Film optical properties were measured as follows: Haze, ASTM D1003-13 (Nov. 15, 2013), and; Gloss ASTM D2457-13 (Apr. 1, 2013).

In this disclosure, the "Hot Tack Test" was performed as follows, using ASTM conditions. Hot tack data was generated using a J&B Hot Tack Tester which is commercially available from Jbi Hot Tack, Geloeslaan 30, B-3630 Maamechelen, Belgium. In the hot tack test, the strength of a polyolefin to polyolefin seal is measured immediately after heat sealing two film samples together (the two film samples were cut from the same roll of 2.0 mil (51-μm) thick film), i.e. when the polyolefin macromolecules that comprise the film are in a semi-molten state. This test simulates the heat sealing of polyethylene films on high speed automatic packaging machines, e.g., vertical or horizontal form, fill and seal equipment. The following parameters were used in the J&B Hot Tack Test: film specimen width, 1 inch (25.4 mm); film sealing time, 0.5 second; film sealing pressure, 0.27 N/mm²; delay time, 0.5 second; film peel speed, 7.9 in/second (200 mm/second); testing temperature range, 131° F. to 293° F. (55° C. to 145° C.); temperature increments, 9° F. (5° C.); and five film samples were tested at each temperature increment to calculate average values at each temperature. In this way, a hot tack profile of pulling force vs sealing temperature is generated. The following data can be calculated from this hot tack profile: the "Tack Onset @ 1.0 N (° C.)", is the temperature at which a hot tack force of 1N was observed (an average of five film samples); the "Max Hot tack Strength (N)", is the maximum hot tack force observed (an average of five film samples) over the testing temperature range; the "Temperature-Max. Hot tack (° C.)", is the temperature at which the maximum hot tack force was observed. Finally, the area of the hot-tack (strength) window (the "area of hot tack window" or the "AHTW") is an estimate of the area under this hot tack profile from the hot-tack on-set temperature to the temperature immediately prior to the melting of the specimen. The latter temperature prior to the melting of the specimen is typically at 130° C., but not necessarily at 130° C. Piece-wise regressions (linear or polynomial) were performed for different segments of the hot tack profile to obtain the mathematical relationships between seal temperature and pulling force. The partial area of each temperature-force segment was then calculated. The total area (AHTW) is the summation of each partial area of each segment of the hot tack profile within the specified range (i.e., from the hot-tack on-set temperature to the temperature immediately prior to the melting of the specimen).

In this disclosure, the "Heat Seal Strength Test" (also known as "the cold seal test") was performed as follows. ASTM conditions were employed. Heat seal data was generated using a conventional Instron Tensile Tester. In this test, two film samples are sealed over a range of temperatures (the two film samples were cut from the same roll of 2.0 mil (51-μm) thick film). The following parameters were used in the Heat Seal Strength (or cold seal) Test: film specimen width, 1 inch (25.4 mm); film sealing time, 0.5 second; film sealing pressure, 40 psi (0.28 N/mm²); temperature range, 212° F. to 302° F. (100° C. to 150° C.) and temperature increment, 9° F. (5° C.). After aging for at least 24 hours at ASTM conditions, seal strength was determined using the following tensile parameters: pull (crosshead) speed, 12 inch/min (2.54 cm/min); direction of pull, 90° to seal, and; 5 samples of film were tested at each temperature increment. The Seal Initiation Temperature, hereafter S.I.T., is defined as the temperature required to form a commercially viable seal; a commercially viable seal has a seal strength of 2.0 lb per inch of seal (8.8 N per 25.4 mm of seal).

The hexane extractable content of a polymer sample was determined according to the Code of Federal Registration 21 CFR § 177.1520 Para (c) 3.1 and 3.2; wherein the quantity of hexane extractable material in a film is determined gravimetrically. Elaborating, 2.5 grams of 3.5 mil (89 μm) monolayer film was placed in a stainless steel basket, the film and basket were weighed ($w^i$), while in the basket the film was: extracted with n-hexane at 49.5° C. for two hours; dried at 80° C. in a vacuum oven for 2 hours; cooled in a desiccator for 30 minutes, and; weighed ($w^f$). The percent loss in weight is the percent hexane extractable ($w^{C6}$): $w^{C6}=100\times(w^i-w^f)/w^i$.

Polyethylene Compositions

A polyethylene composition comprising a first, second and third polyethylene was made by melt blending polyethylene composition A with polyethylene B.

Polyethylene composition A was made using a single site catalyst system in a dual parallel reactor solution polymerization process. As a result, polyethylene composition A comprised a first polyethylene made with a single site catalyst and a second polyethylene made with a single site catalyst. A parallel mode solution phase polymerization reactor process, has been described in U.S. patent application Ser. No. 15/491,264 (co-pending with the present application). Basically, in parallel mode the exit streams exiting each of a first reactor (R1) and a second reactor (R2) are combined downstream of each reactor and the polymer product is obtained after devolatilization.

The following examples illustrate the continuous solution copolymerization of ethylene and 1-octene at medium pressure in a dual reactor system connected in parallel. The first and second reactor pressure was about 16,000 kPa (about 2.3×10³ psi). The first reactor was operated at a lower temperature than the second reactor. The first reactor had a volume of 12 liters and the second reactor had a volume of 24 liters. Both reactors were agitated to ensure good mixing of the reactor contents. The process was continuous in all feed streams (i.e. solvents, which were methyl pentane and xylene; monomers and catalyst and cocatalyst components) and in the removal of product. Monomer (ethylene) and comonomer (1-octene) were purified prior to addition to the reactor using conventional feed preparation systems (such as contact with various absorption media to remove impurities such as water, oxygen and polar contaminants). The reactor feeds were pumped to the reactors at the ratios shown in Table 1. Average residence times for the reactors are calculated by dividing average flow rates by reactor volume. The residence time in each reactor for all of the inventive experiments was less than 10 minutes and the reactors were well mixed. The catalyst deactivator used was octanoic acid (caprylic acid), commercially available from P&G Chemicals, Cincinnati, Ohio, U.S.A.

The following single site catalyst (SSC) components were used to prepare the first polyethylene in a first reactor ($R_1$) configured in parallel to a second reactor ($R_2$): cyclopentadienyl tri(tertiarybutyl)phosphinimine titanium dichloride [Cp((t-Bu)$_3$PN)TiCl$_2$]; methylaluminoxane (MMAO-07); trityl tetrakis(pentafluoro-phenyl)borate (trityl borate), and 2,6-di-tert-butyl-4-ethylphenol (BHEB). Methylaluminoxane (MMAO-O7) and 2,6-di-tert-butyl-4-ethylphenol are premixed in-line and then combined with cyclopentadienyl tri(tertiarybutyl)phosphinimine titanium dichloride [Cp((t-Bu)$_3$PN)TiCl$_2$] and trityl tetrakis(pentafluoro-phenyl)borate just before entering the polymerization reactor ($R_1$).

The following single site catalyst (SSC) components were used to prepare the second polyethylene in a second reactor ($R_2$) configured in parallel to a first reactor ($R_1$): cyclopentadienyl tri(tertiary butyl)phosphinimine titanium dichloride [Cp((t-Bu)$_3$PN)TiCl$_2$]; methylaluminoxane (MMAO-07); trityl tetrakis(pentafluoro-phenyl)borate (trityl borate), and 2,6-di-tert-butyl-4-ethylphenol (BHEB). Methylaluminoxane (MMAO-07) and 2,6-di-tert-butyl-4-ethylphenol are premixed in-line and then combined with cyclopentadienyl tri(tertiarybutyl)phosphinimine titanium dichloride [Cp((t-Bu)$_3$PN)TiCl$_2$] and trityl tetrakis(pentafluoro-phenyl)borate just before entering the polymerization reactor (R1).

Polyethylene B, on the other hand is made in a single solution polymerization reactor using a single site catalyst, as described above; however, in this example the single site catalyst was fed only to a second reactor (R2) to prepare polyethylene B in a single reactor. For the sake of clarity, polyethylene B becomes the third polyethylene within the final polyethylene composition.

Table 1, shows the reactor conditions used to make polyethylene composition A, as well as polyethylene B. The properties of polyethylene composition A, as well as polyethylene B are shown in Table 2.

TABLE 1

Reactor Operating Conditions

| Description | Blending Component | |
|---|---|---|
| | PE Composition A SSC in R1 and SSC in R2 (dual reactor in parallel mode) | PE B SSC in R2 (single reactor) |
| Reactor 1 (R1) | SSC | NA |
| TSR (kg/hr) | 434.9 | NA |
| Ethylene concentration (wt %) | 6.4 | NA |
| 1-Octene/ethylene in fresh feed (g/g) | 2.97 | NA |
| Primary feed temperature (° C.) | 35.0 | NA |
| Mean Temperature (° C.) | 120.6 | NA |
| Ethylene conversion | 90.1 | NA |
| Hydrogen Feed (ppm) | 0.27 | NA |
| Catalyst (ppm) to R1 | 0.52 | NA |
| SSC - Al/Ti (mol/mol) | 100 | NA |
| SSC - BHEB/Al (mol/mol) | 0.3 | NA |
| SSC - B/Ti (mol/mol) | 1.2 | NA |
| Reactor 2 (R2) | SSC | SSC |
| TSR (kg/hr) | 189.9 | 650 |
| Ethylene concentration (wt %) | 12.48 | 11.0 |
| 1-Octene/ethylene in fresh feed (g/g) | 0.0 | 0.02 |
| Primary feed temperature (° C.) | 45.0 | 45.0 |
| Mean Temperature (° C.) | 186.3 | 175.4 |
| Ethylene conversion | 89.8 | 89.5 |
| Hydrogen Feed (ppm) | 0.9 | 1.33 |
| Catalyst (ppm) to R2 | 0.38 | 0.12 |
| SSC - Al/Ti (mol/mol) | 65 | 65.0 |
| SSC - BHEB/Al (mol/mol) | 0.3 | 0.30 |
| SSC - B/Ti (mol/mol) | 0.9 | 1.5 |

TABLE 2

Blend Component Properties

| Description | Blending Component | |
|---|---|---|
| | PE Composition A SSC in R1 and SSC in R2 (dual reactor in parallel mode) | PE B SSC in R2 (single reactor) |
| Catalysts | SSC/SSC | SSC |
| Density (g/cm$^3$) | 0.9088 | 0.9424 |
| Melt Index $I_2$ (g/10 min) | 0.57 | 0.77 |
| Melt Index $I_6$ (g/10 min) | 2.12 | 2.91 |
| Melt Index $I_{10}$ (g/10 min) | 3.73 | 5.06 |
| Melt Index $I_{21}$ (g/10 min) | 11.1 | 13.8 |
| Melt Flow Ratio ($I_{21}/I_2$) | 19.5 | 17.9 |
| Stress Exponent | 1.2 | 1.21 |
| Melt Flow Ratio ($I_{10}/I_2$) | 6.51 | 6.45 |
| Branch Frequency - FTIR | | |
| Branch Freq/1000 C. | 20.2 | 0.5 |
| Comonomer | 1-octene | 1-octene |
| Comonomer Content (mole %) | 4 | 0.1 |
| Comonomer Content (weight %) | 14.4 | 0.4 |
| Internal Unsat/100 C. | 0.016 | 0.009 |
| Side Chain Unsat/100 C. | 0 | 0 |
| Terminal Unsat/100 C. | 0.005 | 0.008 |
| GPC - Conventional | | |
| $M_n$ | 64993 | 57692 |
| $M_w$ | 118812 | 108937 |
| $M_z$ | 188868 | 171703 |
| Polydispersity Index ($M_w/M_n$) | 1.83 | 1.89 |

The properties of the polyethylene composition which was obtained from melt blending polyethylene composition A with polyethylene B (in a ratio of 80 wt % to 20 wt % respectively) are provided in Table 3 as Inventive Example 1. The materials were melt blended using a Coperion ZSK 26 co-rotating twin screw extruder with an L/D of 32:1. The extruder was fitted with an underwater pelletizer and a Gala spin dryer. The materials were co-fed to the extruder using gravimetric feeders to achieve the desired ratios of polyethylene composition A to polyethylene B. The blends were compounded using a screw speed of 200 rpm at an output rate of 15-20 kg/hour and at a melt temperature of 225-230° C.

Data for comparative polyethylene compositions, Comparative Examples 1-9 is also included in Table 3. Comparative Example 1 is ELITE® 5400G, a resin commercially available from the Dow Chemical Company. ELITE 5400G has a density of about 0.916 g/cm³ and a melt index $I_2$ of about 1 dg/min. Comparative Example 2 is SURPASS® FP117-C, a resin commercially available from the NOVA Chemicals Corporation. SURPASS FP117-C has a density of 0.917 g/cm³ and a melt index $I_2$ of 1 dg/min. Comparative Examples 3 and 4 are resins made according to U.S. Pat. Appl. Pub. No. 2016/0108221. Comparative Example 3 is an ethylene/1-octene copolymer, has a density of about 0.917 g/cm³, a melt index $I_2$ of about 0.96 dg/min, and is made in a multi reactor solution process in which a first reactor and a second reactor are configured in series with one another. Comparative Example 4 is an ethylene/1-octene copolymer, has a density of about 0.913 g/cm³, a melt index $I_2$ of about 0.85 dg/min, and is made in a multi reactor solution process in which a first reactor and a second reactor are configured in series with one another. Comparative Example 5 is SCLAIR® FP112-A, a resin commercially available from the NOVA Chemicals Corporation. SCLAIR FP112-A has a density of 0.912 g/cm³ and a melt index $I_2$ of 0.9 dg/min. Comparative Example 6 is EXCEED® 1018CA, a resin commercially available from ExxonMobil. EXCEED 1018CA has a density of about 0.918 g/cm³ and a melt index $I_2$ of about 0.94 dg/min. Comparative Example 7 is MARLEX® D139, a resin commercially available from ChevronPhillips. MARLEX D139 has a density of about 0.918 g/cm³ and a melt index $I_2$ of about 0.9 dg/min. Comparative Example 8 is SCLAIR® FP120-A, a resin commercially available the NOVA Chemicals Corporation. FP120-A has a density of 0.920 g/cm³ and a melt index $I_2$ of 1 dg/min. Comparative Example 9 is SCLAIR® FP026-F, a resin commercially available the NOVA Chemicals Corporation. FP026-F has a density of 0.926 g/cm³ and a melt index $I_2$ of 0.75 dg/min.

TABLE 3

Polyethylene Composition Properties

| | Example No. | | | | |
|---|---|---|---|---|---|
| | Inventive 1 (80 wt % PE Composition A/ 20 wt % PE B) | Comparative 1 | Comp. 2 | Comp. 3 | Comp. 4 |
| Density (g/cm³) | 0.9179 | 0.9159 | 0.9166 | 0.9167 | 0.913 |
| Melt Index $I_2$ (g/10 min) | 0.58 | 1 | 0.99 | 0.96 | 0.85 |
| Melt Index $I_6$ (g/10 min) | 2.23 | 4.46 | 4 | 3.72 | 3.09 |
| Melt Index $I_{10}$ (g/10 min) | | 8.57 | 7.57 | 6.65 | |
| Melt Index $I_{21}$ (g/10 min) | 11.7 | 31.3 | 29 | 24.4 | |
| Melt Flow Ratio ($I_{21}/I_2$) | 20.2 | 31.4 | 29.4 | 25.4 | 21.5 |
| Stress Exponent | 1.22 | 1.36 | 1.27 | 1.23 | 1.21 |
| Melt Flow Ratio ($I_{10}/I_2$) | | 8.61 | 7.67 | 7.24 | 6.78 |
| Rheological Properties | | | | | |
| Zero Shear Viscosity - 190° C. (Pa-s) | 17610 | 15600 | 8688 | 9433 | 11350 |
| Crossover Frequency - 190° C. (rad/s) | 103.88 | 110.98 | 73.56 | 81.27 | 98.88 |
| DRI | 0.344 | 2.41 | 0.26 | 0.23 | 0.22 |
| G'@G"500 Pa = | 42.8 | 79.3 | 22.8 | 23.9 | 32 |
| Branch Frequency - FTIR | | | | | |
| Branch Freq/1000 C | 17.1 | 15.2 | 14.1 | 15.6 | 17.1 |
| Comonomer | 1-octene | 1-octene | 1-octene | 1-octene | 1-octene |
| Comonomer Content (mole %) | 3.4 | 3 | 2.8 | 3.1 | 3.4 |
| Comonomer Content (wt %) | 12.4 | 11.2 | 10.4 | 11.4 | 12.7 |
| Internal Unsat/100 C | 0.015 | 0.003 | 0.019 | 0.009 | 0.007 |

TABLE 3-continued

| Polyethylene Composition Properties | | | | | |
|---|---|---|---|---|---|
| Side Chain Unsat/100 C | 0 | 0.004 | 0.003 | 0.006 | 0.003 |
| Terminal Unsat/100 C | 0.005 | 0.029 | 0.006 | 0.046 | 0.027 |
| CEF | | | | | |
| Soluble fraction (%), ≤30° C. | 8.04 | 2.05 | 0.77 | 3.78 | 2.42 |
| High temperature fraction % | 56.2 | 24.14 | 7.22 | 13.74 | 19.72 |
| $CDBI_{50}$ | 22.2 | 66.9 | 81.6 | 66.4 | 70.4 |
| DSC | | | | | |
| First Melting Peak (° C.) | 77.29 | 101 | 109 | 105.7 | 100.0 |
| Second Melting Peak (° C.) | 126.64 | 118 | 112 | 117.4 | 119.3 |
| Third Melting Peak (° C.) | 129.86 | 122 | — | 121.2 | 122.8 |
| Heat of Fusion (J/g) | 131.12 | 119 | 123 | 123.9 | 112.6 |
| Crystallinity (%) | 45.21 | 41.19 | 42.29 | 42.72 | 38.82 |
| GPC - Conventional | | | | | |
| $M_n$ | 58229 | 36781 | 33939 | 33939 | 44573 |
| $M_w$ | 113744 | 99802 | 102503 | 102503 | 114666 |
| $M_z$ | 179056 | 210866 | 234321 | 234321 | 262824 |
| Polydispersity Index ($M_w/M_n$) | 1.95 | 2.71 | 3.02 | 3.02 | 2.57 |
| Mz/Mw | 1.57 | 2.11 | 2.29 | 2.29 | 2.29 |
| Hexane Extractables (%) - Plaque | 0.42 | 0.54 | 0.56 | 0.77 | 0.61 |

| | Example No. | | | | |
|---|---|---|---|---|---|
| | Comp. 5 | Comp. 6 | Comp. 7 | Comp. 8 | Comp. 9 |
| Density (g/cm³) | 0.912 | 0.919 | 0.918 | 0.920 | 0.926 |
| Melt Index $I_2$ (g/10 min) | 0.9 | 0.94 | 0.89 | 1 | 0.75 |
| Melt Index $I_6$ (g/10 min) | | 3.16 | 3.14 | 4.29 | 3.02 |
| Melt Index $I_{10}$ (g/10 min) | | 5.16 | 5.22 | — | — |
| Melt Index $I_{21}$ (g/10 min) | | 14.8 | 15.2 | 29.8 | 20.1 |
| Melt Flow Ratio ($I_{21}/I_2$) | 31.4 | 15.8 | 17.2 | 29.8 | 27 |
| Stress Exponent | 1.34 | 1.11 | 1.15 | 1.32 | 1.31 |
| Melt Flow Ratio ($I_{10}/I_2$) | | 5.64 | 5.94 | — | — |
| Rheological Properties | | | | | |
| Zero Shear Viscosity - 190° C. (Pa-s) | 12990 | 7731 | 9198 | 10783 | 14750 |
| Crossover Frequency - 190° C. (rad/s) | 83.76 | 159.80 | 149.38 | 107.5 | 91.93 |
| DRI | | 0.01 | 0.09 | — | — |
| G'@G"500 Pa = | 45.7 | 8 | 34.1 | 41.9 | 47.7 |
| Branch Frequency - FTIR | | | | | |
| Branch Freq/1000 C | 19.2 | 13.4 | 13.1 | | |
| Comonomer | 1-octene | 1-hexene | 1-hexene | 1-octene | 1-octene |
| Comonomer Content (mole %) | 3.8 | 2.7 | 2.6 | 2.6 | 1.7 |

TABLE 3-continued

| Polyethylene Composition Properties | | | | | |
|---|---|---|---|---|---|
| Comonomer Content (wt %) | 13.8 | 9.9 | 9.7 | 9.7 | 6.3 |
| Internal Unsat/100 C | 0.007 | 0.002 | 0.006 | 0.005 | 0.002 |
| Side Chain Unsat/100 C | 0.007 | 0.004 | 0.005 | 0.006 | 0.004 |
| Terminal Unsat/100 C | 0.045 | 0.01 | 0.007 | 0.052 | 0.048 |
| CEF | | | | | |
| Soluble fraction (%), ≤30° C. | 7.13 | 0.57 | 0.57 | 2.85 | 1.14 |
| High temperature fraction % | 18.8 | 21.21 | 24.81 | 24.78 | 36.56 |
| $CDBI_{50}$ | 62.5 | 68.30 | 78.20 | 54.10 | 48.80 |
| DSC | | | | | |
| First Melting Peak (° C.) | 102.0 | 109.52 | 106.26 | 108.93 | 115.24 |
| Second Melting Peak (° C.) | 117.9 | 118.08 | 116.62 | 119.52 | 121.5 |
| Third Melting Peak (° C.) | 121.6 | — | — | — | — |
| Heat of Fusion (J/g) | 110.6 | 126.96 | 125.56 | 132.95 | 144.24 |
| Crystallinity (%) | 38.14 | 43.78 | 43.29 | 45.84 | 49.74 |
| GPC - Conventional | | | | | |
| $M_n$ | 33139 | 55850 | 55399 | 31575 | 35549 |
| $M_w$ | 118358 | 110641 | 106175 | 101954 | 112255 |
| $M_z$ | 379353 | 186289 | 180670 | 302775 | 297745 |
| Polydispersity Index ($M_w/M_n$) | 3.57 | 1.98 | 1.92 | 3.40 | 3.16 |
| Mz/Mw | 3.21 | 1.68 | 1.70 | 2.82 | 2.65 |
| Hexane Extractables (%) - Plaque | 1.40 | 0.26 | 0.37 | 0.44 | 0.22 |

Details of the Inventive polyethylene composition components: the first polyethylene, the second polyethylene, and the third polyethylene, are provided in Table 4. With the exception of the weight percentages, w1 and w2 (which are found by adjusting the de-convoluted values, w1' and w2', as is further discussed below) the data in Table 4 includes the mathematically de-convoluted component properties of polyethylene composition A (which comprised the first polyethylene which was made with a single site catalyst and the second polyethylene which was made with a single site catalyst) as well as the experimentally determined properties of polyethylene B (the third polyethylene which was made with a single site catalyst).

High temperature GPC equipped with an online FTIR detector (GPC-FTIR) was used to measure the comonomer content as a function of molecular weight. In order to de-convolute the polyethylene composition A (which results from use of a SSC in R1 and R2 in parallel mode polymerization) into components, the mathematical deconvolution model described in U.S. Pat. No. 8,022,143 was used. The mathematical deconvolution of the GPC and GPC-FTIR data, the molecular weight distribution of the first polyethylene (the SSC component made in R1, one catalyst site) and the second polyethylene (the SSC component made in R2, one catalyst site) was modeled using a single Schultz Flory distribution (where the Mw/Mn was assumed to be 2; the Mn was Mw/2 and the Mz was $1.5 \times M_w$) as described in U.S. Pat. No. 8,022,143. To improve the deconvolution accuracy and consistency, as a constraint, the melt index, I2, of the modeled composition (i.e. the dual-reactor polyethylene composition A) was set and the following relationship was satisfied during the deconvolution:

$$Log_{10}(I_2)=22.326528+0.003467*[Log_{10}(M_n)]^3-4.322582*Logo(M_w)-0.180061*[Log_{10}(M_z)]^2+0.026478*[Log_{10}(M_z)]^3$$

where the experimentally measured overall melt index (i.e. of polyethylene composition A), $I_2$, was used on the left side of the equation. Hence, a total of two sites (one for each SSC) were used to de-convolute polyethylene composition A. The w(i) and Mn(i), i=1 to 2, were obtained while Mw(i) and Mz(i) of each site were calculated using the above relationships using Mn(i) for each site. During the deconvolution, the overall $M_n$, $M_w$ and $M_z$ of polyethylene composition A was calculated with the following relationships: $M_n=1/Sum(w_i/M_n(i))$, $M_w=Sum(w_i \times M_w(i))$, $M_z=Sum(w_i \times M_z(i)^2)$, where i represents the i-th component and $w_i$ represents the relative weight fraction of the i-th component in the composition from the above 2-site deconvolution. The GPC-FTIR chromatograph profile was subsequently deconvoluted using the w(i) results to obtain SCB(i), i=1 to 2.

The Mn, Mw, Mz and SCB/1000C of the first and second polyethylenes made with a SSC in each of R1 and R2 were then calculated using the above relationships, with the above data of Mn(i), Mw(i), Mz(i), SCB(i) for each catalyst site.

When the polymer made with the single site catalyst in R2 was an ethylene homopolymer, as is the case in the present examples, then during the deconvolution analysis the SCB/1000C for the modeled SSC site was set as zero. If however, the polymer made by the SSC was a copolymer, then the SCB value would be determined for the SSC site using the deconvolution model presented above.

In order to calculate the melt index, 12 of each of the first and second polyethylenes in polyethylene composition A, the following melt index, 12 model was used:

$$\text{Log}_{10}(\text{melt index},I_2)=22.326528+0.003467*[\text{Log}_{10}(M_n)]^3-4.322582*\text{Log}_{10}(M_w)-0.180061*[\text{Log}_{10}(M_z)]^2+0.026478*[\text{Log}_{10}(M_z)]^3$$

where the $M_n$, $M_w$ and $M_z$ were the deconvoluted values of the first or second polyethylene components present in polyethylene composition A, as obtained from the results of the above GPC deconvolution.

The density of the first polyethylene which was an ethylene copolymer made using a single site catalyst was calculated using the following density model: density of the first polyethylene made with a $$SSC=0.979863-0.00594808*(\text{FTIR SCB}/1000C)^{0.65}-0.000383133*[\text{Log}_{10}(M_n)]^3-0.00000577986*(M_w/M_n)^3+0.00557395*(M_z/M_w)^{0.25}$$

where the $M_n$, $M_w$ and $M_z$ were the deconvoluted values of the first polyethylene as obtained from the results of the above GPC deconvolution and the SCB/1000C was obtained from the GPC-FTIR deconvolution. The density of the second polyethylene which was an ethylene homopolymer made with a single site catalyst was determined using the same equation used above for finding the density of the first polyethylene, but with the value for the short chain branching set to zero to cancel out the corresponding term:

density of the second polyethylene made with a
$$SSC=0.979863-0.000383133*[\text{Log}_{10}(M_n)]^3-0.00000577986*(M_w/M_n)^3+0.00557395*(M_z/M_w)^{0.25},$$

The de-convolution provided the density (d1, and d2), melt index ($12^1$ and $12^2$), short chain branching (SCB1 with the SCB2 being set as zero for an ethylene homopolymer) the weight average and number average molecular weights (Mw1, Mn1, Mw2 and Mn2), and the weight fraction (w1' and w2') of the first and second polyethylenes The resulting deconvoluted properties as well as the relative weight percentages w1, w2 (which for the first and the second polyethylenes, respectively, are found by modifying the deconvoluted weight fractions w1' and w2' to match the amount of polyethylene composition A in the final melt blended polyethylene composition, as determined by the blending rules discussed further below) are provided in Table 4.

The following basic blending rules were used to achieve the desired polyethylene compositions comprising a first, a second and a third polyethylene:

w1=weight percentage of the first polyethylene in the final polyethylene composition;
w2=weight percentage of the second polyethylene in the final polyethylene composition;
w3=weight percentage of the third polyethylene in the final polyethylene composition;
w1*=weight percentage of polyethylene composition A in the melt blend;
w2*=weight percentage of polyethylene B in the melt blend;
w1'=weight percentage of the first polyethylene in polyethylene composition A (i.e. the w1' determined from the mathematical deconvolution of polyethylene composition A);
w2'=weight percentage of the second polyethylene in polyethylene composition A (i.e. the w2' determined from the mathematical deconvolution of polyethylene composition A);
where, $w1+w2+w3=1;$ $w1*+w2*=1;$ and $w1'+w2'=1;$ so that, $w1=w1w1';$ $w2=w1w2';$ and $w3=w2*.$

TABLE 4

Polyethylene Composition Component Properties

| | Example No. Inventive PE Composition 1 |
|---|---|
| Polyethylene Composition | |
| Density (g/cm³) | 0.9179 |
| I₂ (dg/min) | 0.58 |
| Stress Exponent | 1.22 |
| MFR (I₂₁/I₂) | 20.2 |
| Mn | 58229 |
| Mw | 113744 |
| Mz | 179056 |
| Mw/Mn | 1.95 |
| Mz/Mw | 1.57 |
| The First Polyethylene | |
| Catalyst Type 1 | Single Site Catalyst |
| weight fraction, w1 | 0.560 |
| | (note: w1' = 0.700 from deconvolution) |
| Mn1 | 57700 |
| Mw1 | 115400 |
| Mw1/Mn1 | 2 (Mw1/Mn1 < 2.3) |
| short chain branches per 1000 carbons | 29.6 |
| I₂¹ (g/10 min.) | 0.48 |
| d1 (g/cm³) | 0.8909 |
| The Second Polyethylene | |
| Catalyst Type 2 | Single Site Catalyst |
| weight fraction, w2 | 0.240 |
| | (note: w2' = 0.300 from deconvolution) |
| Mn2 | 49550 |
| Mw2 | 99100 |
| Mw2/Mn2 | 2 (Mw2/Mn2 < 2.3) |
| short chain branches per 1000 carbons | 0 |
| I₂² (g/10 min) | 0.86 |
| d2 (g/cm³) | 0.9463 |
| The Third Polyethylene | |
| Catalyst Type 3 | Single Site Catalyst |
| weight fraction, w3 | 0.200 |
| Mn3 | 57692 |
| Mw3 | 108937 |
| Mw3/Mn3 | 1.89 (Mw3/Mn3 < 2.3) |
| short chain branches per 1000 carbons | 0.5 |
| I₂³ (g/10 min) | 0.77 |
| d3 (g/cm³) | 0.9424 |

With reference to FIG. 1, a person skilled in the art will recognize that the inventive polyethylene composition has a unimodal GPC profile.

Figure 2:
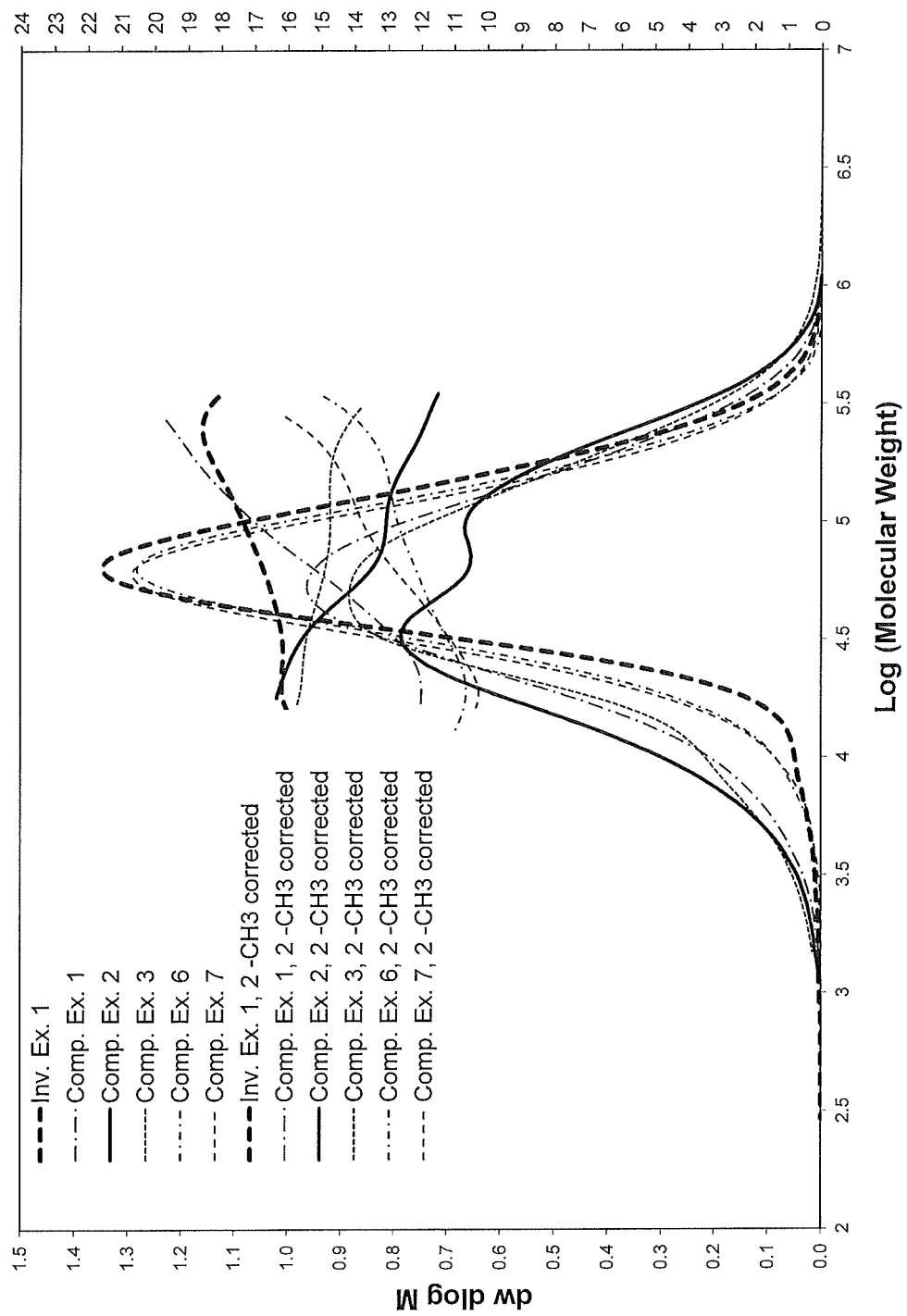
FIG. 2 shows the gel permeation chromatographs with Fourier transform infra-red (GPC-FTIR) detection obtained for a polyethylene composition made according to the present disclosure as well as for some comparative polyethylenes. The comonomer content, shown as the number of short chain branches per 1000 carbons (y-axis), is given relative to the copolymer molecular weight (x-axis). The upwardly sloping line (from left to right) is the short chain branching (in short chain branches per 1000 carbons atoms) determined by FTIR. As can be seen in the Figure, for Inventive Example 1, the number of short chain branches initially increases at higher molecular weights and then decreases again at still higher molecular weights, and hence the comonomer incorporation is said to be "partially reversed" with a peak or maximum present.

With reference to FIG. 2, a person skilled in the art will recognize that the inventive polyethylene composition has a partially reverse comonomer incorporation, where the comonomer incorporation first rises as molecular weight increases, and then falls as the molecular weight increases still further.

Figure 3:
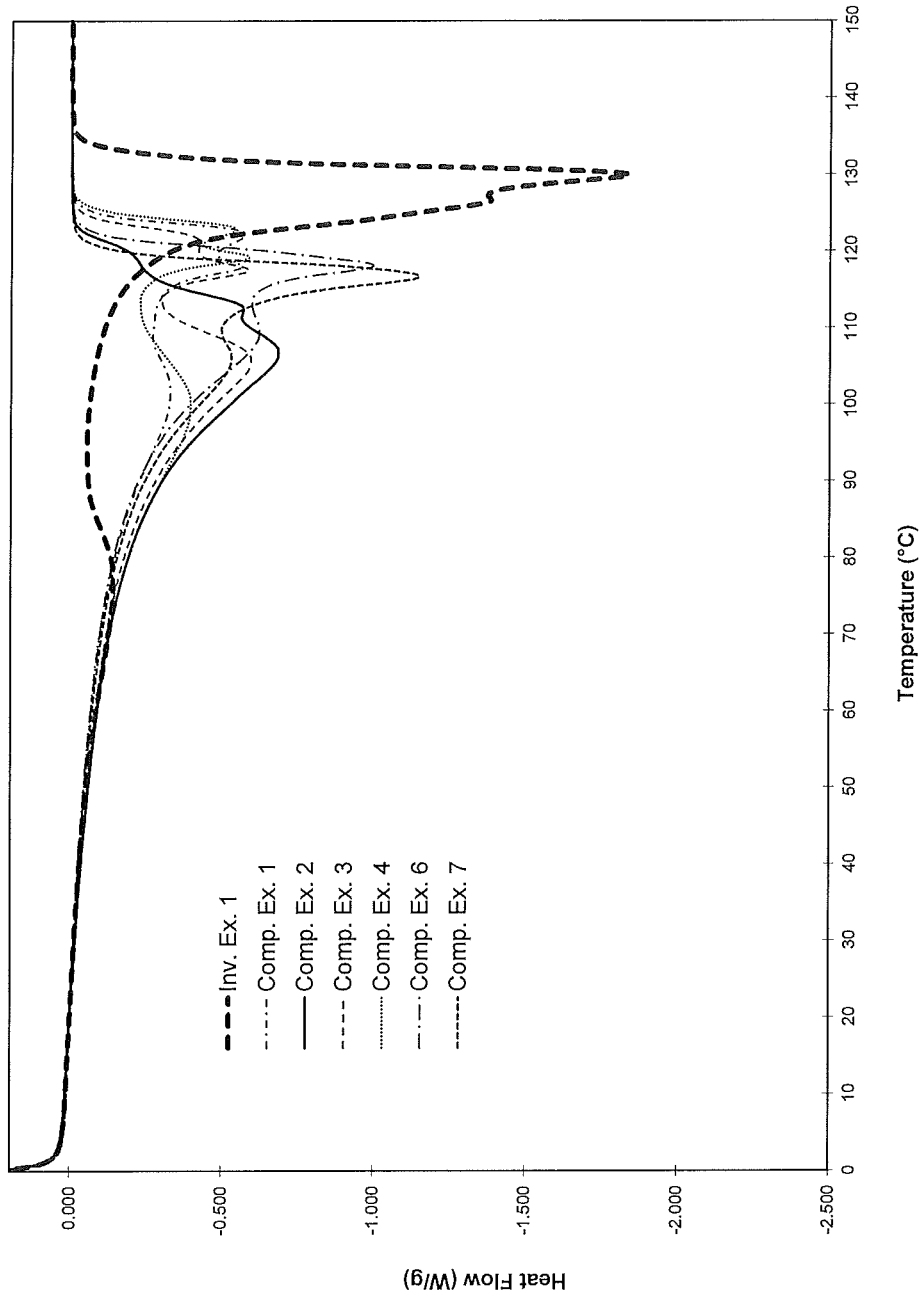
FIG. 3 shows the differential scanning calorimetry analysis (DSC) and profile of a polyethylene composition made according to the present disclosure as well as for some comparative polyethylenes.

With reference to FIG. 3, a person skilled in the art will recognize that the inventive polyethylene composition has a multimodal DSC profile. For Inventive Example 1 the DSC profile is trimodal.

The data in Table 3, clearly shows that in contrast to each of the comparative resins, the inventive polyethylene composition has a significantly lower $CDBI_{50}$ as obtained from a crystallization elution fractionation (CEF) analysis. Inventive Example 1 has $CDBI_{50}$ of less than 45 weight percent (Inventive Example 1, is 22.2 weight percent; while all of the Comparative Examples 1-9, have $CDBI_{50}$ values obtained from a crystallization elution fractionation (CEF) analysis of greater than 45 weight percent).

Blown films were generated by using a 2.5-inch Gloucester blown film line (L/D=24) with a die diameter of 4-inch. The die was coated with polymer processing aid (PPA) by spiking the line with a high concentration of PPA masterbatch to avoid melt fracture. The fixed conditions were die gap of 35 mils (0.0889 cm), frost line height of about 17 inches and output of 100 lbs/hr. Films were collected under different orientation conditions. The monolayer 1-mil film was produced with a blow up ratio (BUR) of 2.5 and the 1-mil films were used for obtaining the physical properties of the films. The monolayer 2-mil film (BUR=2.5) was used for obtaining the cold-seal and hot tack profiles. Data for film blown from the polyethylene compositions of the present disclosure is provided in Table 5, along with data for films made from various comparative resins.

Comparative Example 1 is a film made from ELITE® 5400G, a resin commercially available from the Dow Chemical Company. ELITE 5400G has a density of about 0.916 g/cm³ and a melt index $I_2$ of about 1 dg/min. Comparative Example 2 is a film made from SURPASS® FP117-C, a resin commercially available from the NOVA Chemicals Corporation. SURPASS FP117-C has a density of 0.917 g/cm³ and a melt index $I_2$ of 1 dg/min. Comparative Examples 3 and 4 are films made from resins made according to US Pat. Appl. Pub. No. 2016/0108221. Comparative Example 3 is a film made from an ethylene/1-octene copolymer which has a density of about 0.917 g/cm³, a melt index $I_2$ of about 0.96 dg/min, and which was made in a multi reactor solution process in which a first reactor and a second reactor are configured in series with one another. Comparative Example 4 is a film made from an ethylene/1-octene copolymer which has a density of about 0.913 g/cm³, a melt index $I_2$ of about 0.85 dg/min, and which was made in a multi reactor solution process in which a first reactor and a second reactor are configured in series with one another. Comparative Example 5 is a film made from SCLAIR® FP112-A, a resin commercially available from the NOVA Chemicals Corporation. SCLAIR FP112-A has a density of 0.912 g/cm³ and a melt index $I_2$ of 0.9 dg/min. Comparative Example 6 is a film made from EXCEED® 1018CA, a resin commercially available from ExxonMobil. EXCEED 1018CA has a density of about 0.918 g/cm³ and a melt index $I_2$ of about 0.94 dg/min. Comparative Example 7 is a film made from MARLEX® D139, a resin commercially available from ChevronPhillips. MARLEX D139 has a density of about 0.918 g/cm³ and a melt index $I_2$ of about 0.9 dg/min. Comparative Example 8 is a film made from SCLAIR® FP120-A, a resin commercially available the NOVA Chemicals Corporation. FP120-A has a density of 0.920 g/cm³ and a melt index $I_2$ of 1 dg/min. Comparative Example 9 is a film made from SCLAIR® FP026-F, a resin commercially available the NOVA Chemicals Corporation. FP026-F has a density of 0.926 g/cm³ and a melt index $I_2$ of 0.75 dg/min. In Table 5, the Inventive Example 1 is a film made from the Inventive polyethylene composition of Inventive Example 1.

TABLE 5

Film Properties

| | Example No. | | | |
|---|---|---|---|---|
| | Inventive PE Composition 1 | Comparative 1 | Comparative 2 | Comparative 3 |
| Film Physical Properties | | | | |
| Thickness Profile Ave | 1.03 | 1.03 | 1.01 | 1.04 |
| Film Toughness | | | | |
| Dart Impact (g/mil) | 461 | 818 | 470 | 812 |
| Slow Puncture - Lube/Tef (J/mm) | 42 | 63 | 85 | 98 |
| ASTM Puncture (J/mm) | 93 | 97 | | 66 |
| Film Tear Resistance | | | | |
| Tear - MD (g/mil) | 413 | 247 | 308 | 293 |
| Tear - TD (g/mil) | 560 | 485 | 516 | 540 |
| Film Stiffness | | | | |
| 1% Sec Modulus - MD (Mpa) | 236 | 165 | 129 | 150.4 |
| 1% Sec Modulus - TD (Mpa) | 263.4 | 175 | 131.4 | 167.8 |
| 2% Sec Modulus - MD (Mpa) | 216.8 | 151 | 117 | 141.4 |
| 2% Sec Modulus - TD (Mpa) | 241.4 | 155 | 123.8 | 149.2 |

TABLE 5-continued

| Film Properties | | | | |
|---|---|---|---|---|
| Film Tensile Strength | | | | |
| Tensile Break Str - MD (Mpa) | 56.7 | 44 | 46.4 | 45.4 |
| Tensile Break Str - TD (Mpa) | 48 | 45.5 | 48 | 44.6 |
| Elongation at Break - MD (%) | 663 | 486 | 534 | 521 |
| Elongation at Break - TD (%) | 815 | 725 | 796 | 747 |
| Tensile Yield Str - MD (Mpa) | 11 | 9.1 | 8.8 | 9.1 |
| Tensile Yield Str - TD (Mpa) | 12.2 | 8.7 | 8.8 | 8.9 |
| Tensile Elong at Yield - MD (%) | 10 | 13 | 22 | 13 |
| Tensile Elong at Yield - TD (%) | 10 | 13 | 17 | 14 |
| Film Opticals | | | | |
| Gloss at 45° | 51 | 64 | 50 | 72 |
| Haze (%) | 10.8 | 7.8 | 12 | 5.8 |
| Cold Seal Properties | | | | |
| S.I.T. @ 8.8 N Seal Strength (° C.) | 75.3 | 100.4 | 98.8 | 98.2 |
| Max Force (N) | 24.45 | 24.9 | 19.9 | 23.7 |
| Temp. @ Max Force (° C.) | 165 | 150 | 130 | 160 |
| Hot Tack Properties | | | | |
| Tack Onset @ 1.0 N (° C.) - 2 mil film | 68.15 | 92.5 | 100.5 | 95.4 |
| Max Hottack Strength (N) - 2 mil film | 5.45 | 5.4 | 4.1 | 4.4 |
| Temperature - Max. Hottack (° C.) - 2 mil film | 107.5 | 110 | 115 | 115 |
| AHTW (Newtons · ° C.) | 261 | 140 | 95.3 | 111 |
| OTR (cm$^3$ per 100 inch$^2$ per day) | 715.6 | — | 662.8 | 704.6 |

| | Example No. | | | |
|---|---|---|---|---|
| | Comparative 4 | Comparative 5 | Comparative 6 | Comparative7 |
| Film Physical Properties | | | | |
| Thickness Profile Ave | 1 | 1 | 1.01 | 1.03 |
| Film Toughness | | | | |
| Dart Impact (g/mil) | 891 | 546 | 827 | 688 |
| Slow Puncture - Lube/Tef (J/mm) | | | 80 | 77 |
| ASTM Puncture (J/mm) | 151 | 84 | | |
| Film Tear Resistance | | | | |
| Tear - MD (g/mil) | 231 | 376 | 241 | 186 |
| Tear - TD (g/mil) | 548 | 580 | 358 | 454 |
| Film Stiffness | | | | |
| 1% Sec Modulus - MD (Mpa) | 145 | 113 | 156.8 | 177.6 |
| 1% Sec Modulus - TD (Mpa) | 134 | 111 | 168.8 | 185 |
| 2% Sec Modulus - MD (Mpa) | 149 | 136 | 150.2 | 166.4 |
| 2% Sec Modulus - TD (Mpa) | 136 | 127 | 161.4 | 170.2 |
| Film Tensile Strength | | | | |
| Tensile Break Str - MD (Mpa) | 51.8 | 56.4 | 50.7 | 47.8 |
| Tensile Break Str - TD (Mpa) | 50.6 | 53.5 | 61.1 | 47.8 |
| Elongation at Break - MD (%) | 557 | 479 | 566 | 505 |

TABLE 5-continued

| Film Properties | | | | |
|---|---|---|---|---|
| Elongation at Break - TD (%) | 751 | 761 | 741 | 692 |
| Tensile Yield Str - MD (Mpa) | 7.9 | 8 | 9.7 | 10.1 |
| Tensile Yield Str - TD (Mpa) | 7.6 | 7.7 | 9.9 | 9.2 |
| Tensile Elong at Yield - MD (%) | 10 | 16 | 15 | 16 |
| Tensile Elong at Yield - TD (%) | 10 | 15 | 14 | 12 |
| Film Opticals | | | | |
| Gloss at 45° | 83.8 | 67 | 39 | 84 |
| Haze (%) | 2.9 | 6.8 | 16.2 | 3.3 |
| Cold Seal Properties | | | | |
| S.I.T. @ 8.8 N Seal Strength (° C.) | 93.5 | 89.75 | 102.8 | 102.4 |
| Max Force (N) | 24.4 | 24.70 | 20.6 | 23.4 |
| Temp. @ Max Force (° C.) | 160 | 155 | 140 | 120 |
| Hot Tack Properties | | | | |
| Tack Onset @ 1.0 N (° C.) - 2 mil film | 87 | 78 | 101.2 | 98.6 |
| Max Hottack Strength (N) - 2 mil film | 5.1 | 3.5 | 5.3 | 5.7 |
| Temperature - Max. Hottack (° C.) - 2 mil film | 105 | 120 | 120 | 120 |
| AHTW (Newtons · ° C.) | 151 | 114 | 103 | 103.5 |
| OTR (cm$^3$ per 100 inch$^2$ per day) | 771.5 | 845 | 552.2 | 545.1 |

| | Example. No. | |
|---|---|---|
| | Comparative 8 | Comparative 9 |
| Film Physical Properties | | |
| Thickness Profile Ave (mil) | 1 | 1 |
| Film Toughness | | |
| Dart Impact (g/mil) | 214 | 156 |
| Slow Puncture - Lube/Tef (J/mm) | 73 | 25 |
| ASTM Puncture (J/mm) | 78.5 | 78 |
| Film Tear Resistance | | |
| Tear - MD (g/mil) | 384 | 295 |
| Tear - TD (g/mil) | 616 | 640 |
| Film Stiffness | | |
| 1% Sec Modulus - MD (Mpa) | 193 | 243 |
| 1% Sec Modulus - TD (Mpa) | 197 | 252 |
| 2% Sec Modulus - MD (Mpa) | 176 | 213 |
| 2% Sec Modulus - TD (Mpa) | 179 | 220 |
| Film Tensile Strength | | |
| Tensile Break Str - MD (Mpa) | 52.6 | 38.4 |
| Tensile Break Str - TD (Mpa) | 42.8 | 35.8 |
| Elongation at Break - MD (%) | 608 | 707 |
| Elongation at Break - TD (%) | 767 | 729 |
| Tensile Yield Str - MD (Mpa) | 10.4 | 12.7 |
| Tensile Yield Str - TD (Mpa) | 10.4 | 13.2 |
| Tensile Elong at Yield - MD (%) | 10.2 | 10.5 |
| Tensile Elong at Yield - TD (%) | 10.7 | 13.2 |

TABLE 5-continued

| Film Properties | | |
|---|---|---|
| Film Opticals | | |
| Gloss at 45° | 61.7 | 56 |
| Haze (%) | 11.8 | 14.0 |
| Cold Seal Properties | | |
| S.I.T. @ 8.8 N Seal Strength (° C.) | 107.5 | 116.0 |
| Max Force (N) | 26.5 | 31.9 |
| Temp. @ Max Force (° C.) | 150 | 180 |
| Hot Tack Properties | | |
| Tack Onset @ 1.0 N (° C.) - 2 mil film | 98.75 | 106.4 |
| Max Hottack Strength (N) - 2 mil film | 4.16 | 4.3 |
| Temperature - Max. Hottack (° C.) - 2 mil film | 120 | 140 |
| AHTW (Newtons · ° C.) | 139.1 | 28.4 |
| OTR ($cm^3$ per 100 $inch^2$ per day) | 650.8 | 382.4 |

The data provided in Table 5 together with the data in FIGS. 4-8 demonstrate that the inventive polyethylene composition can be made into a film having a good balance of properties, including good stiffness, good oxygen transmission rates and good sealing properties. For example, and with reference to FIGS. 4-8, the film made from the inventive polyethylene composition has good hot tack and cold seal performance.

Figure 4:
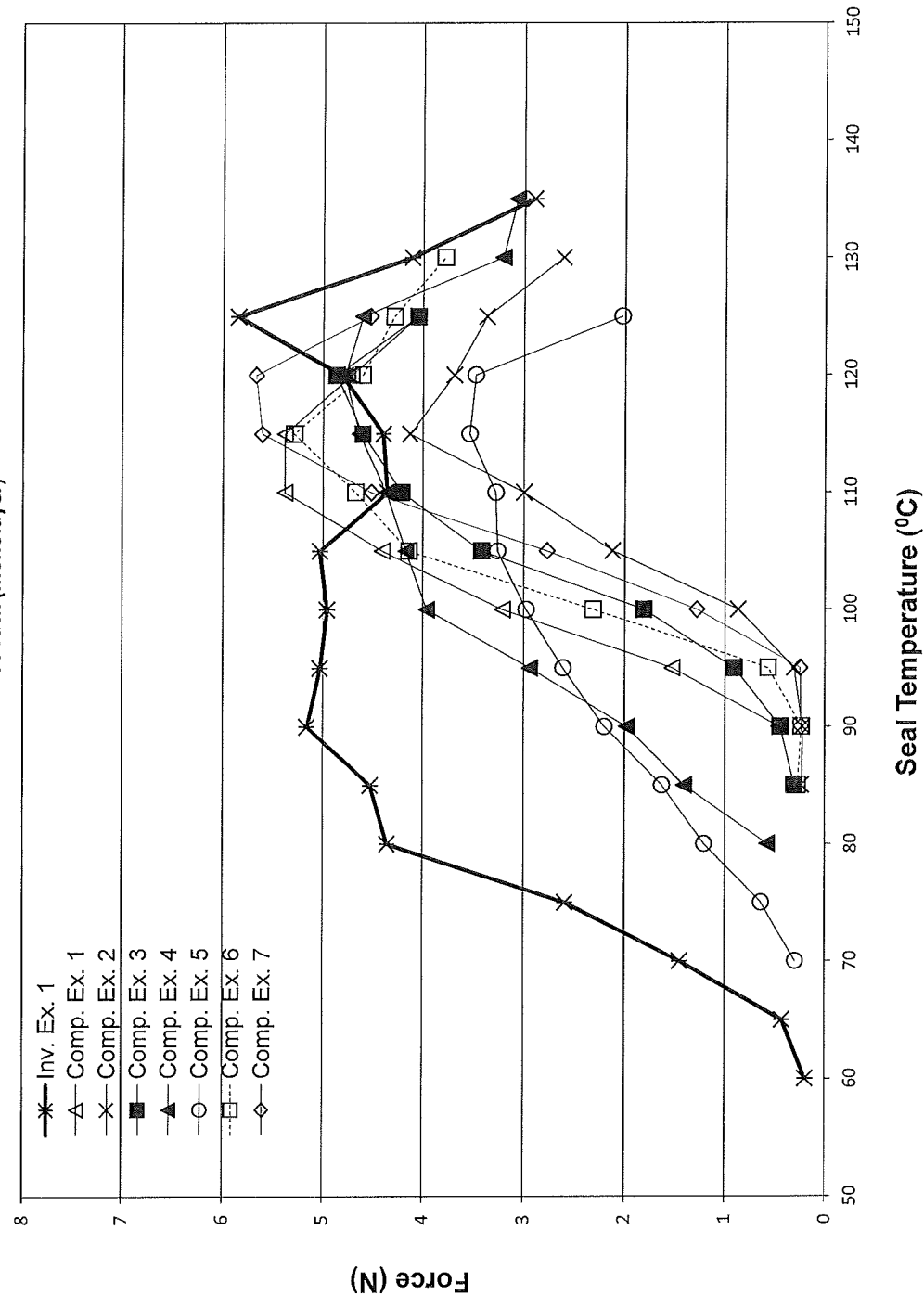
FIG. 4 shows the hot tack profiles for film made using a polyethylene composition made according to the present disclosure as well as those for several comparative polyethylenes.

Without wishing to be bound by theory, in the hot tack (or cold seal) profile (seal temperature vs. seal force), good hot tack (or cold seal) performance is indicated by an early (or low) hot tack (or cold seal) initiation temperature, then a relatively high sealing force over a wide range of hot tack seal temperatures. See for example the shape the curves in FIGS. 4 and 5 for Inventive Example 1, relative to Comparative Examples 1-7. The shape of the hot tack curves for Inventive Example 1, is particularly good and has an early hot tack seal initiation temperature combined by a high sealing force over a wide range of hot tack seal temperatures. In an effort to provide a more quantitatively measurement of this improved hot tack sealing performance, a new parameter, the "area of the hot-tack (strength) window" (the "area of hot tack window" or the "AHTW") has been defined herein. The AHTW is simply an estimate of the area under the hot tack curve from the hot-tack on-set temperature to the temperature immediately prior to the melting of the specimen. As shown in FIG. 4, the temperature prior to the melting of the specimen was typically at 130° C., but not necessarily at 130° C. As shown in Table 5 and in FIG. 4, the Inventive Example 1 has an AHTW of greater than 220 Newtons·° C., whereas each of the Comparative Examples, 1-7, have an AHTW of less than 160 Newtons·° C.

Figure 5:
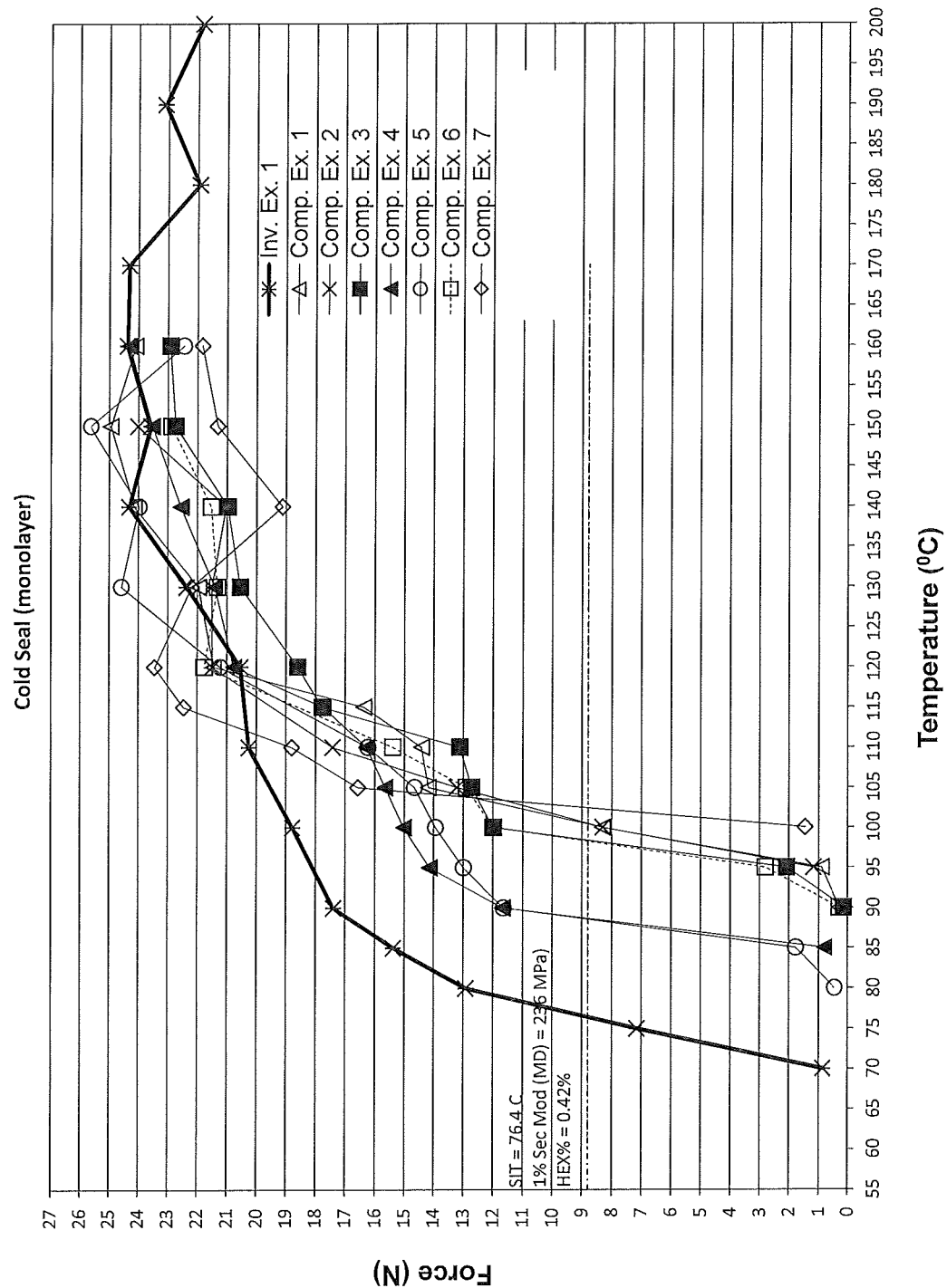
FIG. 5 shows the cold seal profiles for film made using a polyethylene composition made according to the present disclosure as well as those for several comparative polyethylenes.

Good cold seal properties are evidenced by the curves given in FIG. 5 for the Inventive Example 1. For comparison, the cold seal properties of Comparative Examples 1-7 are also shown in FIG. 5. From FIG. 5, a person skilled in the art will recognize that the Inventive Example 1 has an early cold seal initiation temperature in combination with a relatively high seal force over a wide range of cold seal temperatures. In contrast, the Comparative Examples, 1-7 have a later cold seal initiation temperature, with a narrower range of cold seal temperatures over which a relatively high seal force occurs.

Figure 6:
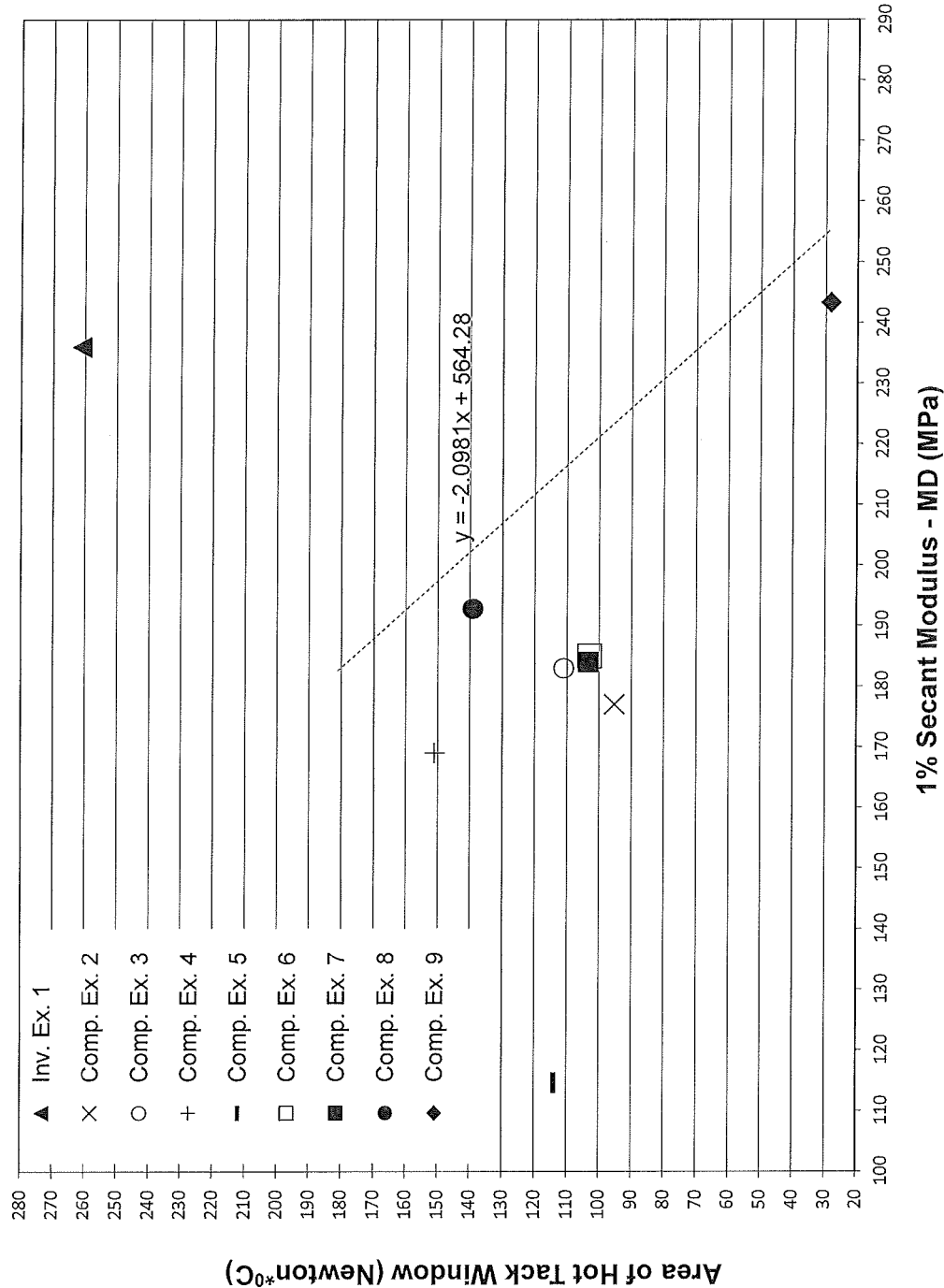
FIG. 6 shows a plot of the equation: AHTW=−2.0981 (machine direction (MD) 1% secant modulus)+564.28. The values for the AHTW (the y-axis) are plotted against the corresponding machine direction (MD) 1% secant modulus values (the x-axis) for film made from a polyethylene composition of the present disclosure as well as those for film made from several comparative polyethylenes.

FIG. 6 shows that the Inventive Example 1, has a better balance of AHTW and stiffness (as determined by the machine direction (MD) secant modulus at 1% strain) than do the Comparative Examples 2-9. Indeed, FIG. 6, which plots the AHTW (in Newtons·° C.) values (the y-axis) against the machine direction (MD) secant modulus at 1% strain (in MPa) values (the x-axis), along with plot of the equation: AHTW=−2.0981 (machine direction (MD) 1% secant modulus)+564.28, shows that the Inventive Example 1 satisfies the condition: AHTW>−2.0981 (machine direction (MD) 1% secant modulus)+564.28, whereas the Comparative Examples 2-9 do not.

Figure 7:
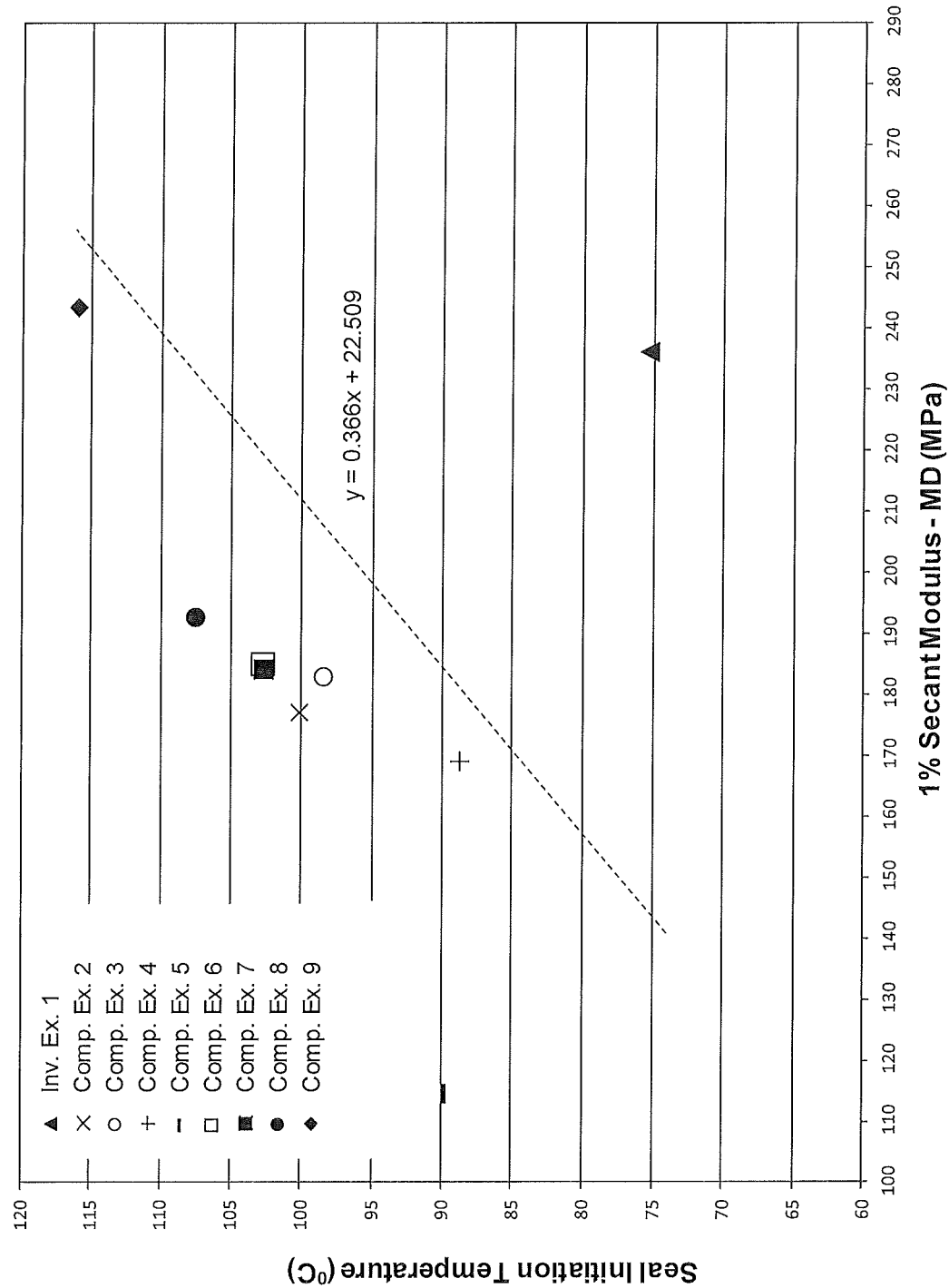
FIG. 7 shows a plot of the equation: SIT=0.366 (machine direction (MD) 1% secant modulus)+22.509. The values for the SIT (the y-axis) are plotted against the corresponding machine direction (MD) 1% secant modulus values (the x-axis) for film made from a polyethylene composition of the present disclosure as well as those for film made from several comparative polyethylenes.

FIG. 7, shows that the Inventive Example, has a better balance of SIT and stiffness (as determined by the machine direction (MD) secant modulus at 1% strain) than do the Comparative Examples 2-9. FIG. 7, which plots the SIT (in ° C.) values (the y-axis) against the machine direction (MD) secant modulus at 1% strain (in MPa) values (the x-axis), along with plot of the equation: SIT=0.366 (machine direction (MD) 1% secant modulus)+22.509, shows that the Inventive Example 1 satisfies the condition: SIT<0.366 (machine direction (MD) 1% secant modulus)+22.509, whereas the Comparative Examples 2-9 do not.

Figure 8:
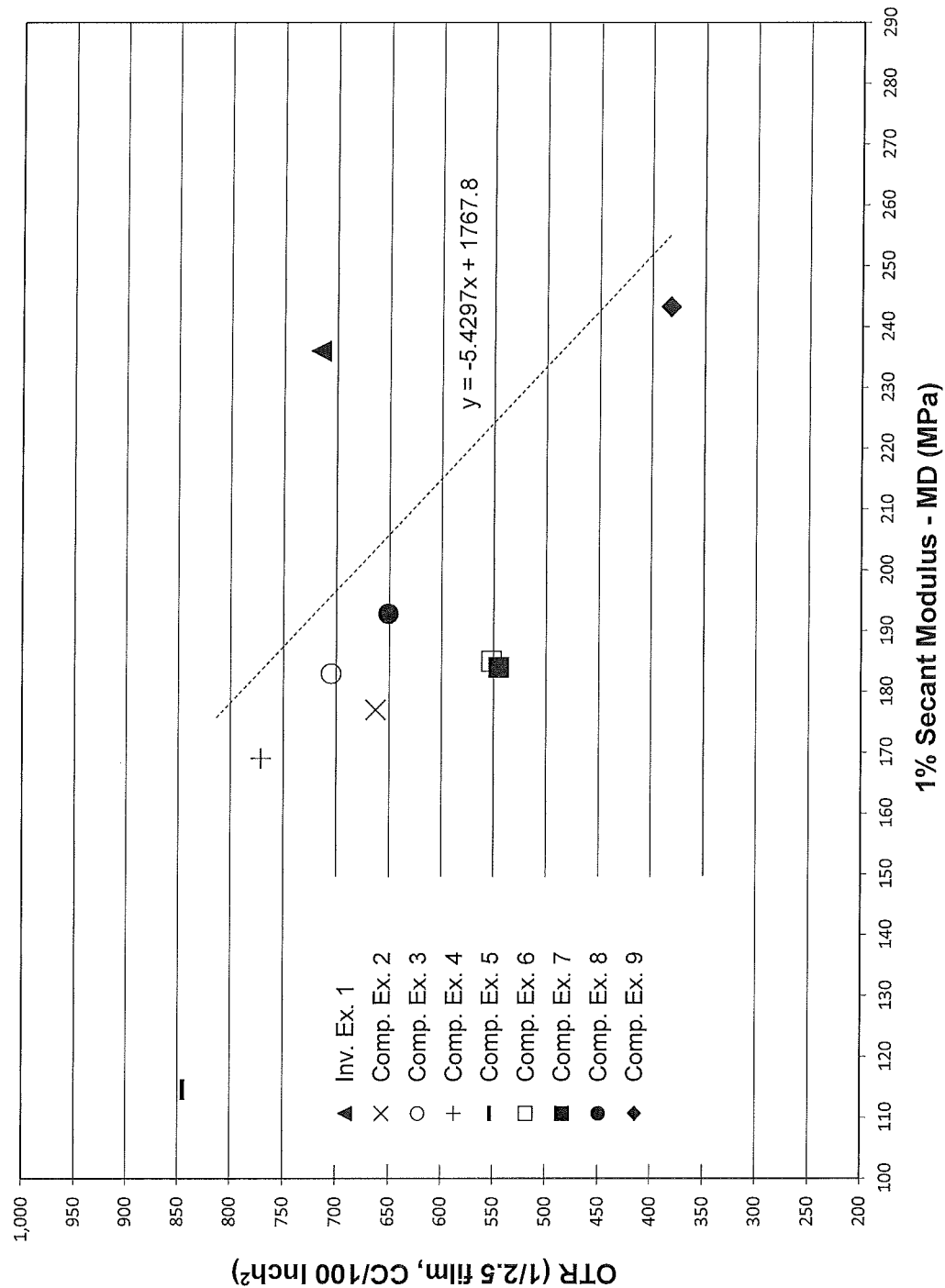
FIG. 8 shows a plot of the equation: OTR=−5.4297 (machine direction (MD) 1% secant modulus)+1767.8. The values for the OTR (the y-axis) are plotted against the corresponding machine direction (MD) 1% secant modulus values (the x-axis) for film made from a polyethylene composition of the present disclosure as well as those for film made from several comparative polyethylenes. "1/2.5 film" means that the film was made at 1 mil of thickness with a blow up ratio (BUR) of 2.5.

FIG. 8, shows that the Inventive Example 1, has a better balance of OTR and stiffness (as determined by the machine direction (MD) secant modulus at 1% strain) than do the Comparative Examples 2-9. FIG. 8, which plots the OTR (in $cm^3$ per 100 $inch^2$ per day) values (the y-axis) against the machine direction (MD) secant modulus at 1% strain (in MPa) values (the x-axis), along with plot of the equation: OTR=−5.4297 (machine direction (MD) 1% secant modulus)+1767.8, shows that the Inventive Example 1 satisfies the condition: OTR>−5.4297 (machine direction (MD) 1% secant modulus)+1767.8, whereas the Comparative Examples 2-9 do not.

Non-limiting embodiments of the present disclosure include the following:

Embodiment A

A polyethylene composition comprising:

from 15 to 80 wt % of a first polyethylene which is an ethylene copolymer, the first polyethylene having a weight average molecular weight $M_w$ of from 70,000 to 250,000, a molecular weight distribution $M_w/M_n$ of <2.3 and from 5 to 100 short chain branches per thousand carbon atoms;

from 5 to 50 wt % of a second polyethylene which is an ethylene copolymer or an ethylene homopolymer, the second polyethylene having a weight average molecular weight, $M_w$ of from 50,000 to 200,000, a molecular weight distribution $M_w/M_n$ of <2.3 and from 0 to 15 short chain branches per thousand carbon atoms; and from 5 to 50 wt % of a third polyethylene which is an ethylene copolymer or an ethylene homopolymer, the third polyethylene having a weight average molecular weight, $M_w$ of from 70,000 to 200,000, a molecular weight distribution $M_w/M_n$ of <2.3 and from 0 to 20 short chain branches per thousand carbon atoms; wherein the number of short chain branches per thousand carbon atoms in first polyethylene ($SCB_{PE-1}$) is greater than the number of short chain branches per thousand carbon atoms in the second polyethylene ($SCB_{PE-2}$) and the third polyethylene ($SCB_{PE-3}$); and the polyethylene composition has a density of ≤0.939 g/cm³, a melt index $I_2$ of from 0.1 to 10 g/10 min, and a composition distribution breadth index $CDBI_{50}$ obtained from a crystallization elution fractionation (CEF) analysis of <45 weight %.

Embodiment B

The polyethylene composition of Embodiment A wherein the weight average molecular weight of the second polyethylene is less than the weight average molecular weight of the first polyethylene.

Embodiment C

The polyethylene composition of Embodiment A or B wherein the weight average molecular weight of the second polyethylene is less than the weight average molecular weight of the third polyethylene.

Embodiment D

The polyethylene composition of Embodiment A, B or C wherein the number of short chain branches per thousand carbon atoms in the third polyethylene ($SCB_{PE-3}$) is greater than the number of short chain branches per thousand carbon atoms in the second polyethylene ($SCB_{PE-2}$).

Embodiment E

The polyethylene composition of Embodiment A, B, C or D wherein the polyethylene composition has composition distribution breadth index $CDBI_{50}$ obtained from a crystallization elution fractionation (CEF) analysis of <35 weight %.

Embodiment F

The polyethylene composition of Embodiment A, B, C, D or E wherein the polyethylene composition has a unimodal profile in a gel permeation chromatograph (GPC).

Embodiment G

The polyethylene composition of Embodiment A, B, C, D, E or F wherein the polyethylene composition has a melting peak temperature in a differential scanning calorimetry (DSC) analysis at above 125° C.

Embodiment H

The polyethylene composition of Embodiment A, B, C, D, E, F or G wherein the polyethylene composition has a melting peak temperature in a differential scanning calorimetry (DSC) analysis at below 90° C.

Embodiment I

The polyethylene composition of Embodiment A, B, C, D, E, F, G or H wherein the polyethylene composition has three melting peaks in a differential scanning calorimetry (DSC) analysis.

Embodiment J

The polyethylene composition of Embodiment A, B, C, D, E, F, G, H or I wherein the first polyethylene has from 15 to 50 short chain branches per thousand carbon atoms.

Embodiment K

The polyethylene composition of Embodiment A, B, C, D, E, F, G, H, I or J wherein the second polyethylene is an ethylene homopolymer.

Embodiment L

The polyethylene composition of Embodiment A, B, C, D, E, F, G, H, I, J or K wherein the third polyethylene is an ethylene copolymer and has from 0.1 to 5 short chain branches per thousand carbon atoms.

Embodiment M

The polyethylene composition of Embodiment A, B, C, D, E, F, G, H, I, J, K or L wherein the first polyethylene has a weight average molecular weight, $M_w$ of from 75,000 to 175,000.

Embodiment N

The polyethylene composition of Embodiment A, B, C, D, E, F, G, H, I, J, K, L or M wherein the second polyethylene has a weight average molecular weight, $M_w$ of from 60,000 to 150,000.

Embodiment O

The polyethylene composition of Embodiment A, B, C, D, E, F, G, H, I, J, K, L, M or N wherein the third polyethylene has a weight average molecular weight, $M_w$ of from 75,000 to 175,000.

Embodiment P

The polyethylene composition of Embodiment A, B, C, D, E, F, G, H, I, J, K, L, M, N or O wherein the first polyethylene has a density of from 0.860 to 0.916 g/cm³.

Embodiment Q

The polyethylene composition of Embodiment A, B, C, D, E, F, G, H, I, J, K, L, M, N, O or P wherein the second polyethylene is an ethylene homopolymer having a density of from 0.930 to 0.980 g/cm$^3$.

Embodiment R

The polyethylene composition of Embodiment A, B, C, D, E, F, G, H, I, J, K, L, M, N, O, P or Q wherein the third polyethylene is an ethylene copolymer having a density of from 0.916 to 0.980 g/cm$^3$.

Embodiment S

The polyethylene composition of Embodiment A, B, C, D, E, F, G, H, I, J, K, L, M, N, O, P, Q or R wherein the first polyethylene is present in from 35 to 75 wt %.

Embodiment T

The polyethylene composition of Embodiment A, B, C, D, E, F, G, H, I, J, K, L, M, N, O, P, Q, R or S wherein the second polyethylene is present in from 15 to 40 wt %.

Embodiment U

The polyethylene composition of Embodiment A, B, C, D, E, F, G, H, I, J, K, L, M, N, O, P, Q, R, S or T wherein the third polyethylene is present in from 10 to 35 wt %.

Embodiment V

The polyethylene composition of Embodiment A, B, C, D, E, F, G, H, I, J, K, L, M, N, O, P, Q, R, S, T or U wherein the first polyethylene has a CDBI$_{50}$ of at least 75 wt %.

Embodiment W

The polyethylene composition of Embodiment A, B, C, D, E, F, G, H, I, J, K, L, M, N, O, P, Q, R, S, T, U or V wherein the third polyethylene is a copolymer with a CDBI$_{50}$ of at least 75 wt %.

Embodiment X

The polyethylene composition of Embodiment A, B, C, D, E, F, G, H, I, J, K, L, M, N, O, P, Q, R, S, T, U, V or W wherein the first polyethylene is a homogeneously branched ethylene copolymer.

Embodiment Y

The polyethylene composition of Embodiment A, B, C, D, E, F, G, H, I, J, K, L, M, N, O, P, Q, R, S, T, U, V, W or X wherein the third polyethylene is a homogeneously branched ethylene copolymer.

Embodiment Z

The polyethylene composition of Embodiment A, B, C, D, E, F, G, H, I, J, K, L, M, N, O, P, Q, R, S, T, U, V, W, X or Y wherein the first polyethylene is a made with a single site catalyst.

Embodiment AA

The polyethylene composition of Embodiment A, B, C, D, E, F, G, H, I, J, K, L, M, N, O, P, Q, R, S, T, U, V, W, X, Y or Z wherein the second polyethylene is made with a single site catalyst.

Embodiment BB

The polyethylene composition of Embodiment A, B, C, D, E, F, G, H, I, J, K, L, M, N, O, P, Q, R, S, T, U, V, W, X, Y, Z or AA wherein the third polyethylene is made with a single site catalyst.

Embodiment CC

The polyethylene composition of Embodiment A, B, C, D, E, F, G, H, I, J, K, L, M, N, O, P, Q, R, S, T, U, V, W, X, Y, Z, AA or BB wherein the polyethylene composition has a molecular weight distribution M$_w$/M$_n$ of <2.5.

Embodiment DD

The polyethylene composition of Embodiment A, B, C, D, E, F, G, H, I, J, K, L, M, N, O, P, Q, R, S, T, U, V, W, X, Y, Z, AA or BB wherein the polyethylene composition has a molecular weight distribution M$_w$/M$_n$ of from 1.5 to 3.5.

Embodiment EE

The polyethylene composition of Embodiment A, B, C, D, E, F, G, H, I, J, K, L, M, N, O, P, Q, R, S, T, U, V, W, X, Y, Z, AA, BB, CC or DD wherein the polyethylene composition has a density of <0.935 g/cm$^3$.

Embodiment FF

The polyethylene composition of Embodiment A, B, C, D, E, F, G, H, I, J, K, L, M, N, O, P, Q, R, S, T, U, V, W, X, Y, Z, AA, BB, CC or DD wherein the polyethylene composition has a density of from 0.880 to 0.932 g/cm$^3$.

Embodiment GG

The polyethylene composition of Embodiment A, B, C, D, E, F, G, H, I, J, K, L, M, N, O, P, Q, R, S, T, U, V, W, X, Y, Z, AA, BB, CC, DD, EE or FF wherein the polyethylene composition has a melt index, I2 of from 0.1 to 3.0 dg/min.

Embodiment HH

The polyethylene composition of Embodiment A, B, C, D, E, F, G, H, I, J, K, L, M, N, O, P, Q, R, S, T, U, V, W, X, Y, Z, AA, BB, CC, DD, EE, FF or GG wherein the polyethylene composition has a M$_z$/M$_w$ of less than 2.3.

Embodiment II

The polyethylene composition of Embodiment A, B, C, D, E, F, G, H, I, J, K, L, M, N, O, P, Q, R, S, T, U, V, W, X, Y, Z, AA, BB, CC, DD, EE, FF, GG or HH wherein the polyethylene composition has a melt index ratio, I$_{21}$/I$_2$ of from 15 to 40.

Embodiment JJ

A film layer having a thickness of from 0.5 to 10 mil, comprising the polyethylene composition of Embodiment A, B, C, D, E, F, G, H, I, J, K, L, M, N, O, P, Q, R, S, T, U, V, W, X, Y, Z, AA, BB, CC, DD, EE, FF, GG, HH or II.

Embodiment KK

The film layer of Embodiment JJ wherein the film layer has a machine direction (MD) 1% secant modulus of ≥220 MPa when measured at a film thickness of about 1 mil.

Embodiment LL

The film layer of Embodiment JJ or KK wherein the film layer has a dart impact strength of ≥400 g/mil.

Embodiment MM

The film layer of Embodiment JJ, KK or LL wherein the film layer has a machine direction (MD) tear strength of ≥400 g/mil.

Embodiment NN

The film layer of Embodiment JJ wherein the film layer has a machine direction (MD) 1% secant modulus of ≥200 MPa when measured at a film thickness of about 1 mil; a dart impact strength of ≥400 g/mil and a machine direction (MD) tear strength of ≥400 g/mil.

Embodiment OO

The film layer of Embodiment JJ, KK, LL, MM or NN wherein the film layer has a seal initiation temperature (SIT) of ≤85° C. when measured at a film thickness of about 2 mil.

Embodiment PP

The film layer of Embodiment JJ, KK, LL, MM, NN or OO wherein the film layer has an area of hot tack window (AHTW) of ≥220 Newtons·° C. when measured at a film thickness of about 2 mil.

Embodiment QQ

The film layer of Embodiment JJ, KK, LL, MM, NN, OO or PP wherein the film layer has an oxygen transmission rate (OTR) of ≥600 cm$^3$ per 100 inch$^2$ per day when measured at a film thickness of about 1 mil.

Embodiment RR

The film layer of Embodiment JJ wherein the film layer has a machine direction (MD) 1% secant modulus of ≥200 MPa when measured at a film thickness of about 1 mil, a seal initiation temperature (SIT) of ≤85° C. when measured at a film thickness of about 2 mil, an area of hot tack window (AHTW) of ≥220 Newtons·° C. when measured at a film thickness of about 2 mil, and an oxygen transmission rate (OTR) of ≥600 cm$^3$ per 100 inch$^2$ per day when measured at a film thickness of about 1 mil.

Embodiment SS

A film layer having a thickness of from 0.5 to 10 mil, wherein the film layer has a machine direction (MD) 1% secant modulus of ≥200 MPa when measured at a film thickness of about 1 mil and a seal initiation temperature (SIT) of ≤85° C. when measured at a film thickness of about 2 mil.

Embodiment TT

A film layer having a thickness of from 0.5 to 10 mil, wherein the film layer has a has a machine direction (MD) 1% secant modulus of ≥200 MPa when measured at a film thickness of about 1 mil and an area of hot tack window (AHTW) of ≥220 Newtons·° C. when measured at a film thickness of about 2 mil.

Embodiment UU

A film layer having a thickness of from 0.5 to 10 mil, wherein the film layer has a has a machine direction (MD) 1% secant modulus of ≥200 MPa when measured at a film thickness of about 1 mil and an oxygen transmission rate (OTR) of ≥600 cm$^3$ per 100 inch$^2$ per day when measured at a film thickness of about 1 mil.

Embodiment VV

A film layer having a thickness of from 0.5 to 10 mil, wherein the film layer has a has a machine direction (MD) 1% secant modulus of ≥200 MPa when measured at a film thickness of about 1 mil, an oxygen transmission rate (OTR) of ≥600 cm$^3$ per 100 inch$^2$ per day when measured at a film thickness of about 1 mil, a seal initiation temperature (SIT) of ≤85° C. when measured at a film thickness of about 2 mil, and an area of hot tack window (AHTW) of ≥220 Newtons·° C. when measured at a film thickness of about 2 mil.

Embodiment WW

A film layer having a thickness of from 0.5 to 10 mil, wherein the film layer has a has a machine direction (MD) 1% secant modulus of ≥200 MPa when measured at a film thickness of about 1 mil, an oxygen transmission rate (OTR) of ≥600 cm$^3$ per 100 inch$^2$ per day when measured at a film thickness of about 1 mil, a seal initiation temperature (SIT) of ≤85° C. when measured at a film thickness of about 2 mil, an area of hot tack window (AHTW) of ≥220 Newtons·° C. when measured at a film thickness of about 2 mil, a dart impact strength of ≥400 g/mil and a machine direction (MD) tear strength of ≥400 g/mil.

Embodiment XX

Film comprising the polyethylene composition of Embodiment A, B, C, D, E, F, G, H, I, J, K, L, M, N, O, P, Q, R, S, T, U, V, W, X, Y, Z, AA, BB, CC, DD, EE, FF, GG, HH or II, the film satisfying the following relationship:

area of hot tack window (AHTW)>−2.0981 (machine direction (MD) 1% secant modulus)+ 564.28;

wherein the AHTW is measured at a film thickness of about 2 mil, and the machine direction (MD) 1% secant modulus is measured at a film thickness of about 1 mil.

Embodiment YY

Film comprising the polyethylene composition of Embodiment A, B, C, D, E, F, G, H, I, J, K, L, M, N, O, P, Q, R, S, T, U, V, W, X, Y, Z, AA, BB, CC, DD, EE, FF, GG, HH or II, the film satisfying the following relationship:

oxygen transmission rate (OTR)>−5.4297 (machine direction (MD) 1% secant modulus)+1767.8;

wherein the OTR is measured at a film thickness of about 1 mil, and the machine direction (MD) 1% secant modulus is measured at a film thickness of about 1 mil.

Embodiment ZZ

Film comprising the polyethylene composition of Embodiment A, B, C, D, E, F, G, H, I, J, K, L, M, N, O, P, Q, R, S, T, U, V, W, X, Y, Z, AA, BB, CC, DD, EE, FF, GG, HH or II, the film satisfying the following relationship:

seal initiation temperature (SIT)<0.366 (machine direction (MD) 1% secant modulus)+22.509;

wherein the SIT is measured at a film thickness of about 2 mil, and the machine direction (MD) 1% secant modulus is measured at a film thickness of about 1 mil.

Embodiment AAA

Film comprising the polyethylene composition of Embodiment A, B, C, D, E, F, G, H, I, J, K, L, M, N, O, P, Q, R, S, T, U, V, W, X, Y, Z, AA, BB, CC, DD, EE, FF, GG, HH or II, the film satisfying the following relationships:

area of hot tack window (AHTW)>−2.0981 (machine direction (MD) 1% secant modulus)+ 564.28;   i)

wherein the AHTW is measured at a film thickness of about 2 mil, and the machine direction (MD) 1% secant modulus is measured at a film thickness of about 1 mil;

oxygen transmission rate (OTR)>−5.4297 (machine direction (MD) 1% secant modulus)+1767.8;   ii)

wherein the OTR is measured at a film thickness of about 1 mil, and the machine direction (MD) 1% secant modulus is measured at a film thickness of about 1 mil; and seal initiation temperature (SIT)<0.366 (machine direction (MD) 1% secant modulus)+22.509;   iii)

wherein the SIT is measured at a film thickness of about 2 mil, and the machine direction (MD) 1% secant modulus is measured at a film thickness of about 1 mil.

The embodiments of the invention in which an exclusive property or privilege is claimed are defined as follows:

1. A polyethylene composition comprising:
   from 15 to 80 wt % of a first polyethylene which is an ethylene copolymer, the first polyethylene having a weight average molecular weight Mw of from 70,000 to 250,000, a molecular weight distribution Mw/Mn of <2.3 and from 5 to 100 short chain branches per thousand carbon atoms;
   from 5 to 50 wt % of a second polyethylene which is an ethylene copolymer or an ethylene homopolymer, the second polyethylene having a weight average molecular weight, Mw of from 50,000 to 200,000, a molecular weight distribution Mw/Mn of <2.3 and from 0 to 15 short chain branches per thousand carbon atoms; and
   from 5 to 50 wt % of a third polyethylene which is an ethylene copolymer or an ethylene homopolymer, the third polyethylene having a weight average molecular weight, Mw of from 70,000 to 200,000, a molecular weight distribution Mw/Mn of <2.3 and from 0 to 10 short chain branches per thousand carbon atoms;

wherein:
   the number of short chain branches per thousand carbon atoms in the first polyethylene ($SCB_{PE-1}$) is greater than the number of short chain branches per thousand carbon atoms in the second polyethylene ($SCB_{PE-2}$) and the third polyethylene ($SCB_{PE-3}$); and
   the polyethylene composition has a density of <0.939 g/cm$^3$, a melt index $I_2$, determined at 190° C., of from 0.1 to 10 g/10min, and a composition distribution breadth index $CDBI_{50}$ obtained from a crystallization elution fractionation (CEF) analysis of <45 w%.

2. The polyethylene composition of claim 1 wherein the weight average molecular weight of the second polyethylene is less than the weight average molecular weight of the first polyethylene.

3. The polyethylene composition of claim 1 wherein the weight average molecular weight of the second polyethylene is less than the weight average molecular weight of the third polyethylene.

4. The polyethylene composition of claim 1 wherein the number of short chain branches per thousand carbon atoms in the third polyethylene ($SCB_{PE-3}$) is greater than the number of short chain branches per thousand carbon atoms in the second polyethylene ($SCB_{PE-2}$).

5. The polyethylene composition of claim 1 wherein the polyethylene composition has composition distribution breadth index $CDBI_{50}$ obtained from a crystallization elution fractionation (CEF) analysis of <35 wt% .

6. The polyethylene composition of claim 1 wherein the polyethylene composition has a unimodal profile in a gel permeation chromatograph (GPC).

7. The polyethylene composition of claim 1 wherein the polyethylene composition has a melting peak temperature in a differential scanning calorimetry (DSC) analysis at above 125° C.

8. The polyethylene composition of claim 1 wherein the polyethylene composition has a melting peak temperature in a differential scanning calorimetry (DSC) analysis at below 90° C.

9. The polyethylene composition of claim 1 wherein the polyethylene composition has three melting peaks in a differential scanning calorimetry (DSC) analysis.

10. The polyethylene composition of claim 1 wherein the first polyethylene has from 15 to 50 short chain branches per thousand carbon atoms.

11. The polyethylene composition of claim 1 wherein the second polyethylene is an ethylene homopolymer.

12. The polyethylene composition of claim 1 wherein the third polyethylene is an ethylene copolymer and has from 0.1 to 5 short chain branches per thousand carbon atoms.

13. The polyethylene composition of claim 1 wherein the first polyethylene has a weight average molecular weight, Mw of from 75,000 to 175,000.

14. The polyethylene composition of claim 1 wherein the second polyethylene has a weight average molecular weight, Mw of from 60,000 to 150,000.

15. The polyethylene composition of claim 1 wherein the third polyethylene has a weight average molecular weight, Mw of from 75,000 to 175,000.

16. The polyethylene composition of claim 1 wherein the first polyethylene has a density of from 0.860 to 0.916 g/cm$^3$.

17. The polyethylene composition of claim 1 wherein the second polyethylene is an ethylene homopolymer having a density of from 0.930 to 0.980 g/cm$^3$.

18. The polyethylene composition of claim 1 wherein the third polyethylene is an ethylene copolymer having a density of from 0.916 to 0.980 g/cm$^3$.

19. The polyethylene composition of claim 1 wherein the first polyethylene is present in from 35 to 75 wt %.

20. The polyethylene composition of claim 1 wherein the second polyethylene is present in from 15 to 40 wt %.

21. The polyethylene composition of claim 1 wherein the third polyethylene is present in from 10 to 35 wt %.

22. The polyethylene composition of claim 1 wherein the first polyethylene has a $CDBI_{50}$ of at least 75 wt %.

23. The polyethylene composition of claim 1 wherein the third polyethylene is a copolymer with a $CDBI_{50}$ of at least 75 wt %.

24. The polyethylene composition of claim 1 wherein the first polyethylene is a homogeneously branched ethylene copolymer.

25. The polyethylene composition of claim 1 wherein the third polyethylene is a homogeneously branched ethylene copolymer.

26. The polyethylene composition of claim 1 wherein the first polyethylene is a made with a single site catalyst.

27. The polyethylene composition of claim 1 wherein the second polyethylene is made with a single site catalyst.

28. The polyethylene composition of claim 1 wherein the third polyethylene is made with a single site catalyst.

29. The polyethylene composition of claim 1 wherein the polyethylene composition has a molecular weight distribution $M_w/M_n$ of <2.5.

30. The polyethylene composition of claim 1 wherein the polyethylene composition has a molecular weight distribution $M_w/M_n$ of from 1.5 to 3.5.

31. The polyethylene composition of claim 1 wherein the polyethylene composition has a density of <0.935 g/cm$^3$.

32. The polyethylene composition of claim 1 wherein the polyethylene composition has a density of from 0.880 to 0.932 g/cm$^3$.

33. The polyethylene composition of claim 1 wherein the polyethylene composition has a melt index, 12 of from 0.1 to 3.0 dg/min.

34. The polyethylene composition of claim 1 wherein the polyethylene composition has a $M_z/M_w$ of less than 2.3.

35. The polyethylene composition of claim 1 wherein the polyethylene composition has a melt index ratio, $I_{21}/I_2$ of from 15 to 40.

36. A film layer having a thickness of from 0.5 to 10 mil, comprising the polyethylene composition of claim 1.

37. The film layer of claim 36 wherein the film layer has a machine direction (MD) 1% secant modulus of ≥220 MPa when measured at a film thickness of about 1 mil.

38. The film layer of claim 36 wherein the film layer has a dart impact strength of ≥400 g/mil.

39. The film layer of claim 36 wherein the film layer has a machine direction (MD) tear strength of ≥400 g/mil.

40. The film layer of claim 36 wherein the film layer has a machine direction (MD) 1% secant modulus of ≥200 MPa when measured at a film thickness of about 1 mil; a dart impact strength of ≥400 g/mil and a machine direction (MD) tear strength of ≥400 g/mil.

41. The film layer of claim 36 wherein the film layer has a seal initiation temperature (SIT) of ≤85° C. when measured at a film thickness of about 2 mil.

42. The film layer of claim 36 wherein the film layer has an area of hot tack window (AHTW) of ≥220 Newtons·° C. when measured at a film thickness of about 2 mil.

43. The film layer of claim 36 wherein the film layer has an oxygen transmission rate (OTR) of ≥600 cm$^3$ per 100 inch$^2$ when measured at a film thickness of about 1 mil.

44. The film layer of claim 36 wherein the film layer has a machine direction (MD) 1% secant modulus of ≥200 MPa when measured at a film thickness of about 1 mil, a seal initiation temperature (SIT) of ≤85° C. when measured at a film thickness of about 2 mil, an area of hot tack window (AHTW) of ≥220 Newtons·° C. when measured at a film thickness of about 2 mil, and an oxygen transmission rate (OTR) of ≥600 cm$^3$ per 100 inch$^2$ when measured at a film thickness of about 1 mil.

45. Film comprising the polyethylene composition of claim 1, the film satisfying the following relationship:

area of hot tack window (AHTW in Newtons·° C.)>−2.0981 (machine direction (MD) 1% secant modulus in MPa)+564.28;

wherein the AHTW is measured at a film thickness of about 2 mil, and the machine direction (MD) 1% secant modulus is measured at a film thickness of about 1 mil.

46. Film comprising the polyethylene composition of claim 1, the film satisfying the following relationship:

oxygen transmission rate (OTR in cm$^3$ per 100 inch per day)>−5.4297 (machine direction (MD) 1% secant modulus in MPa)+1767.8;

wherein the OTR is measured at a film thickness of about 1 mil, and the machine direction (MD) 1% secant modulus is measured at a film thickness of about 1 mil.

47. Film comprising the polyethylene composition of claim 1, the film satisfying the following relationship:

seal initiation temperature (SIT in ° C.)<0.366 (machine direction (MD) 1% secant modulus in MPa)+22.509;

wherein the SIT is measured at a film thickness of about 2 mil, and the machine direction (MD) 1% secant modulus is measured at a film thickness of about 1 mil.

48. Film comprising the polyethylene composition of claim 1, the film satisfying the following relationships:

i) area of hot tack window (AHTW in Newtons·° C.)>−2.0981 (machine direction (MD) 1% secant modulus in MPa)+564.28;

wherein the AHTW is measured at a film thickness of about 2 mil, and the machine direction (MD) 1% secant modulus is measured at a film thickness of about 1 mil;

ii) oxygen transmission rate (OTR in cm$^3$ per 100 inch$^2$ per day)>−5.4297 (machine direction (MD) 1% secant modulus in MPa)+1767.8;

wherein the OTR is measured at a film thickness of about 1 mil, and the machine direction (MD) 1% secant modulus is measured at a film thickness of about 1 mil; and iii) seal initiation temperature (SIT in ° C.)<0.366 (machine direction (MD) 1% secant modulus in MPa)+22.509;

wherein the SIT is measured at a film thickness of about 2 mil, and the machine direction (MD) 1% secant modulus is measured at a film thickness of about 1 mil.

* * * * *